July 11, 1933.  E. L. JONES  1,917,374
RECEPTACLE MAKING APPARATUS
Filed Aug. 21, 1928   29 Sheets-Sheet 1
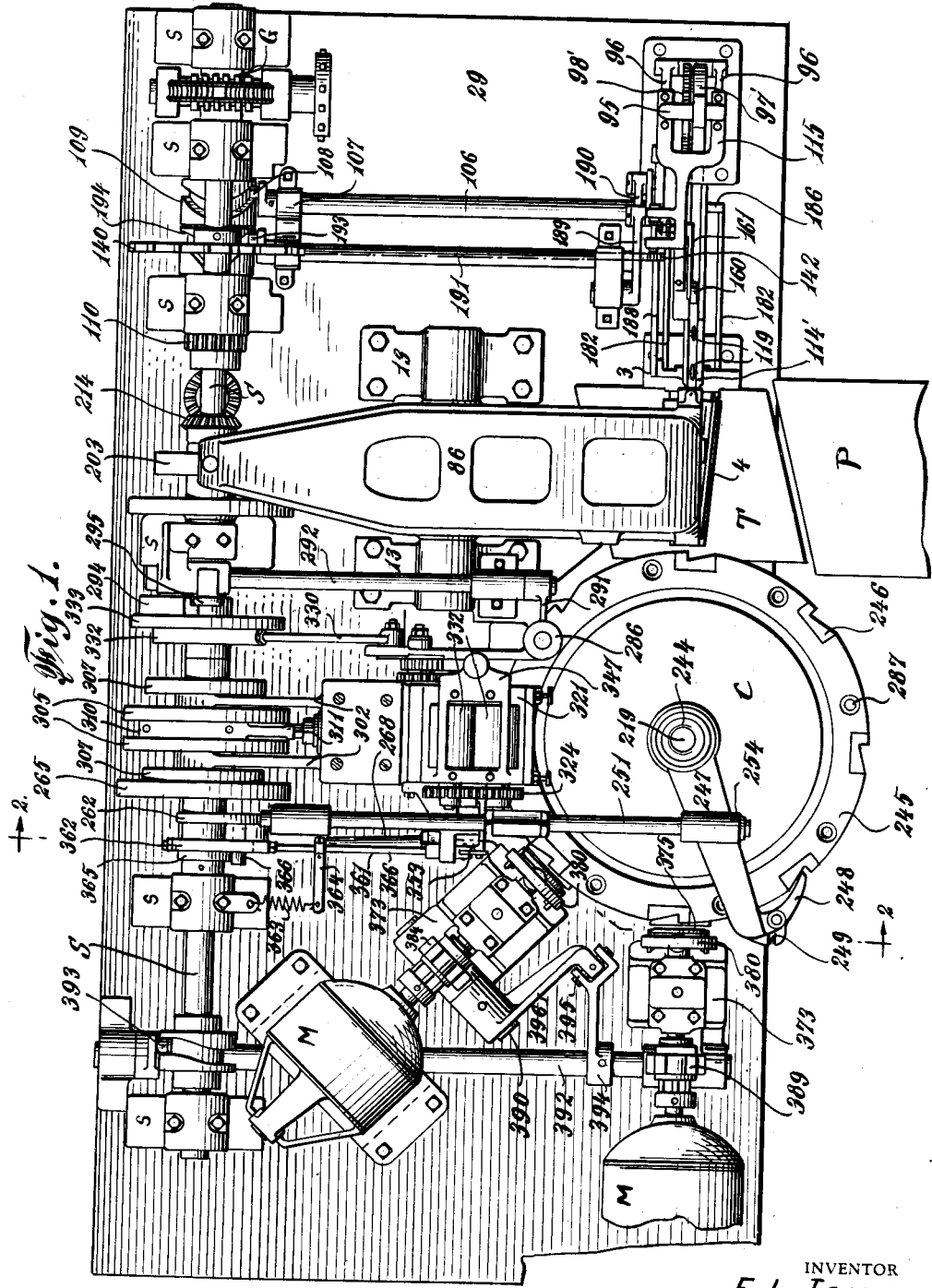
INVENTOR
E. L. Jones
BY John O. Seifert
ATTORNEY

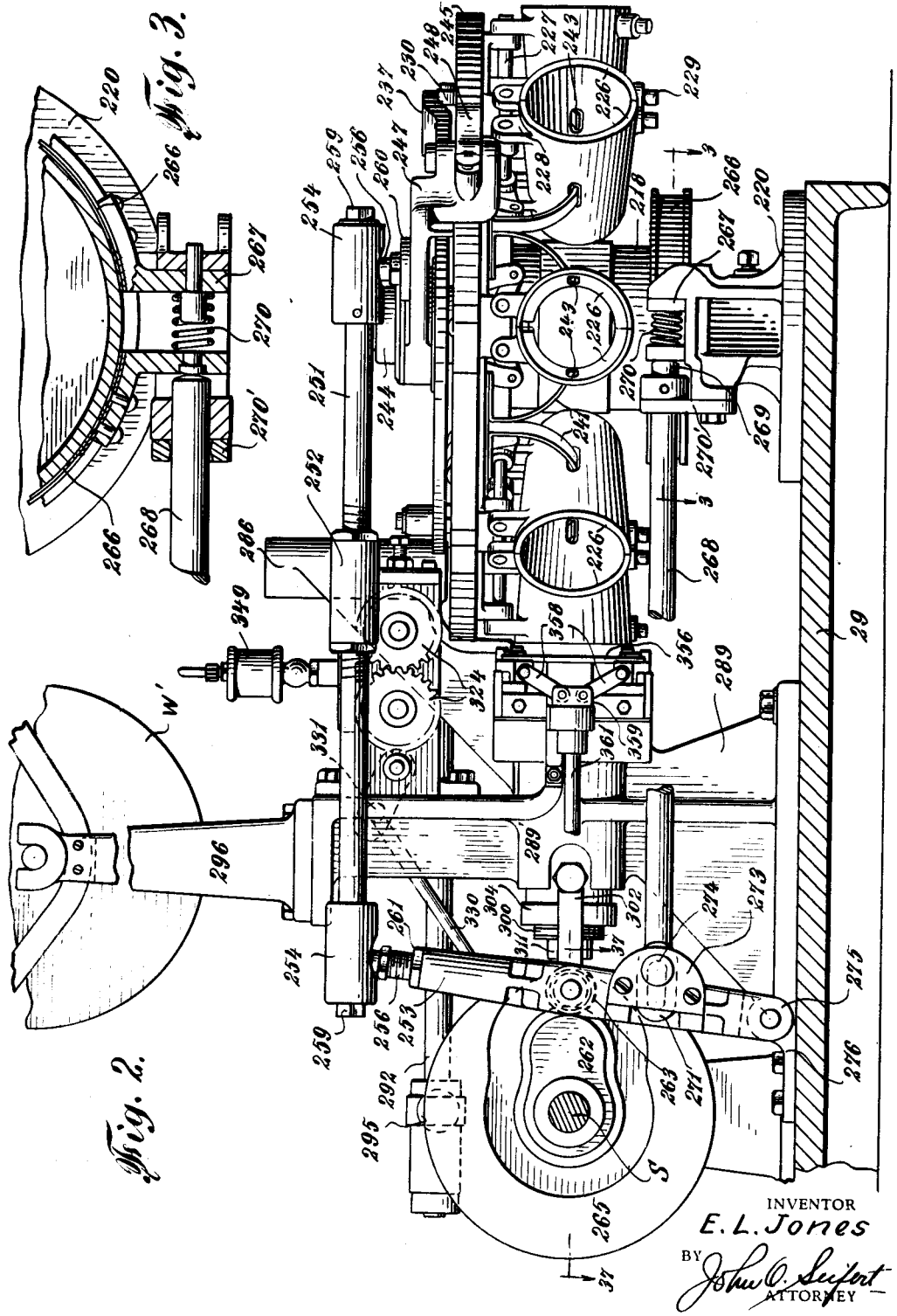

July 11, 1933.     E. L. JONES     1,917,374
RECEPTACLE MAKING APPARATUS
Filed Aug. 21, 1928     29 Sheets-Sheet 3

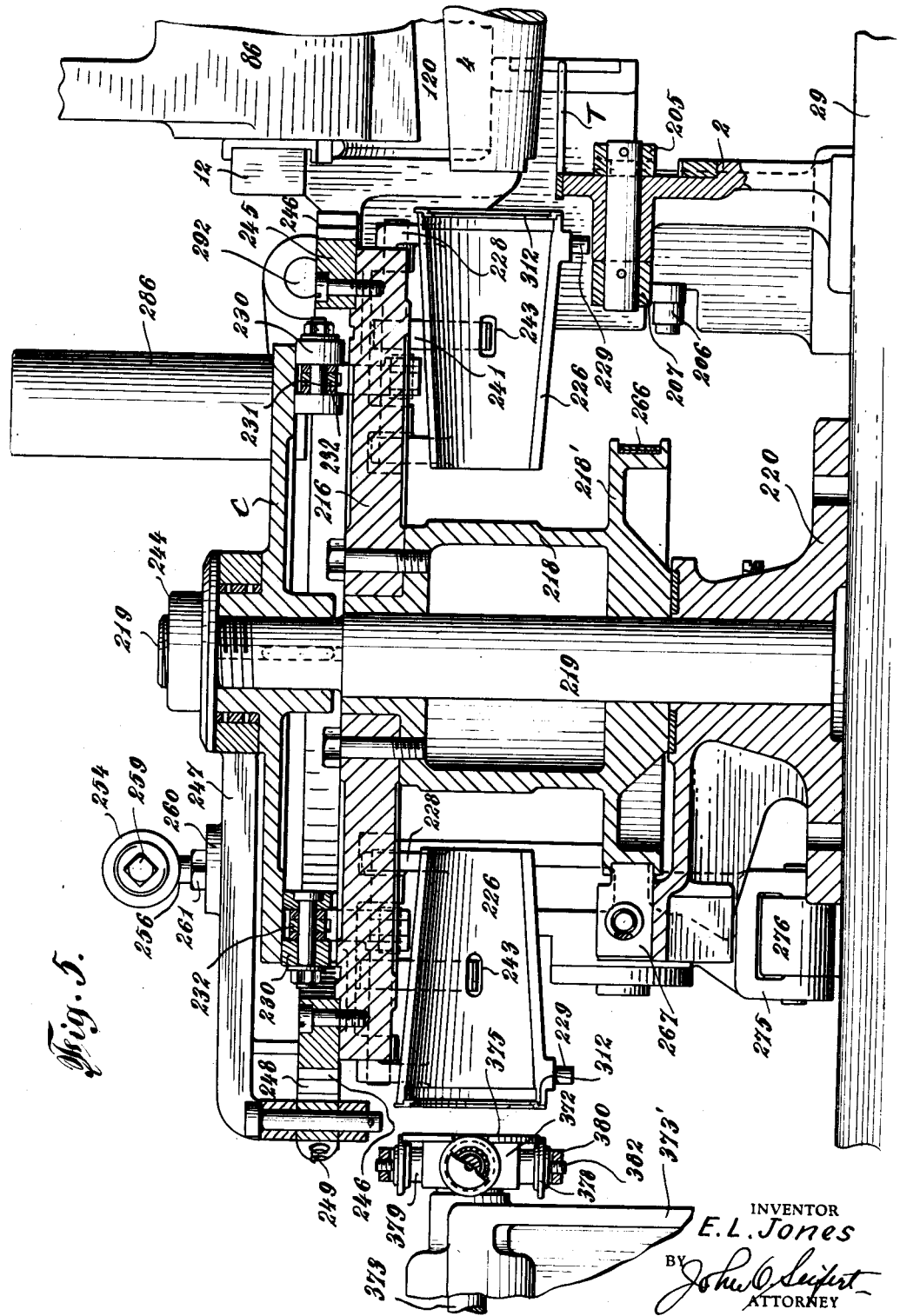

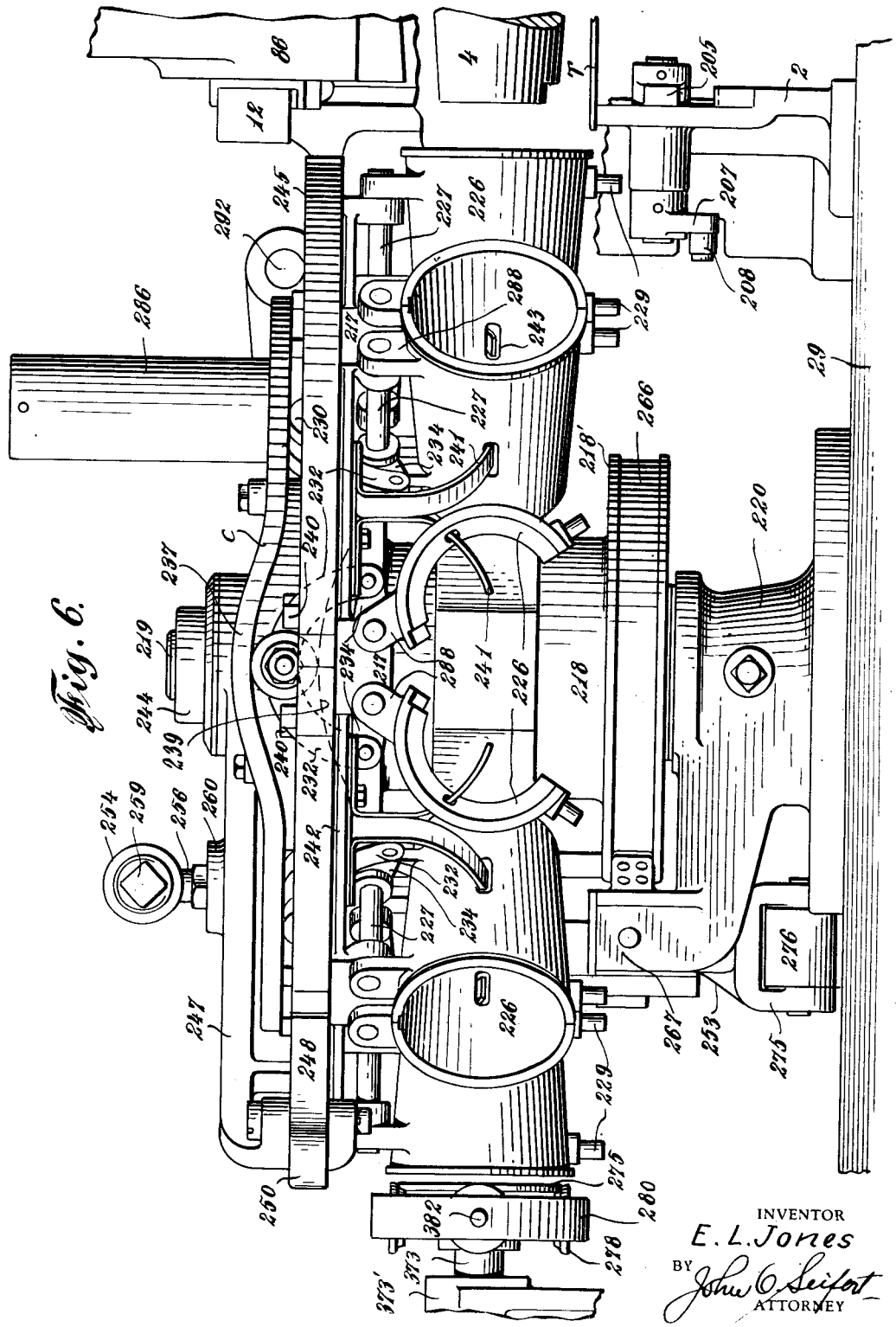

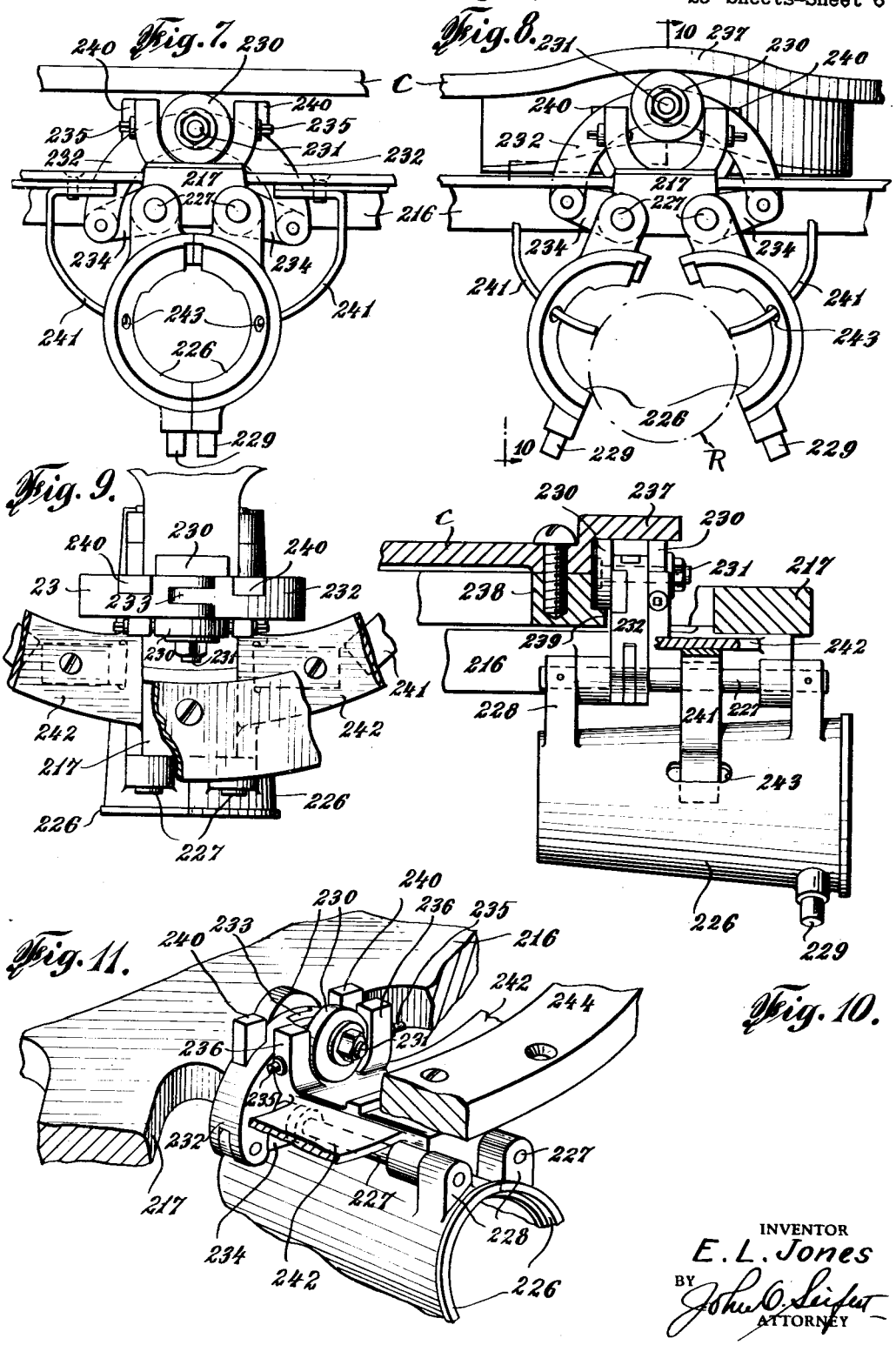

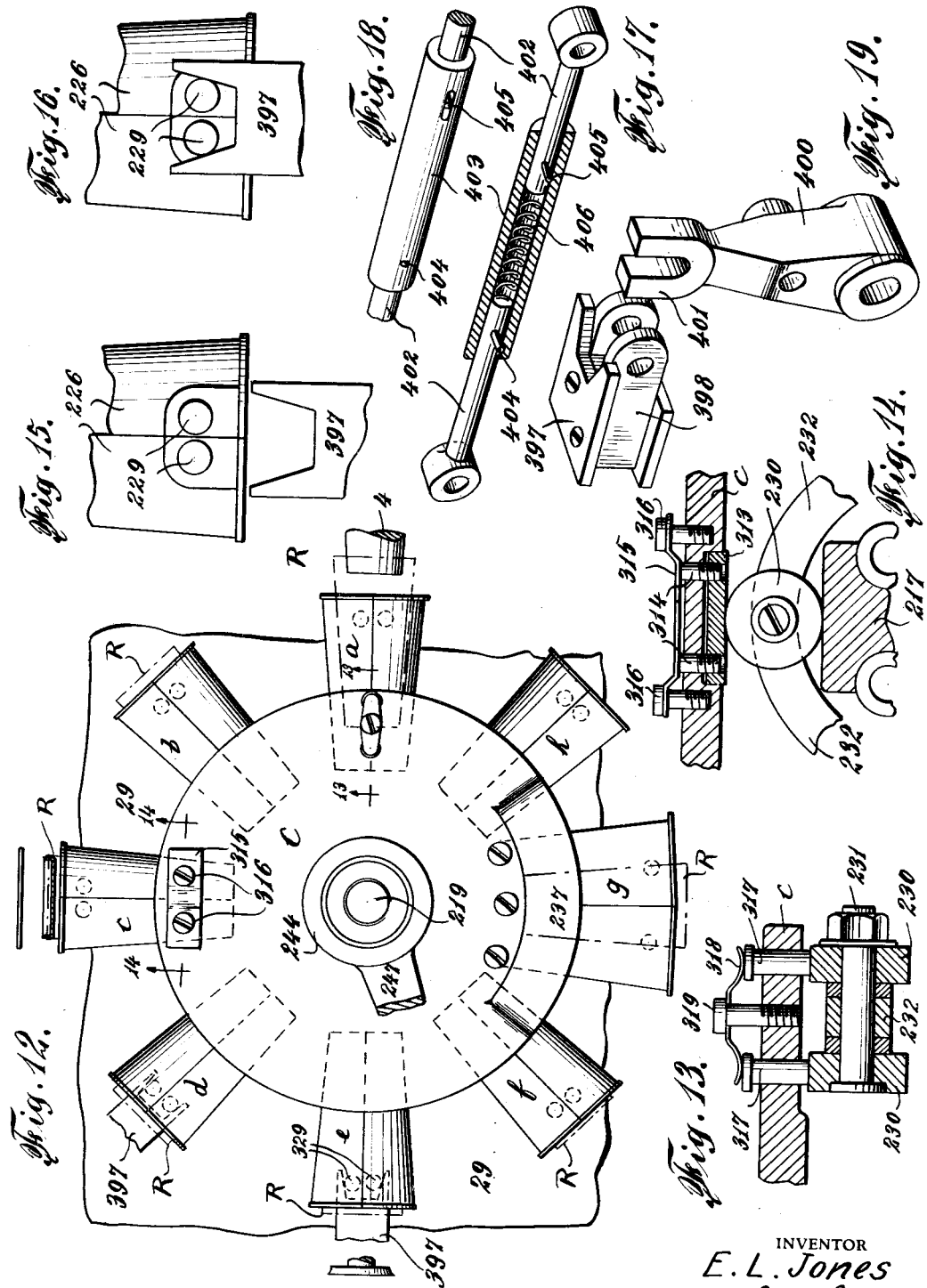

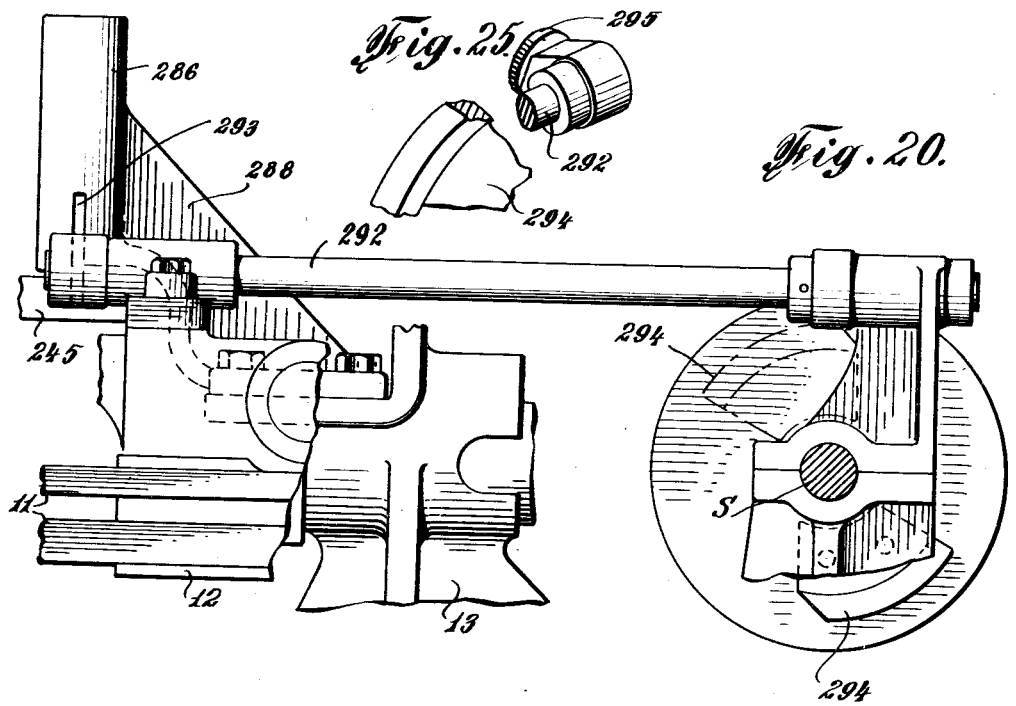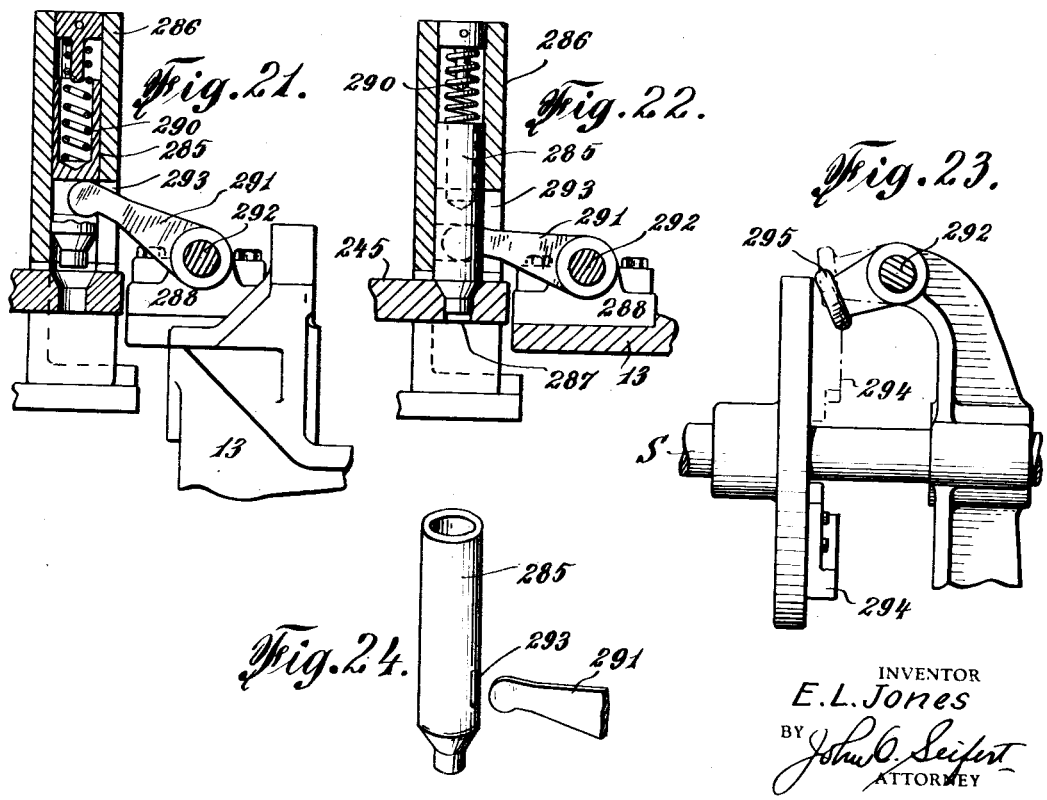

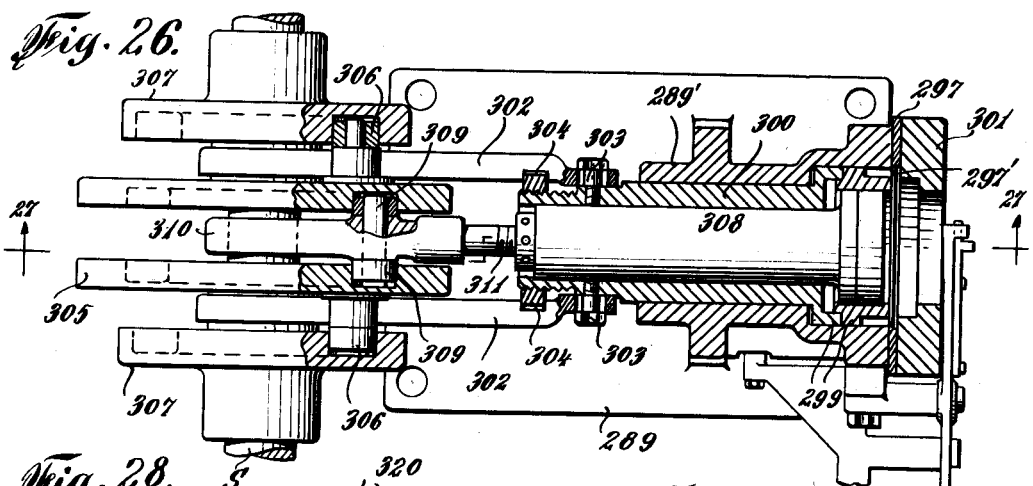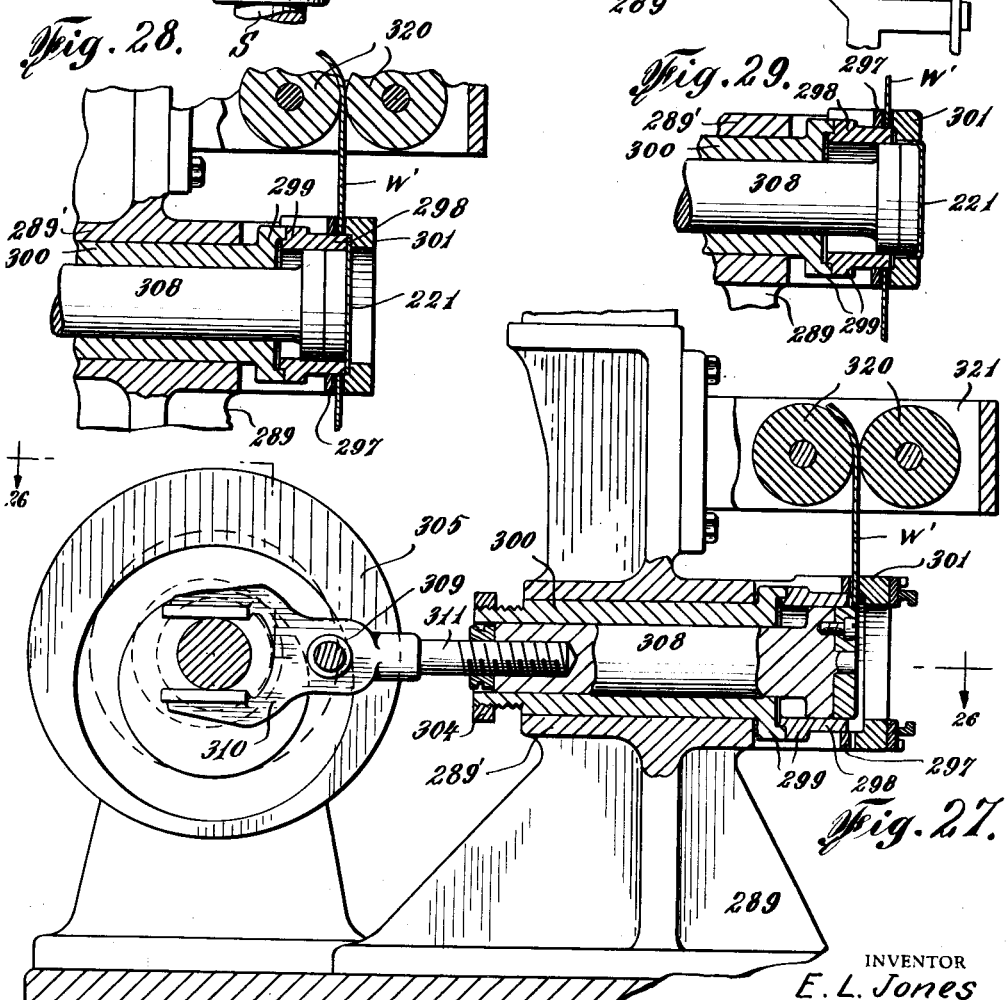

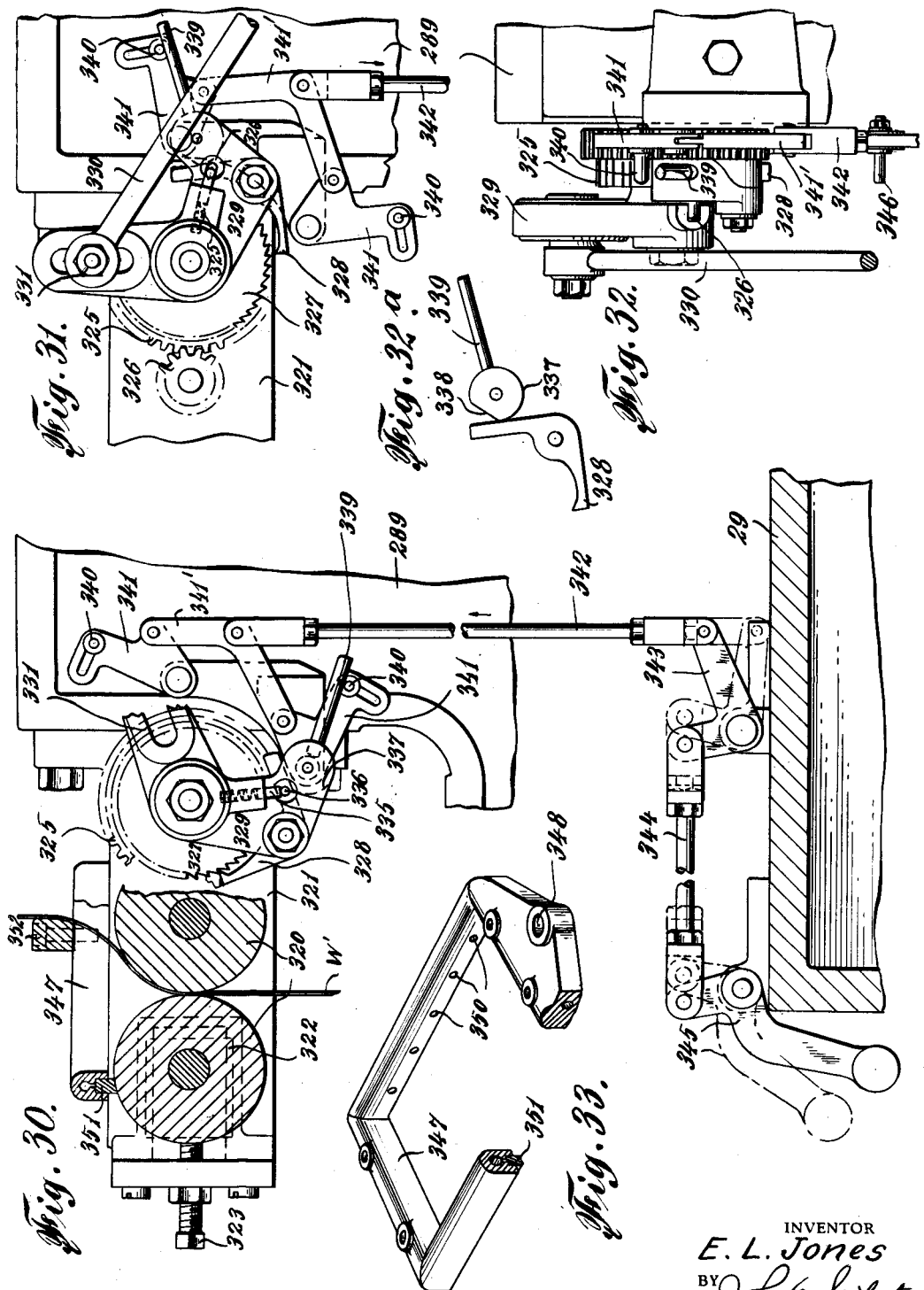

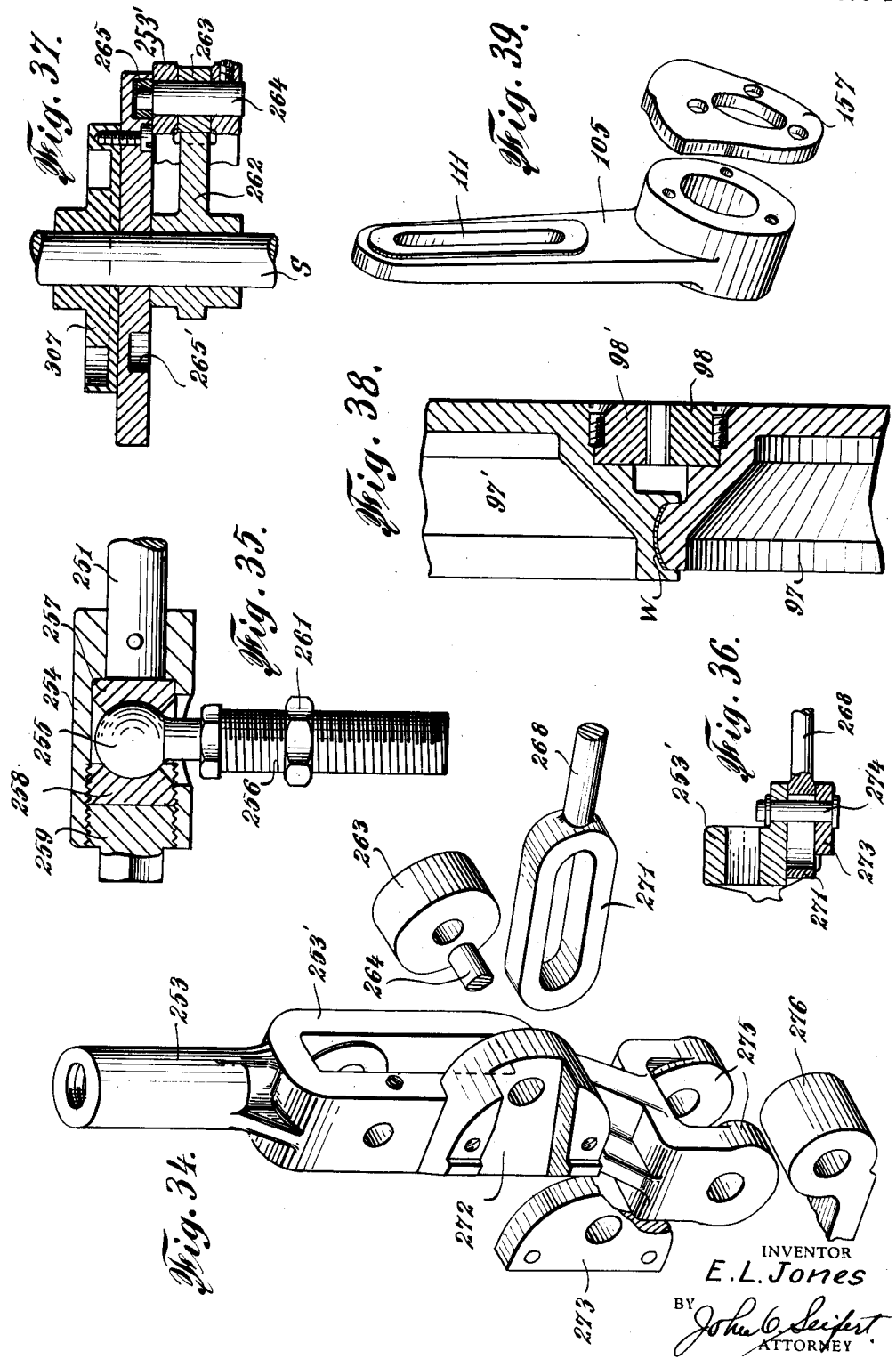

July 11, 1933.  E. L. JONES  1,917,374
RECEPTACLE MAKING APPARATUS
Filed Aug. 21, 1928  29 Sheets-Sheet 12

INVENTOR
E. L. Jones
BY
ATTORNEY

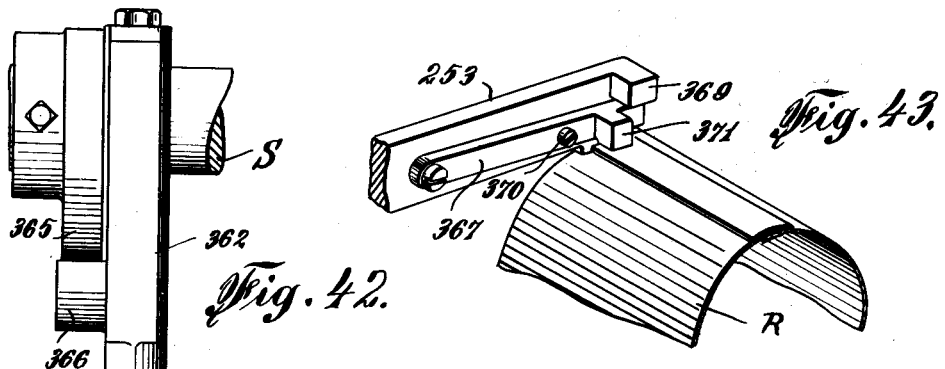
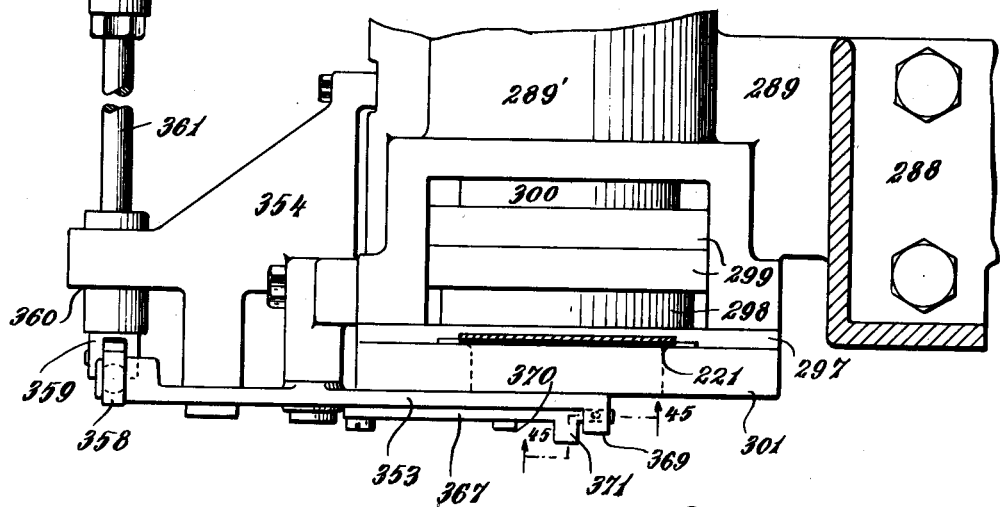
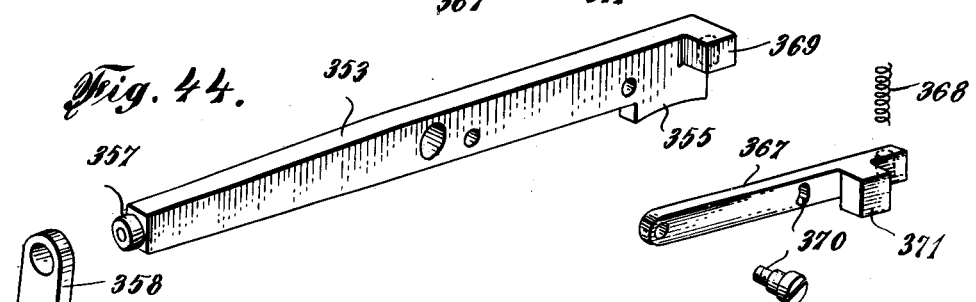
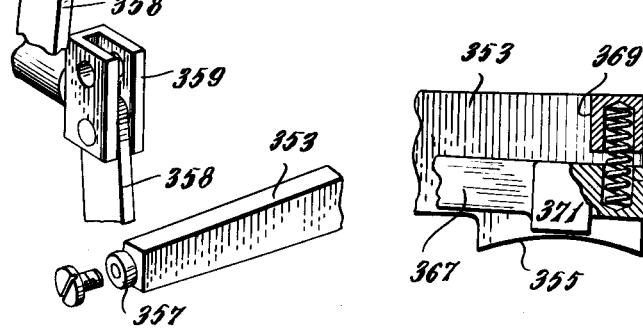

July 11, 1933. E. L. JONES 1,917,374
RECEPTACLE MAKING APPARATUS
Filed Aug. 21, 1928 29 Sheets-Sheet 14
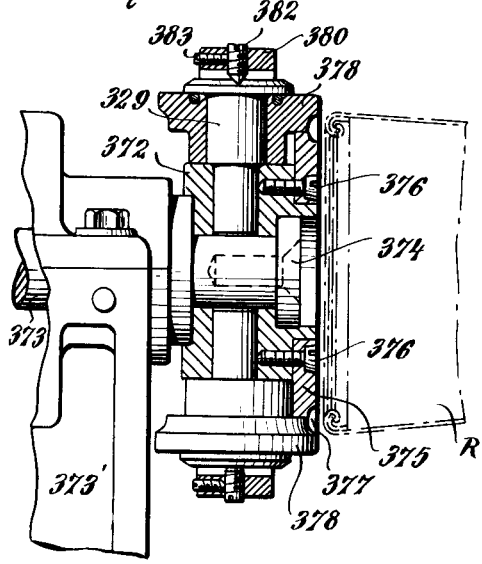
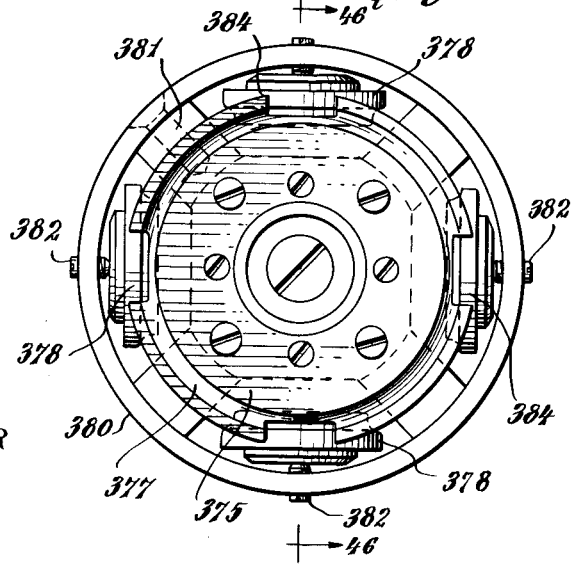
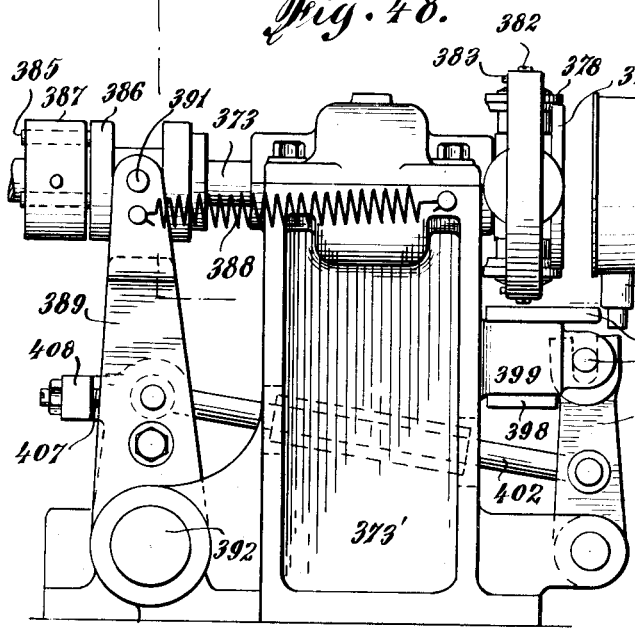
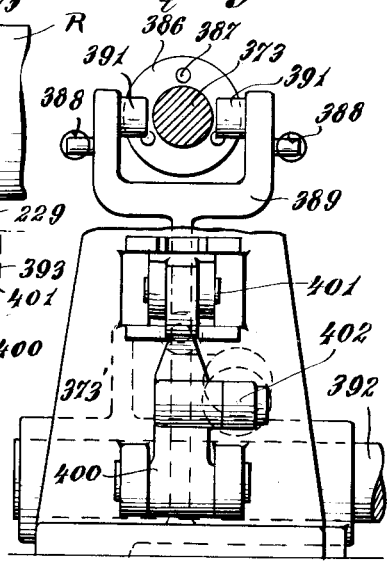
INVENTOR
E. L. Jones
BY John O. Seifert
ATTORNEY

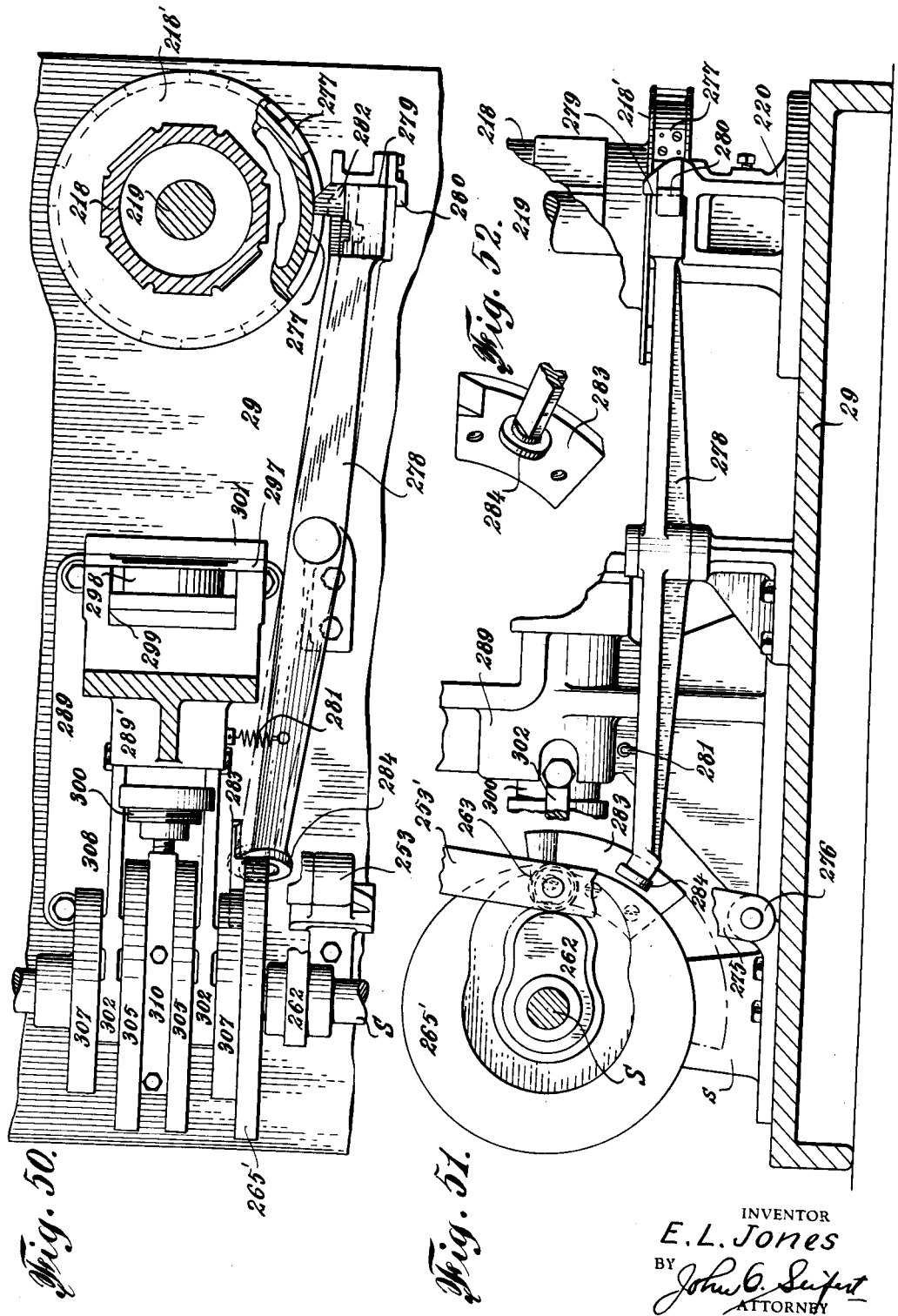

July 11, 1933.	E. L. JONES	1,917,374
RECEPTACLE MAKING APPARATUS
Filed Aug. 21, 1928	29 Sheets-Sheet 16
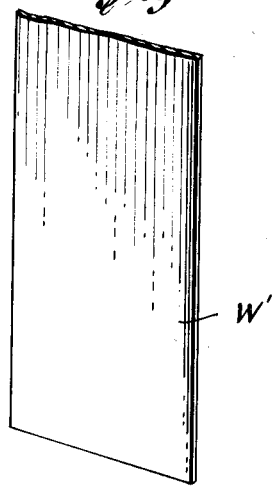
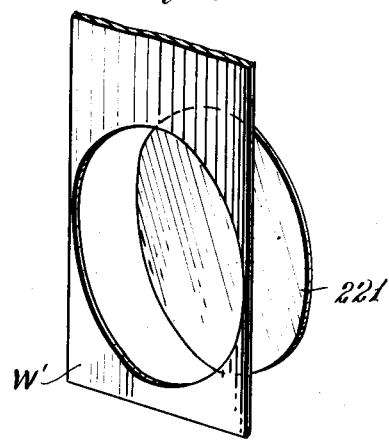
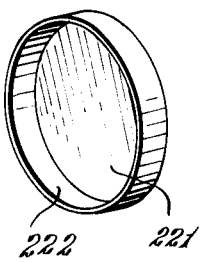
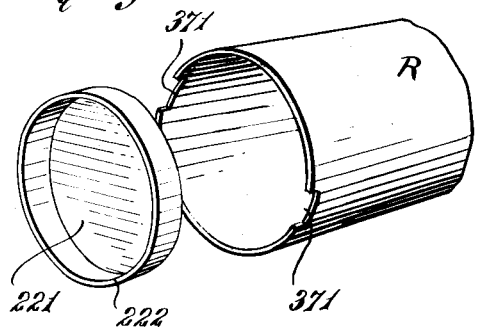
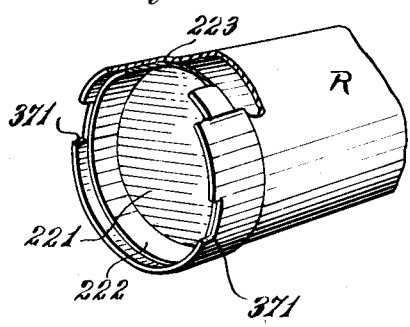
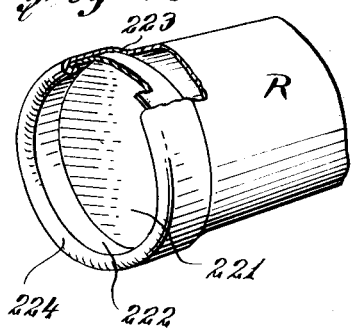
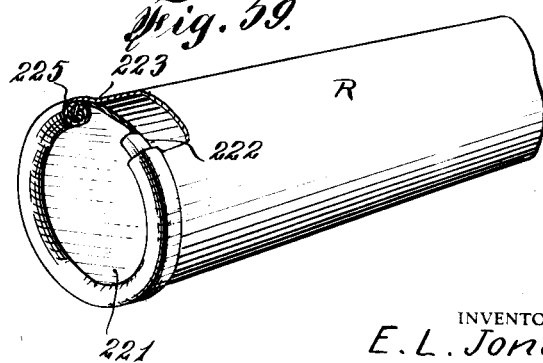
INVENTOR
E. L. Jones
BY John O. Seifert
ATTORNEY

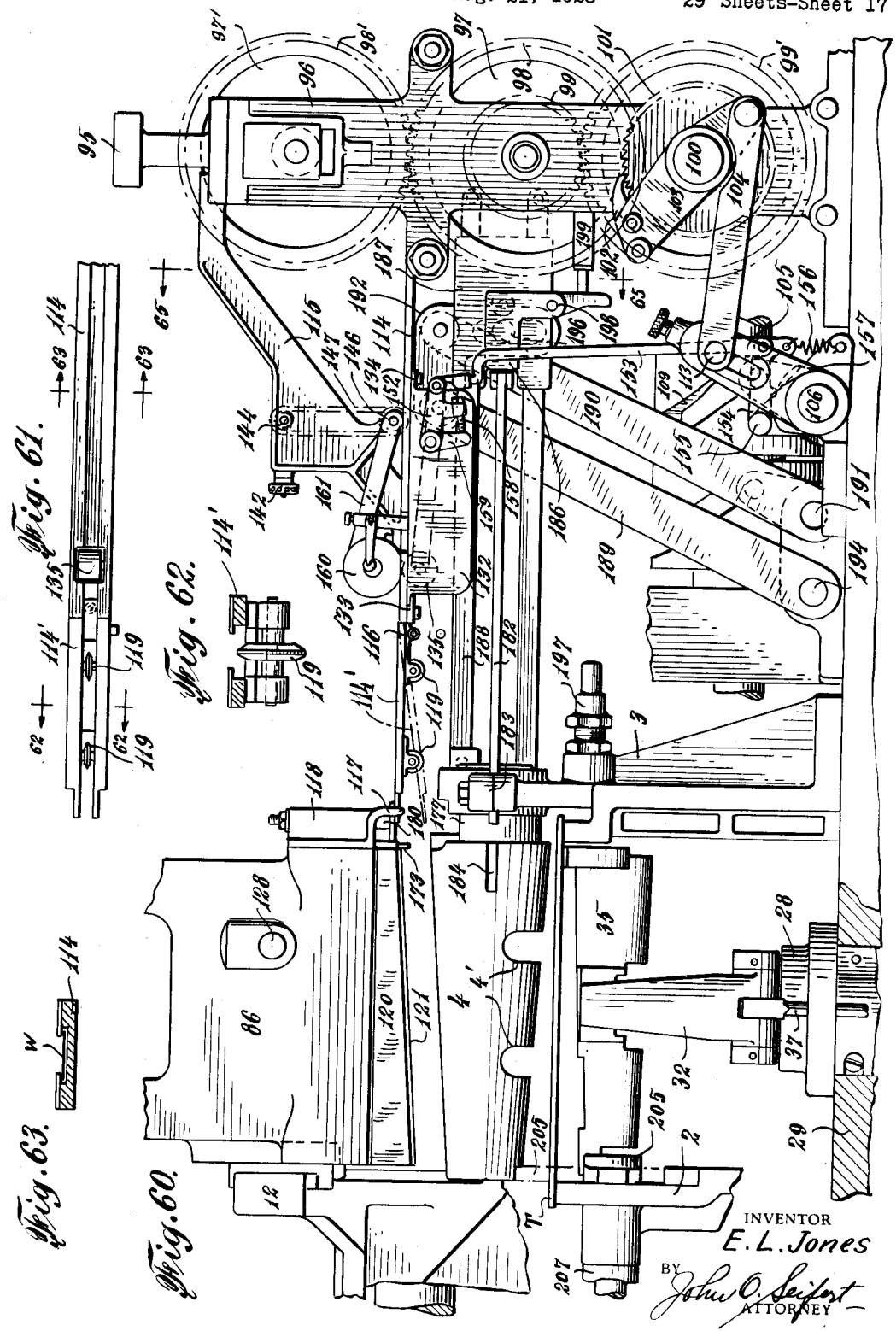

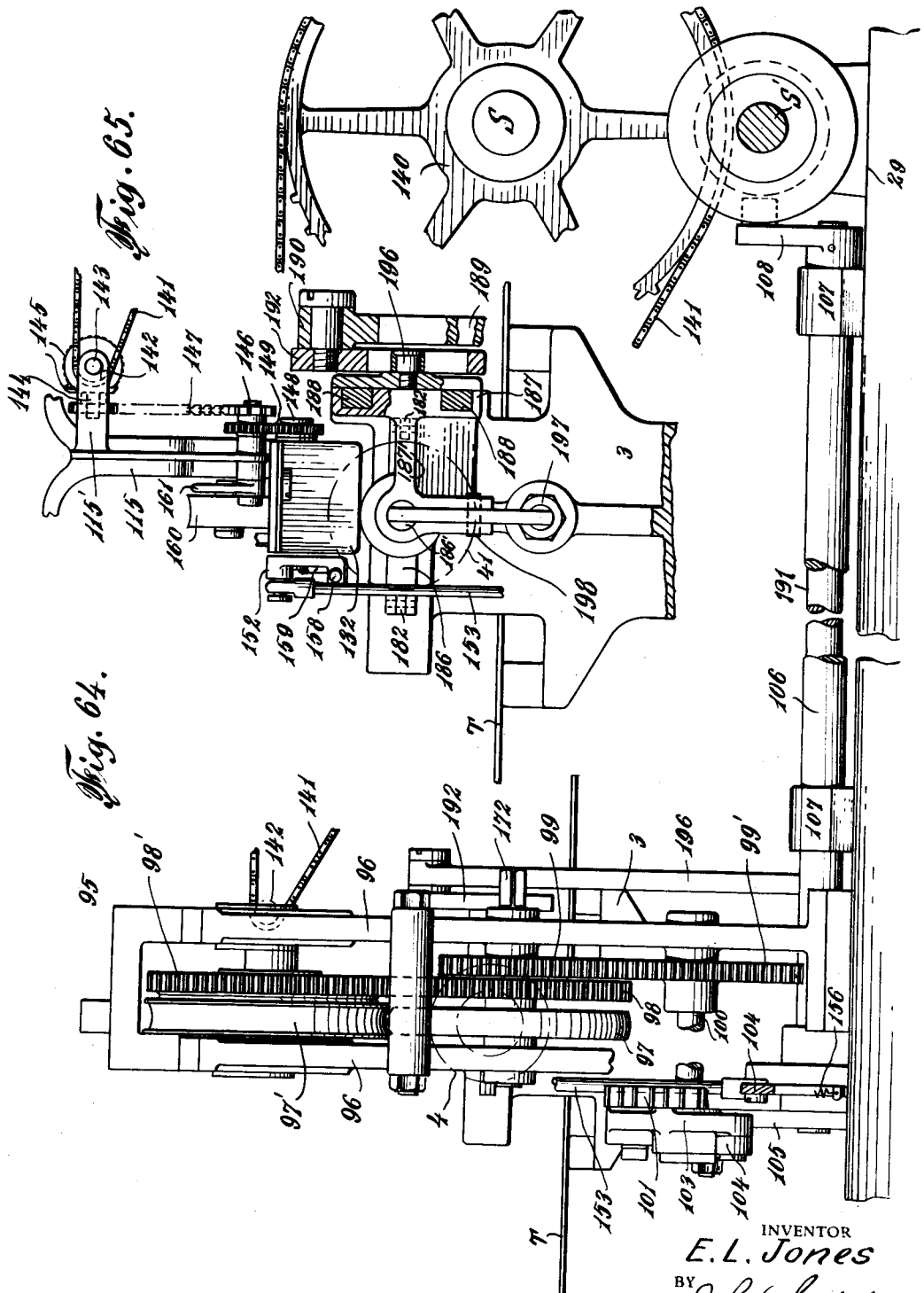

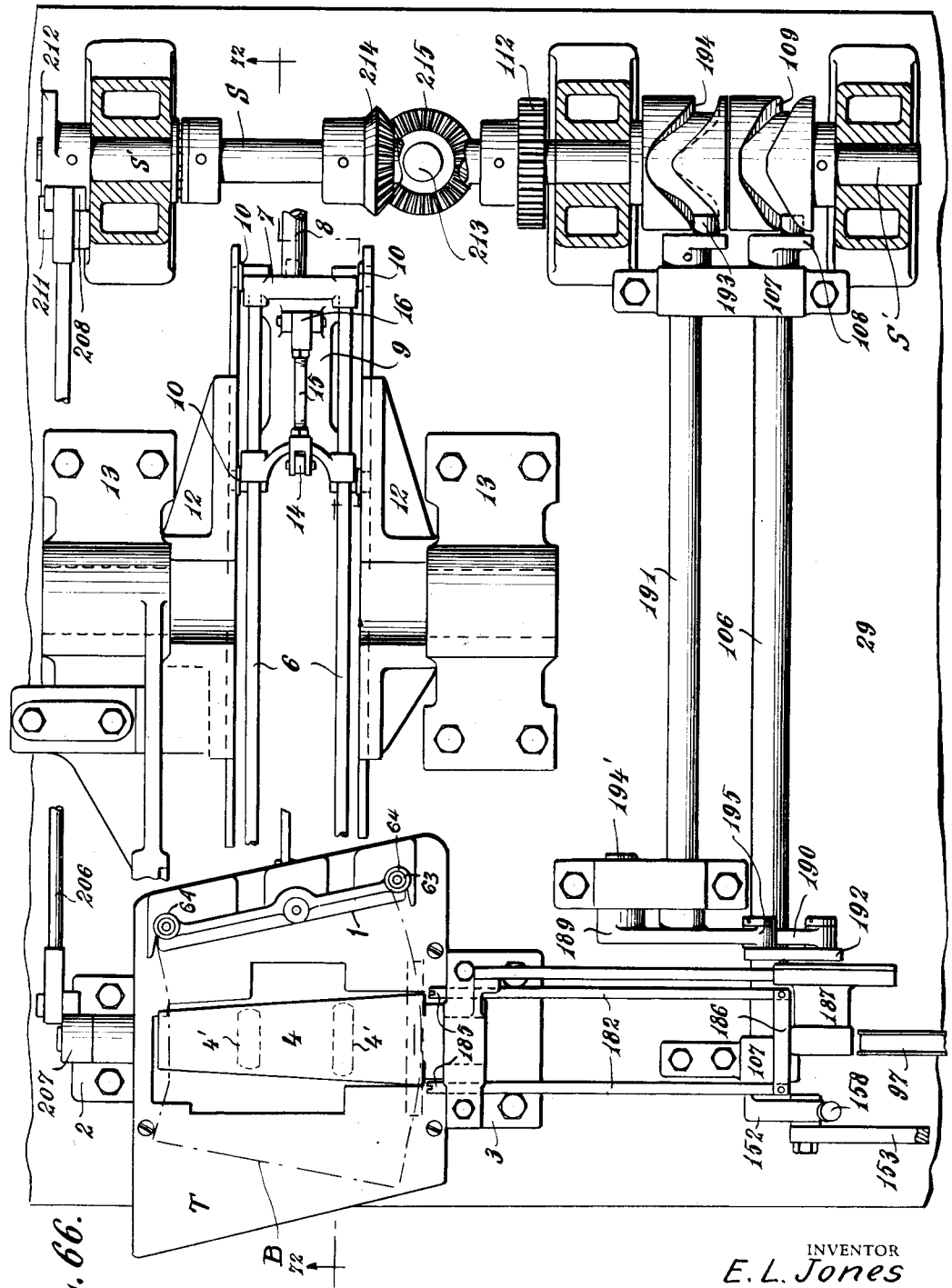

July 11, 1933.  E. L. JONES  1,917,374
RECEPTACLE MAKING APPARATUS
Filed Aug. 21, 1928  29 Sheets-Sheet 21
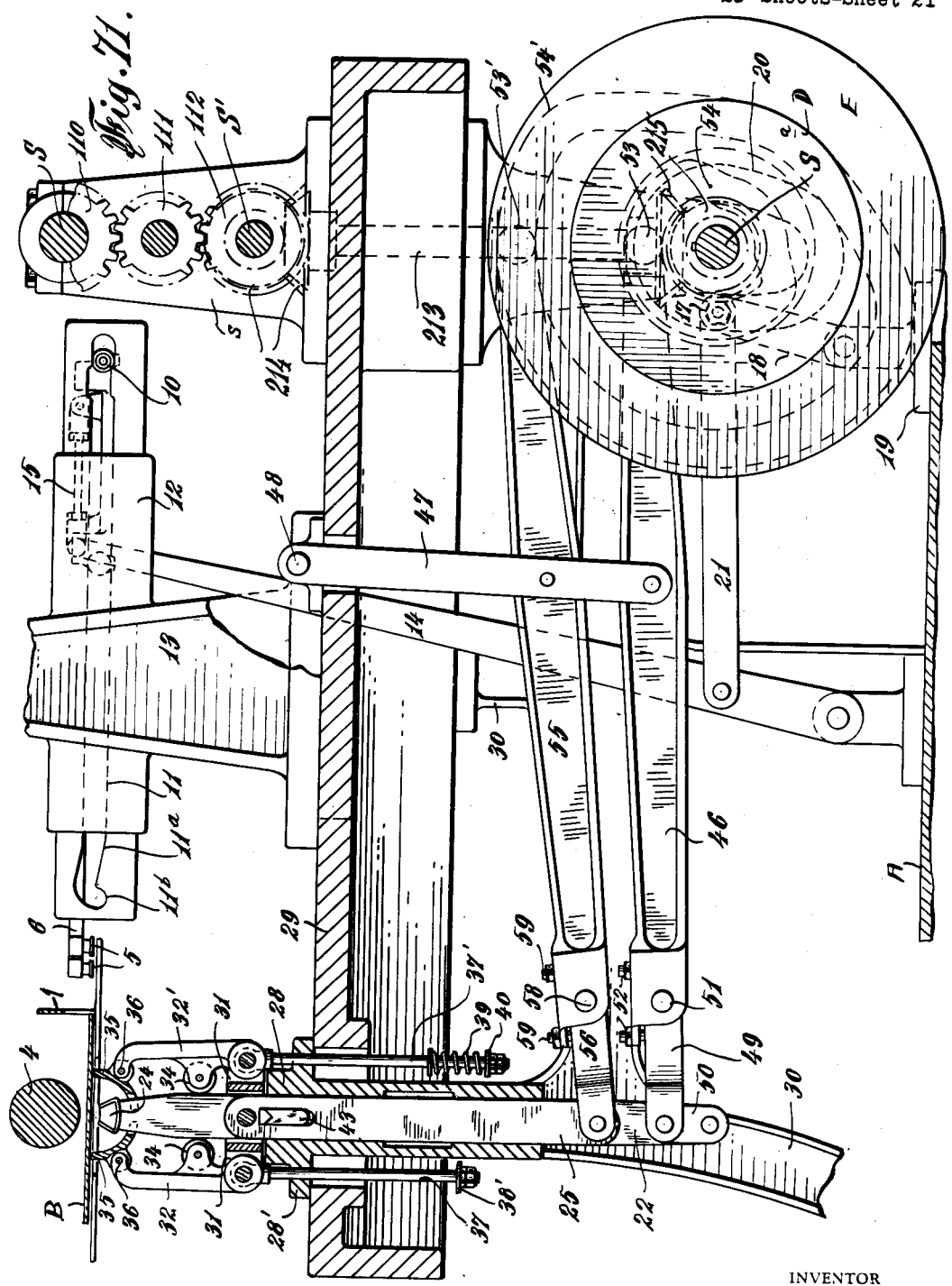
INVENTOR
E. L. Jones
BY
John O. Seifert
ATTORNEY

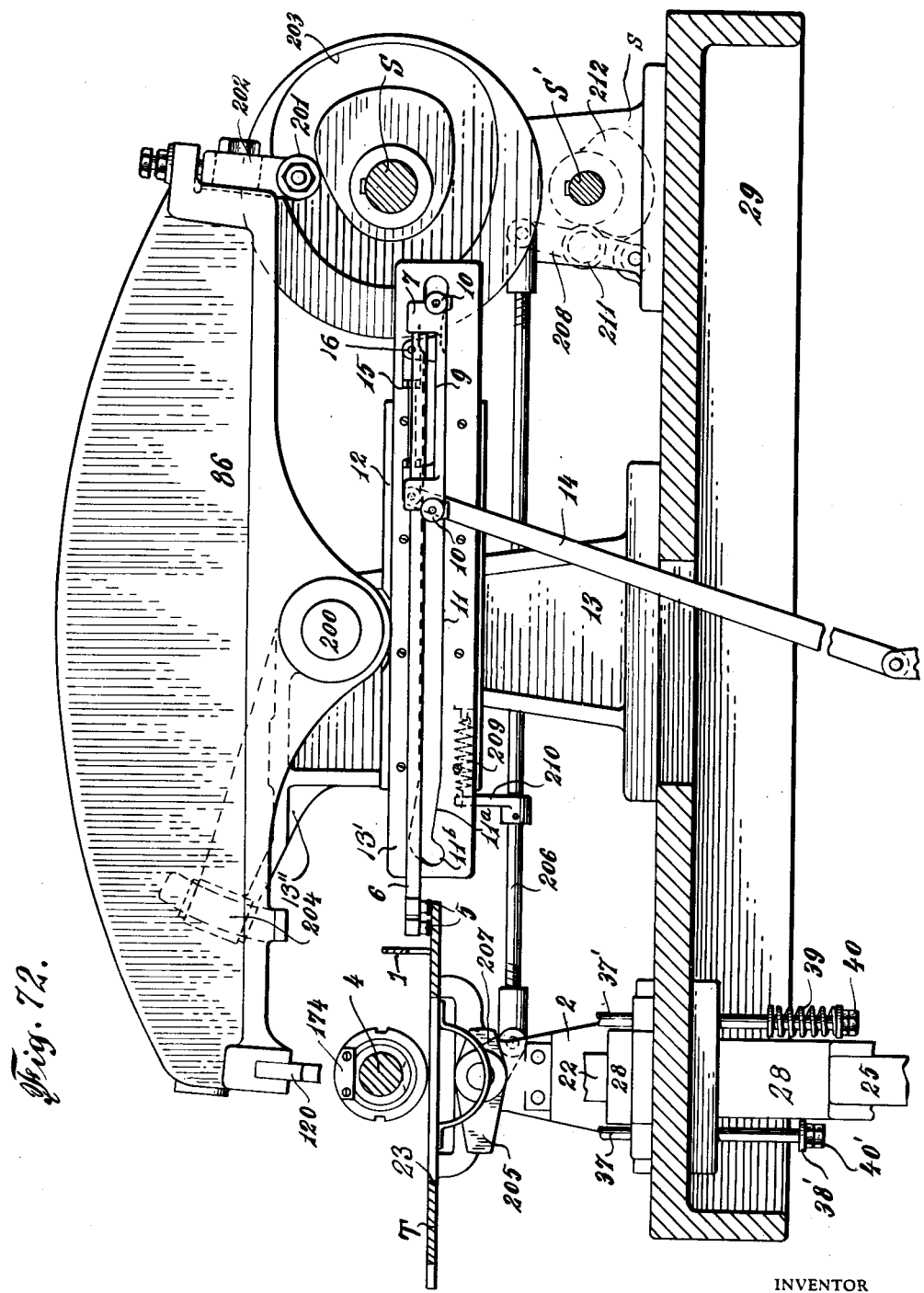

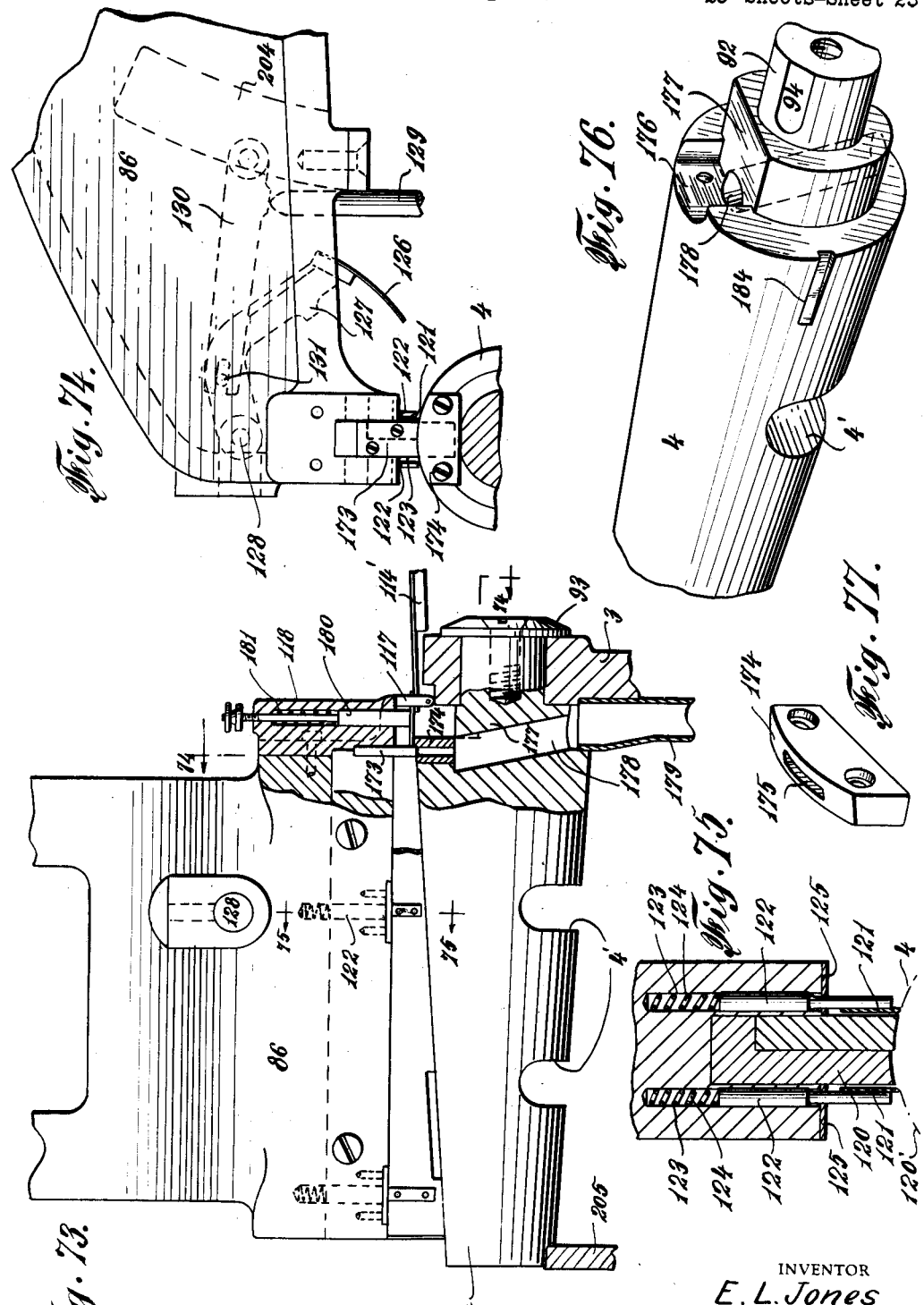

July 11, 1933.   E. L. JONES   1,917,374
RECEPTACLE MAKING APPARATUS
Filed Aug. 21, 1928   29 Sheets-Sheet 24
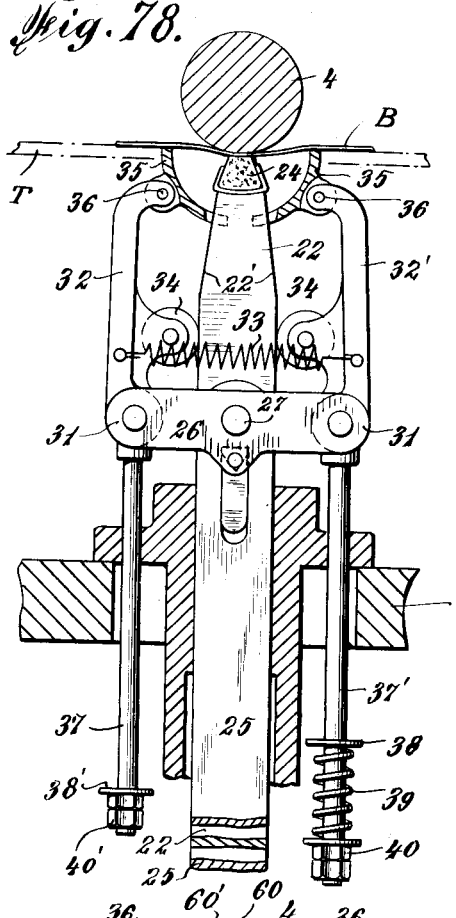
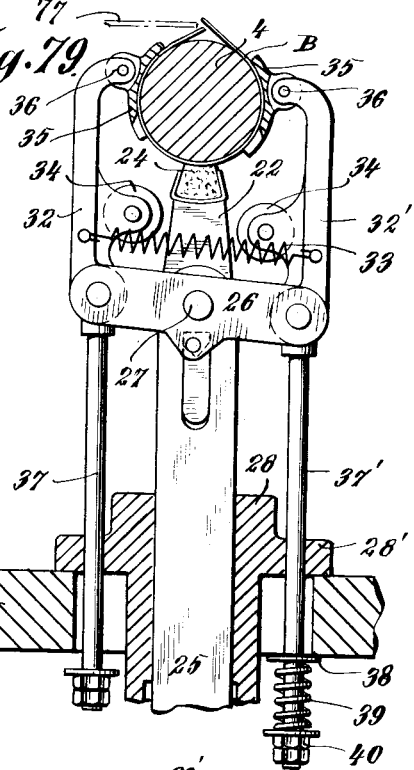
INVENTOR
E. L. Jones
BY
John O. Seifert
ATTORNEY July 11, 1933.  E. L. JONES  1,917,374
RECEPTACLE MAKING APPARATUS
Filed Aug. 21, 1928   29 Sheets-Sheet 25
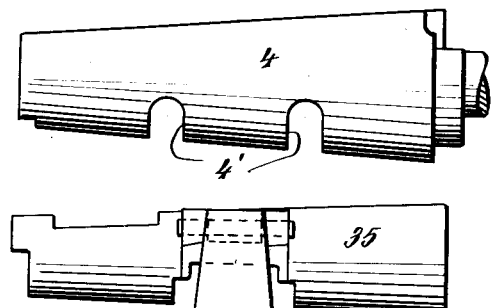
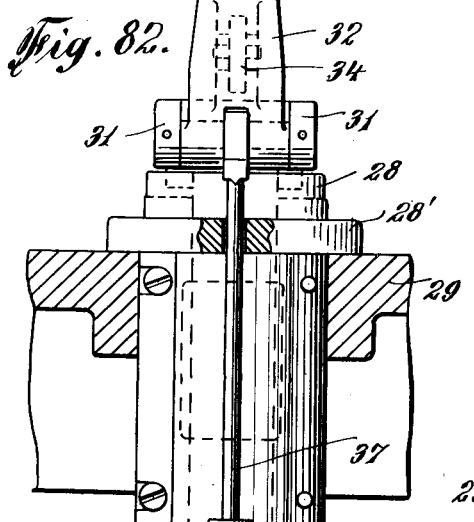
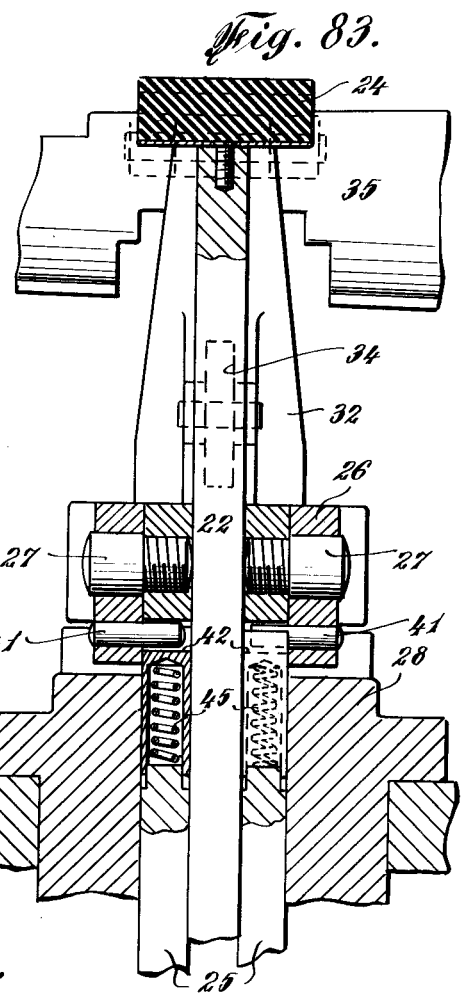
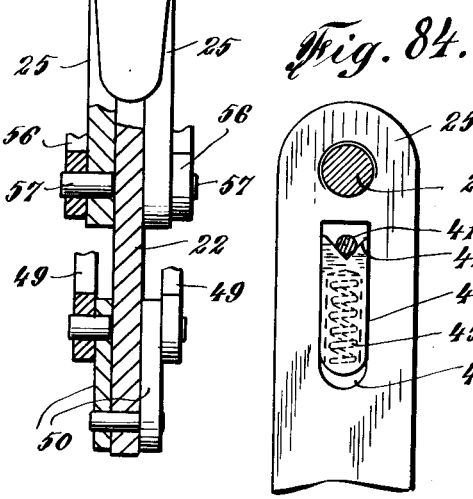
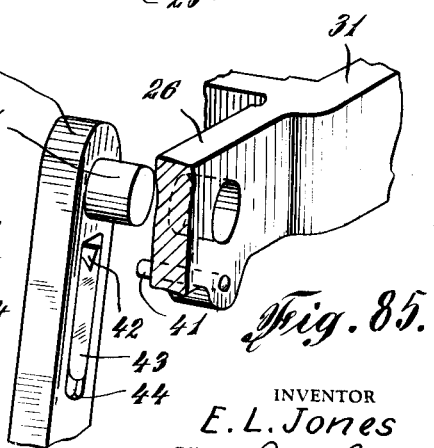
INVENTOR
E. L. Jones
BY
John O. Seifert
ATTORNEY

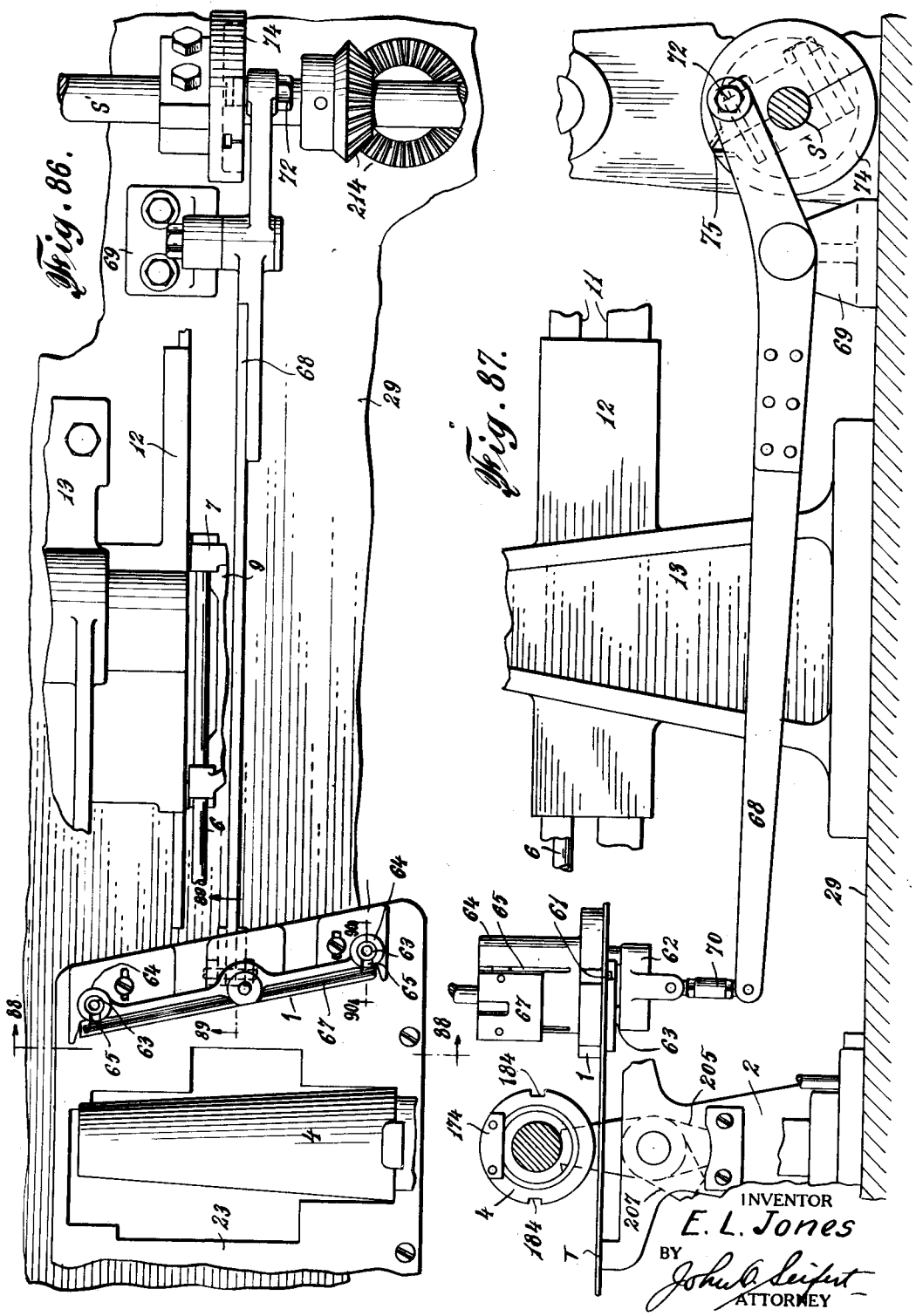

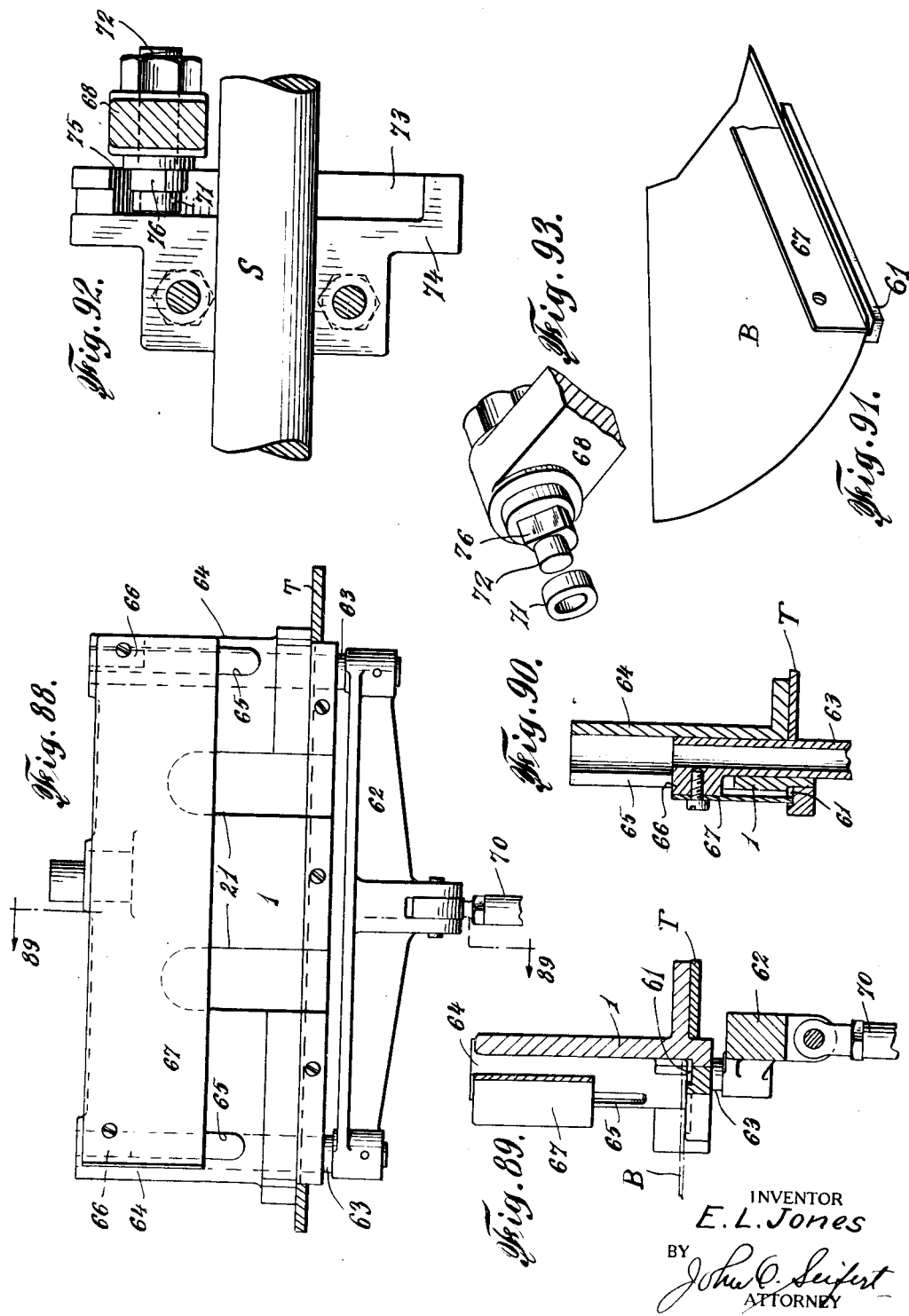

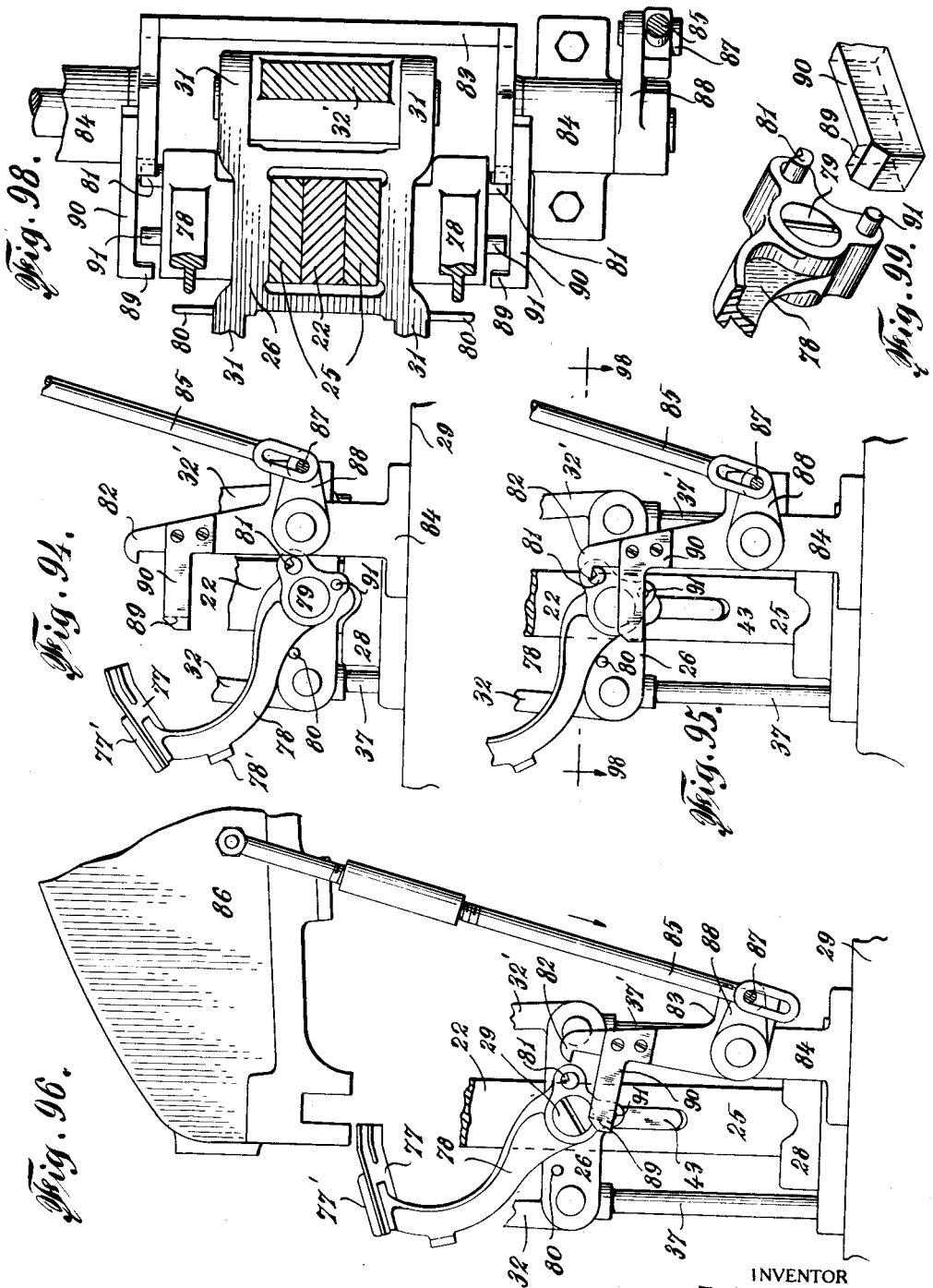

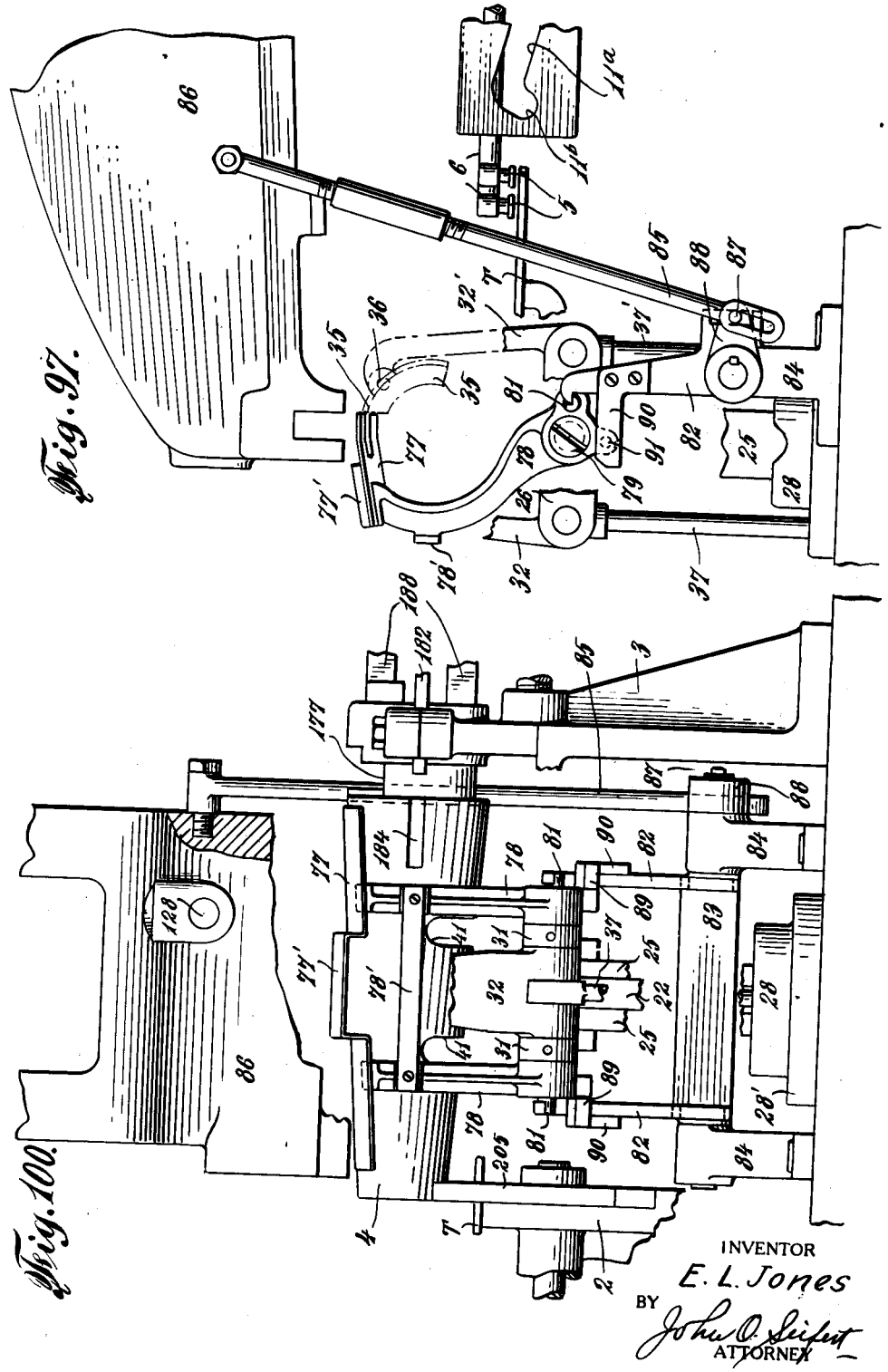

Patented July 11, 1933

1,917,374

UNITED STATES PATENT OFFICE

ELLIS L. JONES, OF LONG ISLAND CITY, NEW YORK, ASSIGNOR, BY MESNE ASSIGNMENTS, TO AMERICAN SEALCONE CORPORATION, OF NEW YORK, N. Y., A CORPORATION OF NEW YORK

RECEPTACLE MAKING APPARATUS

Application filed August 21, 1928. Serial No. 301,010.

This invention relates to apparatus for making receptacle or container bodies and for forming a head or closure for the end of the receptacle or container body and secure the same therein to form a receptacle or container, the apparatus being of the type disclosed by Letters Patent No. 1,466,211 issued August 28th, 1923, wherein a sheet or blank of paper is wrapped around a mandrel and secured while on the mandrel at the longitudinal marginal portions by applying an adhesive strip or web thereto to form the receptacle body, which body is ejected from the mandrel and delivered to one of a series of holders equi-distantly spaced about a carrier intermittently operative to successively present the holders with receptacle bodies therein to means to stamp a disk from a web, peripherally flange the disk and engage the flanged disk in the end of a receptacle body in a holder to serve as a closure therefor. The carrier is then rotated to advance the holder with the receptacle body having the flanged disk engaged therein to means to secure the flanged disk in the receptacle body by crimping or rolling together the disk flange and contiguous portion of the receptacle body, when the carrier is further rotated to advance the holder with the receptacle to position to eject the receptacle from the holder, and it is the primary object of the invention to improve the general construction and arrangement of apparatus of this character to render the same more efficient in operation and to produce a better receptacle.

It is an object of the invention to provide improved means for supporting and gauging a receptacle blank relative to the mandrel, to offset a longitudinal marginal portion of the blank while gauged on the support and which offset portion is adapted to be lapped over the other marginal portion when the receptacle blank is wrapped around the mandrel to provide an even surface for the applying of an adhesive strip thereto in securing the blank at said longitudinal marginal portions to form the receptacle body, and means to guide the blank as it is wrapped around the mandrel, and to improved means to wrap the blank about the mandrel.

Another object of the invention relates to improved means for feeding and guiding a predetermined length of a gummed strip or web over the marginal portions of the blank wrapped around the mandrel, to means to render the gummed surface of the strip adhesive during the feeding thereof, and means to sever the fed portion of the strip.

Another object of the invention relates to improved means for ejecting a formed receptacle body from the mandrel.

A further object of the invention relates to improved means to impart intermittent rotative movement to the carrier for the holders for the receptacle bodies to successively station the holders relative to means to stamp a disk from a web, and peripherally flanged the disk, engage said disk into the projecting end of a receptacle body in a holder and simultaneously with the engaging of the flanged disk in the receptacle body displacing the end portion of the receptacle body projecting from the holder longitudinally and laterally to arrange the receptacle body with a shoulder for the disk to seat against, to means to hold a receptacle body in a holder and a closure disk in the receptacle body during the receding movement of punches constituting a part of the closure forming means, to means to and an improved method of interfolding the end portion of the receptacle body with the disk flange to secure the disk in the receptacle body, and means to hold the carrier against movement during the periods of rest thereof.

A further object of the invention relates to improved means for feeding a paper web intermittently to the disk closure forming means and the provision of means to render the material of the web pliable.

Still another object of the invention relates to improved means for reciprocating spinning heads toward and away from receptacle bodies in holders stationed relative to said heads and having flanged closure disks engaged therein to interfold the end portion of the receptacle bodies with the flanges of the closure disks, and means operative from said reciprocatory means for the spinning heads to lock the holder sections in closed position during the spinning operation and release said sections after the spinning operation is completed.

Other objects and advantages will hereinafter appear.

In the drawings accompanying and forming a part of this application Figure 1 is a plan view of apparatus illustrating an embodiment of the present invention.

Figure 2 is a sectional end elevation taken substantially on the line 2—2 of Figure 1 looking in the direction of the arrows.

Figure 3 is a sectional detail view of brake mechanism for retarding the movement of the carrier for the holders for the receptacle bodies and a part of its actuating means.

Figure 40:
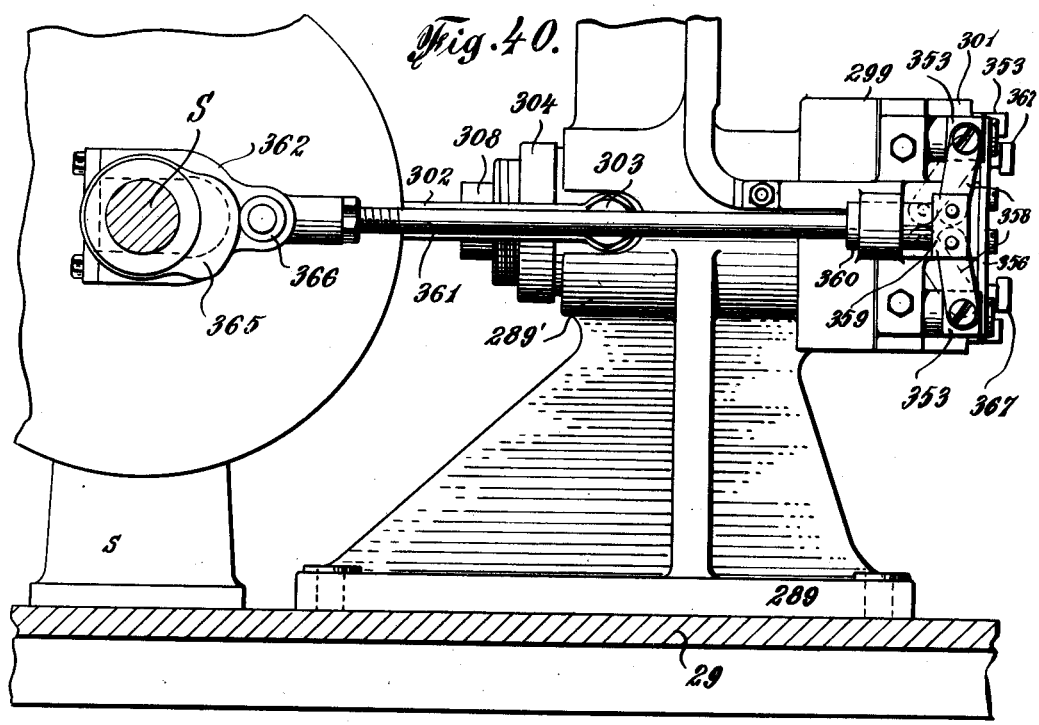

Figure 4 is a plan view, on an enlarged scale, of the rotating means for the holder carrier and showing in section the connection of the drive shaft with actuating means for the means to stamp a disk from a web, flange the same to form a closure for a receptacle end and the engaging of the same in a receptacle body in a holder stationed relative thereto, and the actuating means for the feeding means to feed a web to said closure forming means.

Figure 5 is a cross sectional view, on an enlarged scale, taken on the line 5—5 of Figure 4 to show the mounting of the holder carrier, its rotating means and the supporting of the holders.

Figure 6 is an elevational view, on an enlarged scale, looking at the right of Figure 4 of the carrier with the holders mounted thereon, one holder being stationed relative to the means to form a receptacle body to receive a receptacle body therefrom, another relative to the means for interfolding the end of the receptacle body and the flange of a disk closure inserted therein to secure the closure in the receptacle body, and another holder relative to and in the receptacle ejecting position.

Figure 7 is an end elevation of a holder for a receptacle body, showing the holder sections in closed position, and means associated with the holder sections relative to a cam plate to maintain the holder sections in closed position, and also showing means in relation thereto to release a receptacle from the holder sections operative when the holder sections are moved to open position.

Figure 8 is a view similar to Figure 7 but showing the holder sections in open position and the manner of operation of the ejecting means co-operating with the holder to release a receptacle therefrom.

Figure 9 is a plan view of the holder looking at the top of Figure 7.

Figure 10 is a sectional side elevation of the holder taken on the line 10—10 of Figure 8 looking in the direction of the arrows.

Figure 11 is a fragmentary perspective view of a holder and showing the means for supporting the same from the carrier and the actuating means therefor to move the holder sections to open and closed positions.

Figure 12 is a plan view of a cam for controlling the closing and opening movements of the holder sections and showing in a diagrammatic manner the stations relative to which the holders are successively positioned by the rotation of the carrier, and also showing means at one station to lock the holder sections in closed position during the operation of means for interfolding the contiguous portions of the closure flange and receptacle body.

Figure 13 is a sectional view, on an enlarged scale, taken on the line 13—13 of Figure 12 looking in the direction of the arrows, and showing compensating means arranged in the cam plate relative to the receptacle body receiving station of the holders and showing cam following rollers associated with the actuating means for the holder sections in relation thereto.

Figure 14 is a cross sectional view, on an enlarged scale, taken on the line 14—14 of Figure 12 showing compensating means arranged in the cam plate relative to the station at which the means are arranged for forming the closure disk and showing the cam followers associated with the actuating means for the holder sections in relation to said compensating means.

Figure 15 is a view of a portion of the holder sections looking at the bottom to show the means for releasably locking the holder sections in closed position during the operation of the means to interfold contiguous portions of the receptacle end and the flange of a disk inserted therein to secure the disk in the receptacle body, and showing the locking means in released position.

Figure 16 is a view similar to Figure 15 but showing the locking means in locking position.

Figure 17 is a perspective view, partly in section, of a yielding extensible rod for connecting the locking means to retain the holder sections in closed position with actuating means therefor.

Figure 18 is a perspective view of the intermediate portion of the rod shown in Figure 17.

Figure 19 is a perspective view of the locking means to retain the holder sections in closed position shown in Figures 15 and 16 and showing an actuating lever for said means in disassembled relation thereto.

Figure 20 is a side elevation of cam actuated means for releasing a locking detent from an opening in the holder carrier to permit rotation of said carrier.

Figure 21 is a view looking at the left of Figure 20 showing the locking detent and the housing in which it is slidably mounted in section to show the connection of the actuating means with the detent.

Figure 22 is a view similar to Figure 21 but showing the detent engaging in an opening in the carrier and holding the same against movement.

Figure 23 is a detail view looking at the right of Figure 20 to show the cam operated means of the detent releasing means.

Figure 24 is a perspective view of the carrier locking detent shown in Figures 21 and 22 and the connection of the actuating means therefor in disassembled relatiton to the detent.

Figure 25 is a perspective view of the cam follower connected with the locking detent actuating means and showing the same in relation to a portion of an actuating cam therefor.

Figure 26 is a cross sectional view of punch and die mechanism to stamp a disk from a web and flange the same taken on the line 26—26 of Figure 27 looking in the direction of the arrows, and showing the means in relation thereto for holding a receptacle body in a holder and a flanged disk in the receptacle body during the receding movement of punches of the punch and die mechanism.

Figure 27 is a sectional side elevation taken substantially on the line 27—27 of Figure 26 looking in the direction of the arrows and showing the punches of the punch and die mechanism approaching the terminus of the receding movement thereof, and also showing web feeding rollers in relation to said means.

Figure 28 is a view similar to the right hand end portion of Figure 27 but showing the punch as having stamped a disk from the web and the disk positioned relative to the portion of the punch and die mechanism to flange the disk and engage it in a receptacle body in a holder.

Figure 29 is a view similar to Figure 28 but showing the disk stamped from the web as having been flanged and in position preparatory to inserting the same in a receptacle body in a holder.

Figure 30 is a side elevation, partly in section, of means to feed the web to the punch and die mechanism and means operative to render said web feeding means operative and inoperative, and showing the feeding of the web relative to the means to apply a liquid thereto to render the web pliable.

Figure 31 is a view of the web feeding and actuating means and the means for rendering the same operative and inoperative and showing the parts in another position.

Figure 32 is an end elevation of the parts shown in Figure 31 looking at the right of said Figure.

Figure 32ª is a detail view of a part of the means for rendering the feed roller actuating means operative and inoperative.

Figure 33 is a perspective view, partly broken away, of a hollow frame relative to which the web is guided to the web feeding rollers adapted for connection of liquid supply means thereto and having perforations for delivering liquid therefrom to a web feeding roller for application to the web as it is fed.

Figure 34 is a perspective view of an operating lever with parts adapted to be mounted thereon, and shown in disassembled relation thereto, for connecting the holder carrier actuating means and brake actuating means with said lever.

Figure 35 is a side elevation, on an enlarged scale and partly in section, of a portion of a rod for connecting the lever shown in Figure 34 with the holder carrier actuating means, and showing the means for connecting said rod with said lever.

Figure 36 is a sectional detail view, on a reduced scale, to show the means and the manner of connecting a rod for the actuating means for the brake for the holder carrier with the lever shown in Figure 34.

Figure 37 is a sectional view taken on the line 37—37 of Figure 2 looking in the direction of the arrows to show cam mechanism on a drive shaft and cam followers carried by the lever shown in Figure 34 in operative relation to said cam mechanism.

Figure 38 is a sectional detail view of rollers for feeding an adhesive strip or web to the marginal portions of a receptacle blank wrapped around a mandrel of the receptacle body forming means.

Figure 39 is a detail view of parts of the means for rendering adhesive the gummed surface of the adhesive strip as it is fed relative to the marginal portions of the receptacle blank wrapped around the mandrel.

Figure 40 is a side elevation of the actuating means for the means mounted in relation to the punch and die mechanism for forming and inserting a flanged disk in a receptacle body in a holder to hold a receptacle body in a holder and a flanged disk in the receptacle body during the receding movement of the punches of said punch and die mechanism.

Figure 41:
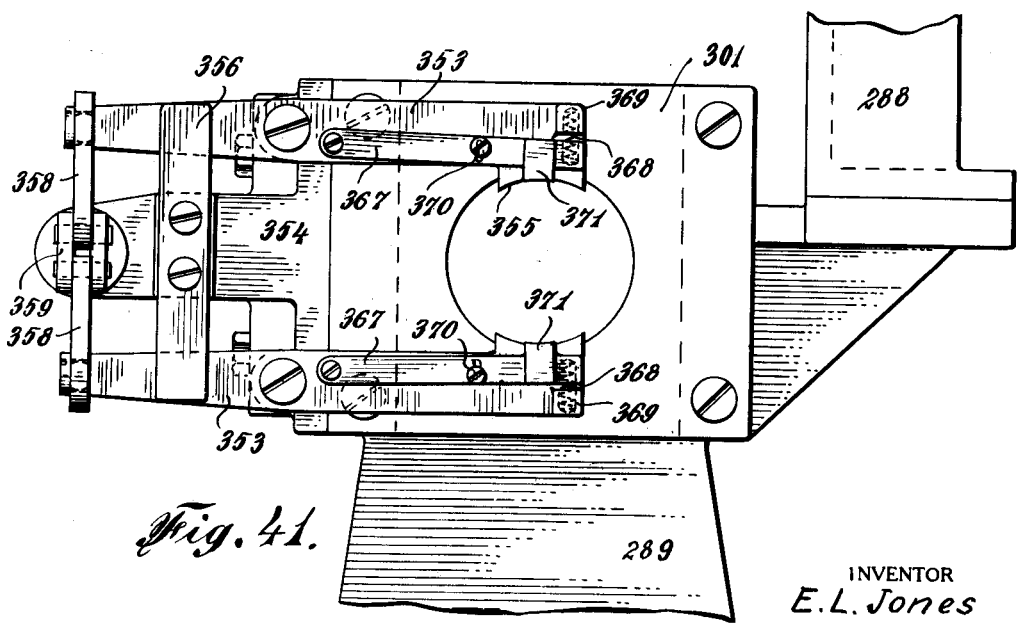

Figure 41 is an end elevation, on an enlarged scale, looking at the right of Figure 40.

Figure 42 is a plan view looking at the top of Figures 40 and 41.

Figure 43 is a perspective view showing a part of the means for holding a receptacle body in a holder and closure disk in the receptacle in relation to part of a receptacle.

Figure 44 is a perspective view of the parts, disassembled, of the means for holding the receptacle body in a holder and a closure disk in a receptacle body.

Figure 45 is a sectional view, on an enlarged scale, taken on the line 45—45 of Figure 42 looking in the direction of the arrows.

Figure 46 is a sectional side elevation taken on the line 46—46 of Figure 47 looking in the direction of the arrows, of a spinning head for folding a portion of the receptacle body over the edge of the disk flange and interfolding the disk flange with the receptacle body, and showing the same in relation to a receptacle body with an inserted flanged disk.

Figure 47 is a front elevational view of the spinning head looking at the right of Figure 46.

Figure 48 is a side elevation of the mounting for the spinning head shown in Figure 46 and means to impart axial movement thereto toward and away from a receptacle body carrying holder stationed in relation thereto, and showing the means for releasably locking the holder sections closed during the operation of the spinning head to interfold the receptacle body with the flange of the closure disk and the means for actuating said locking means from the spinning head reciprocating means.

Figure 49 is a sectional end elevation taken on the line 49—49 of Figure 48 looking in the direction of the arrows.

Figure 50 is a plan view, partly in section, of modified means for retarding the rotation of the holder carrier at the terminus of its movement and to hold the same against movement, and showing a cam on the drive shaft for actuating the same to move it into holder carrier retarding and holding position.

Figure 51 is an elevational view of the parts shown in Figure 50 looking at the bottom thereof.

Figure 52 is a detail view in perspective to show the cam follower carried by the holder carrier retarding and holding means shown in Figures 50 and 51 in relation to a cam on the drive shaft.

Figure 53 is a perspective view of a portion of the web from which the closure disks are stamped.

Figure 54 is a view similar to Figure 53 showing the manner of stamping a disk from the web and the disk in relation thereto.

Figure 55 is a perspective view of a flanged closure formed from the disk stamped from the web shown in Figure 54.

Figure 56 is a perspective view showing a flanged closure disk in relation to the end portion of a receptacle body, partly broken away, to which it is to be applied and showing the receptacle body arranged with opposite cut-out portions for the engagement of the means to retain a closure in the receptacle body during the receding movement of the punches of the punch and die mechanism for forming the receptacle closure.

Figure 57 is a perspective view, partly broken away, of a portion of a receptacle body with a flanged disk engaged therein with a portion of the receptacle body extended beyond the disk flange.

Figure 58 is a perspective view, partly broken away, of a portion of a receptacle body with a flanged closure inserted therein and with the extended portion of the receptacle body folded over the edge of the flange of the closure disk effected in the primary operation of a spinning head in securing the closure in the receptacle body and preparatory to interfolding the receptacle body and the disk flange.

Figure 59 is a perspective view, partly broken away, to show the manner of the final interfolding of the receptacle body.

Figure 60 is a side elevation of the receptacle body forming apparatus and showing the means for feeding a predetermined length of a gummed strip or web relative to the marginal portions of a receptacle blank wrapped about the mandrel, and means for rendering adhesive the gummed surface of the fed web, and the means to eject the formed receptacle body from the mandrel.

Figure 61 is a plan view of means for guiding the web or strip during the feeding thereof and showing a roller for applying a liquid to the gummed surface to render the same adhesive.

Figures 62 and 63 are cross sectional views, on an enlarged scale, taken on the lines 62—62 and 63—63 of Figure 61 looking in the direction of the arrows.

Figure 64 is an elevational view looking at the right of Figure 60 to show rollers for feeding the gummed strip and a gear train for actuating the same, and the actuating means for the ejector mechanism for ejecting the receptacle body from the mandrel.

Figure 65 is a cross sectional view taken substantially on the line 65—65 of Figure 60 looking in the direction of the arrows to show the connection of the receptacle body ejector mechanism with its actuating means and the means for moistening and rendering the gummed surface of the strip adhesive.

Figure 66 is a plan view with parts broken away of means for feeding a receptacle blank relative to a gauge on a table below the mandrel and of actuating means for the receptacle body ejector mechanism.

Figure 67:
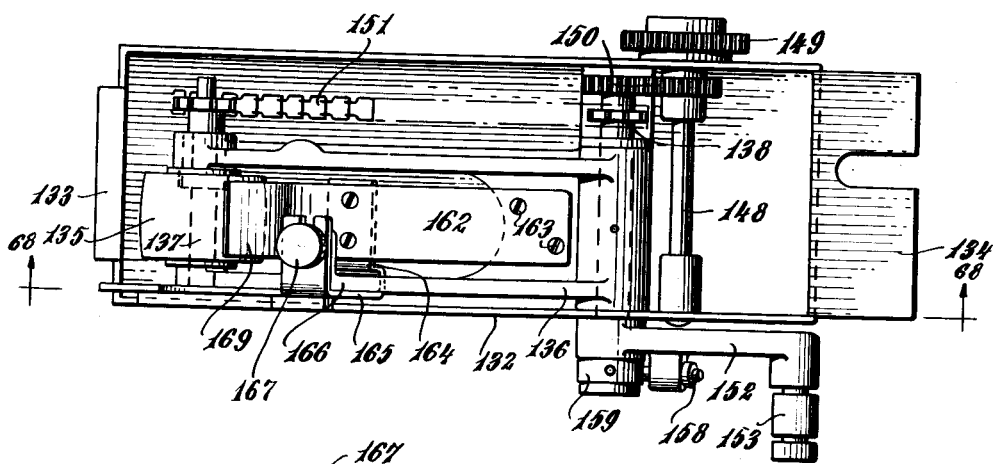

Figure 67 is a plan view of a liquid carrying trough and the means for applying the liquid in said trough to the gummed surface of the strip to render the same adhesive.

Figure 68:
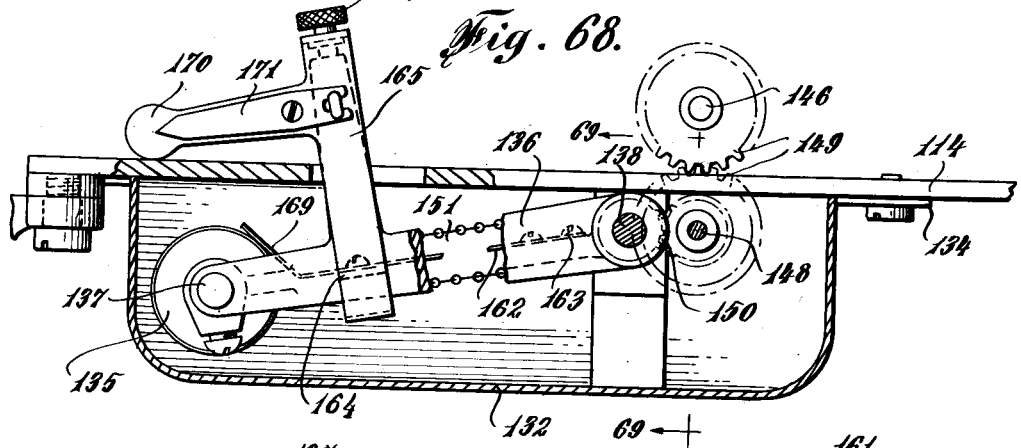
Figure 69:
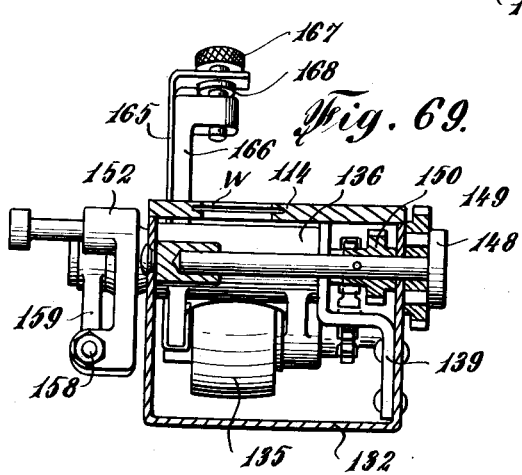

Figure 68 is a longitudinal sectional view, and Figure 69 is a cross sectional view, taken on the lines 68—68 and 69—69, Figures 67 and 68, respectively looking in the direction of the arrows.

Figure 70:
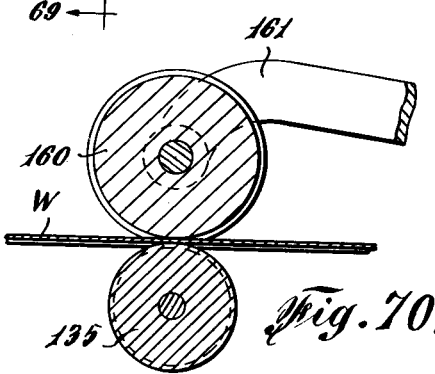

Figure 70 is a longitudinal sectional view of a portion of the gummed strip and showing the same in relation to the roller for applying liquid from the trough to the gummed surface of the strip to render the same adhesive, and showing an idle roller in relation to said first roller for holding the gummed surface of the strip in contact with the moistening roller.

Figure 71 is a cross sectional view, on an enlarged scale, showing the means to deliver a receptacle blank to the table below the mandrel and the means for lifting the blank from the table, clamping it to and wrapping the same around the mandrel and showing the latter means in normal inoperative position.

Figure 72 is a cross sectional view taken substantially on the line 72—72 of Figure 66 looking in the direction of the arrows to show the means for delivering a receptacle blank to the table below the mandrel, a ram and its actuating means for applying the adhesive sealing strip to the marginal portions of a blank wrapped around the mandrel, and an adjustable auxiliary support for the mandrel and the means for actuating the same.

Figure 73 is a side elevation, partly broken away, of the mandrel and the ram in relation thereto in applying the sealing strip to the marginal portions of a blank wrapped around the mandrel, and showing cutter means for severing the fed adhesive strip and means to strip the adhesive strip or web from the cutter means.

Figure 74 is a detail view taken substantially on the line 74—74 of Figure 73 looking in the direction of the arrows to show the means for guiding the adhesive strip between the mandrel and ram and relative to the marginal portions of the blank wrapped around the mandrel.

Figure 75 is a cross sectional view, on an enlarged scale, taken on the line 75—75 of Figure 73 to show the mounting of the guiding means for the adhesive strip to the mandrel.

Figure 76 is a perspective view of a portion of the mandrel looking at the right of Figure 73.

Figure 77 is a perspective view of a cutter of the cutter mechanism for the adhesive strip mounted in the mandrel.

Figures 78 to 81, inclusive, are sectional detail views of means for clamping a receptacle blank to and wrapping the same around the mandrel and showing the same in various positions thereof.

Figure 82 is a side elevation, partly in section and on an enlarged scale, and looking at the left of Figure 71, of the means for clamping a receptacle blank to and wrapping the same around the mandrel.

Figure 83 is a view similar to Figure 82, on an enlarged scale and in section, to show the arrangement and mounting of the means to clamp the receptacle blank to the mandrel and to connect the actuating means for the means to wrap the blank around the mandrel thereto.

Figure 84 is an elevational view, on an enlarged scale, of a compensating means to facilitate the actuation of the operating means for the wrapping means in wrapping the blank around the mandrel.

Figure 85 is a perspective view of the compensating means shown in Figure 84, showing the same in disassembled relation to means to connect the blank wrapping means with its actuating means.

Figure 86 is a plan view to show a gauge for the blank in relation to the table below the mandrel, and means in relation to said gauge for offsetting the gauged marginal portion of the blank relative to the body of the blank.

Figure 87 is a side elevation of the means shown in Figure 86 and looking at the bottom of said figure.

Figure 88 is a sectional view taken substantially on the line 88—88 of Figure 6 looking in the direction of the arrows and toward the front of the means for gauging the receptacle blank on the table and showing the means for offsetting the marginal portion of the blank.

Figure 89 is a cross sectional view taken substantially on the line 89—89 of Figure 88 looking in the direction of the arrows.

Figure 90 is a cross sectional view to show the mounting of the blank offsetting means on the gauge.

Figure 91 is a perspective view showing in a diagrammatic manner the blank offsetting means in relation to a receptacle blank and offsetting the marginal portion of the blank.

Figure 92 is a sectional detail view of cam means for operating the blank offsetting means.

Figure 93 is a perspective view to show the arrangement of the cam follower for the blank offsetting means and the means for mounting said follower on the actuator for said blank offsetting means.

Figures 94 to 97, inclusive, are elevational views of means to co-operate with the means to wrap the blank around the mandrel to direct and tuck one marginal portion of the blank under the opposite offset marginal portion of the blank and controlled from the movement of the ram and the blank wrapping means.

Figure 98 is a sectional view, on an enlarged scale, taken substantially on the line 98—98 of Figure 95.

Figure 99 is a perspective view, on an enlarged scale, of the means for controlling the actuation of the means to tuck the one marginal portion of the blank under the other marginal portion; and Figure 100 is an elevational view, partly broken away and partly in section, looking at the left of Figure 97.

In the embodiment of the invention illustrated in the drawings the operative mechanism of the apparatus is mounted upon a supporting base A, (Figure 71,) and said mechanism is actuated from a drive shaft S journaled in standards s on a table 29 superposed to the supporting base driven from a suitable source of power (not shown) through a shaft and worm gearing as shown at G.

Blanks or sheets B (Figures 66 and 61) from which the receptacle bodies are formed are fed or delivered from a pile on a suitable support, as at P to a table T with one longitudinal edge in register with a gauge 1 in the form of a plate of rectangular shape in cross section fixed to the table with one angle portion extended through an opening in the table and the inner surface thereof flush with the top of the table, and the other angle portion extending at a right angle to the table to serve as a gauge for the edge of the blank B. (Figures 66 and 86 to 89.) The table is fixed to standards 2, 3 fixed upon the table 29 to extend in a horizontal plane below a mandrel or horn 4 to extend from opposite sides of the mandrel and around which mandrel the blank is wrapped in forming the receptacle body. (Figures 66, 72, 87 and 100.)

The sheets or blanks are fed to the table T by suction means embodying suction cups 5 carried at the end of tubes 6 connected at the opposite ends with a head 7 and through which head they are connected with vacuum creating means (not shown) by a flexible hose or tube 8, the head 7 forming a part of a carriage 9 having rollers or wheels 10 rotatably mounted on studs extending laterally therefrom and engaging in cam slots 11 of a pair of parallel and spaced plates 13' fixed to brackets 12 mounted upon standards 13 fixed upon the table 29. The carriage is reciprocated and thereby the suction cup carrying tubes reciprocated transversely above the table by an arm 14 (Figures 66, 71 and 72) pivotally supported at one end by a bracket fixed upon the support A and extending upward therefrom between the tubes and forward of the carriage and pivotally connected at said end to one end of a rod 15 connected at the opposite end, as at 16, with the carriage. The arm 14 is oscillated to reciprocate the carriage by a roller 17, carried by an arm 18 pivotally supported by a bracket 19 fixed upon the base, engaging a cam groove 20 in the face of a disk D fixed to a shaft $S^a$, and the arm 18 connected with the lever arm 14 by a link 21. During the reciprocatory movement of the suction cup carrying tubes they pass through openings 21 in the gauge 1 and through recesses 4' extended transversely through the bottom of the mandrel, and as the carriage rollers 10 approach the terminus of their forward movement in the plate slots 11 they ride up an upwardly inclined portion $11^a$ of the slots thereby lifting the suction cup carrying ends of the tubes for engagement upon the top of the supply pile of sheets or blanks B, and at the termination of such movement the carriage rollers ride down an incline portion $11^b$ of said slots and the suction cups engaged with the uppermost sheet or blank on the pile. During the initial portion of the return movement of the suction tube carrying carriage the carriage rollers ride up the incline portion $11^b$ lifting the suction cups with the top sheet from the sheet pile. The carriage rollers then ride down the incline portion $11^a$ and position the blank on the table T drawing the blank over the same under the mandrel, and as the leading edge of the blank is engaged and registered with the gauge 1 sufficient resistance is offered to the blank to strip it from the suction cups, this retrograde movement of the carriage continuing until the suction cups are positioned to the rear of the gauge 1, as shown in Figures 71 and 72, and brought to rest.

During the interim of the movement of the suction cup carrying tubes a plunger 22 is moved upward through an opening 23 in the table T (Figures 66, 72 and 86) to engage a pad 24 of suitable material, such as sponge rubber or the like carried by the plunger with the blank intermediate the longitudinal marginal portions lifting the blank from the table and clamping it to the mandrel, (Figure 78,) when a pair of plungers 25 are brought into operation said plungers being juxtaposed to opposite sides of the plunger 22 to have longitudinal sliding movement toward and away from the mandrel with the upper ends terminating at a point below the upper end of the plunger 22. The upper ends of said plungers 25 extend up into a rectangular opening in a head 26 with the plunger 22 interposed between said plungers 25. The head is pivotally supported by the plungers 25 by studs 27 threaded into the plungers 25, as clearly shown in Figure 83, whereby the head is adapted to have rocking movement on the plungers. The plungers are slidably mounted in a rectangular opening in a guide member 28 extended through an opening of larger cross sectional area than the guide member in the table 29, which table is supported by standards 30 (Figure 71) superposed to the base, the guide having a laterally extending flange 28' whereby it is supported upon the table 29. The head 26 has a pair of ears 31 at the corners and extending outwardly from opposite sides and between which ears a pair of arms 32, 32' are pivotally supported, (Figures 71, and 78 to 83,) which arms extend upward and are urged in a direction toward each other by a spring 33 attached at the ends to the arms to engage rollers 34 carried by the arms with the blank clamping plunger 22 in the normal position of the plungers and during the initial movement of the arm carrying plungers 25. A flap 35 is pivotally carried by the inwardly extended upper ends of the arms 32, 32', as shown at 36, said flaps being of arcuate or curved form in cross section to conform with the outer contour of the mandrel. As the flap carrying arms are moved upward by the plungers 25 the leading longitudinal edge of the flaps engages the blank at opposite sides of the mandrel, and as the upward movement of the plungers is continued and as the flaps are brought into engagement with the blank on the mandrel the rollers 34 will ride off of the plunger 22 due to the converging of the opposite edge portions of the plunger to the extremity thereof, as shown at 22', and the flaps urged into engagement with the blank on the mandrel by the spring 33 wrapping the blank under tension and in taut condition around the mandrel. The width of the receptacle blank is such that when it is wrapped around the mandrel one longitudinal marginal portion may be lapped over the other marginal portion, as shown in Figure 79. To facilitate the overlapping of one marginal portion relative to the other marginal portion the blank wrapping movement of one of the flaps is retarded, in the present instance the flap carried by the arm 32'. For this purpose rods 37, 37' are fixed at one end in the flap carrying arms to extend oppositely therefrom from opposite sides of the pivot support of said arms, said rods being extended through and slidable in openings in the flange 28' of the guide 28 and through the space between the guide and the wall of the opening in the table 29 through which the guide is extended. As the plungers 25 approach the terminus of their movement to impart blank wrapping movement to the flap carrying arms an abutment engages with the underside of the table, said abutment being in the form of a washer 38 slidable on the rod 37' and engaged at the end of a spring 39 coiled about the rod and confined between said abutment washer and a washer held onto the end of the rod by lock nuts, as shown at 40, the continued movement of the actuating plungers for the flap carrying arms thus causing the head 26 to rock on its pivot support on the standards, as shown in Figure 79, permitting the flap carrying arm 32 to move in advance of the flap carrying arm 32'. This movement is continued until an abutment washer 38' held onto the end of the rod 37 by lock nuts 40' engages the bottom of the table thereby arresting the blank wrapping movement of the flap carried by the arm 32, and as the plungers 25 continue to move upward the spring 39 is compressed to its full extent, as shown in Figure 80, at which time the head 26 will be at a right angle to the plungers 25 and the blank wrapping movement of the flap carried by the arm 32' is arrested, when retrograde movement is imparted to the clamping plunger 22 and the plungers 25 connected to the flap carrying arms. To urge the head 26 to position at a right angle to the plungers 25 pins 41 are fixed in the head below and in axial alinement with the pivot supports 27 for the head, said pins extending laterally from the head and engaging a V recess 42 in the upper end of blocks 43 slidably mounted in recesses in plungers 25 axially below the head supporting pivots 27 and urged in a direction toward said pivots by springs 45 seated in a bore in said blocks and confined between the bottom of the bore and the end wall of the block carrying recesses in the plungers 25. (Figures 78 to 81 and 83 to 85.)

The blank clamping plunger 22 is actuated by a lever 46 pivotally connected to one end of an arm 47 pivotally suspended at the opposite end from a bracket fixed upon the table 29 and extended through an opening in said table, as shown at 48, the lever having a pivotal and adjustable connection at one end with the clamping plunger through a connector 49 having a bifurcated end to straddle the end of the plunger 22 extended below the plungers 25 and the legs of the bifurcation pivotally connected with the plunger through links 50, as clearly shown in Figures 71 and 82. The opposite end of the connector is extended into and pivotally supported in a hood portion of the lever 46, as shown at 51 in Figure 71, and adapted to be adjusted to extend in line with the lever or in angular relation thereto to compensate for variations desired in the movement of the plunger 22 by adjustable abutments in the form of set screws 52 threaded into the hood portion of the lever 46 and engaging with the connector 49 at opposite sides of its pivotal connection with the lever 46. The lever is actuated by a roller 53 carried by the opposite end of the lever 46 engaging in a cam groove 54 in the face of a disk E fixed upon the shaft S$^a$.

The plungers 25 to which the flap carrying arms are connected are actuated by a lever 55 pivotally supported intermediate the ends by the arm 47 above the pivotal support of the lever 46 and is operatively connected at one end with the plungers 25 through a connector 56 similar to the connector 49, the one end of said connector being bifurcated and the legs of the bifurcation straddling the plungers 25 and pivotally connected therewith by pins engaged in perforations in the bifurcation legs and the ends of the plungers, as shown at 57 in Figure 82. The opposite end of the connector 56 is extended into and pivotally supported in a hooded portion of the lever 55, as shown at 58 in Figure 71, and adapted to be adjusted to extend in alinement with the lever 55 or in angular relation thereto to compensate for variations desired in the movement of the plungers 25 by adjustable abutments in the form of set screws 59 threaded into the hood portion of the lever and engaging with the connector 56 at opposite sides of its pivotal connection with the lever 55. The lever 55 is actuated by a roller 53' rotatably carried by the lever at the end opposite to which it is connected with the plungers 25 engaging in a cam groove 54' also arranged in the face of the disk E.

As the receptacle blank is registered by the suction feeding means relative to the gauge 1, and previous to the wrapping of the sheet around the mandrel, a marginal portion of the blank is offset laterally from the body of the blank, as shown at 60. For this purpose the one angle portion of the gauge which is flush with the top of the blank supporting table is undercut at the juncture of the angle portions of the gauge, as at 61 in Figures 87, 89 and 90. A head 62 is arranged below and has movement toward and away from the table, said head having a pair of posts 63 fixed therein at the ends to extend upwardly from the head and slidably engaged in bores in bosses 64 at the ends and back of the upright portion of the gauge, said bosses having slots 65 cut through the wall thereof at the front of the gauge in which lugs 66 extended laterally from the upper ends of the posts engage and to which a plate 67 is fixed to have edgewise movement into and out of the undercut portion 61 of the gauge and engage the marginal portion of the blank extended over said undercut portion to offset said marginal portion of the blank into said undercut portion of the gauge. The head 62 is reciprocated to move the offsetting plate 67 toward and away from the undercut portion of the gauge by a lever 68 pivotally supported by a bracket 69 fixed upon the table 29 and having an adjustable connection 70 with the head. The offsetting plate is moved to blank offsetting position by gravity through the weight of said plate and its carrying head 62, and is moved away from the undercut portion 61 of the gauge by means of a roller 71 rotatably mounted on a stud 72 fixed in and extending laterally from the end of the lever opposite to its connection with the head 62, said roller engaging with the inner circumference 73 of a recess in the face of a disk 74 fixed upon a drive shaft S', said disk comprising a pair of diametrically split sections, as shown in Figures 86, 87 and 92. To permit the offsetting plate 67 to drop by gravity the circumferential wall 73 of the disk is arranged with a lateral V shaped recess 75, preferably formed in the mating faces of the disk sections, and into which recess a correspondingly shaped V block 76 on the stud 72 juxtaposed to the roller 71 (Figure 93) is adapted to engage, thus permitting of a quick rocking movement of the lever 68 and the dropping of the offsetting plate 67. It will be obvious that by the continued rotation of the disk 74 the V block will ride out of the recess 75 and again restore the offsetting plate 67 to the position shown in Figures 87 and 88.

To further facilitate the overlapping of the offset marginal portion 60 of the receptacle blank over the other marginal portion of the blank as it is wrapped around the mandrel means are provided to direct and tuck the one marginal portion of the blank under the opposite marginal portion. This means, as shown in Figures 94 to 100, inclusive, comprises a plate 77 carried by a pair of arms 78 pivotally supported upon screw studs 79 secured in the pivot supports 27 for the head 26 upon which the flap carrying arms 32, 32' are mounted. These arms 78 extend laterally from the pivot supports and in a direction toward the flap carrying arms 32, and are adapted to have movement laterally of and toward the mandrel, the plate having an intermediate offset portion 77' to clear the flap carrying arm 32. The arms are connected by a cross-bar 78'. The arms participate in the movement of the head 26 with the plungers 25 and normally assume a position by gravity in engagement with pins 80 fixed in and extending laterally from the head 26. As the plungers are moved up to impart blank folding movement to the flap carrying arms 32, 32' and just previous to the termination of such movement a V recess in the peripheral wall of pins 81 fixed in and extending laterally from the arms engage hooked ends 82 of latches on a frame 83 pivotally supported in brackets 84 fixed upon the table 29 and normally maintained in position to engage the recesses in the pins 81 by a rod 85 pivotally connected with a ram 86 movable into and out of engagement with the mandrel, and having a pin and slot connection 87 with an arm 88 fixed upon the pivot support of the latch frame 83. This engagement of the recessed pins 81 with the latch hooks 82 imparts movement to the plate carrying arms 78 upon their pivot supports to move the plate 77 into engagement with the marginal portion of the blank being wrapped around the mandrel and tucking the same under the offset marginal portion 60 of the blank. As the ram is moved toward the mandrel and as the ram approaches the mandrel the latch frame 83 is actuated from the connection 85, 87 of the frame therewith moving the latches from the Figure 97 to the Figure 96 position, this releasing movement of the latches causing ledges 89 extended laterally from arms 90 fixed to the latches and extending laterally therefrom in a direction toward the pivot support of the arms 78 to engage pins 91 fixed in and extending laterally from the latter arms eccentric to the pivot supports thereof and thereby moving the arms and the plate 77 out of the path of movement of the ram.

The mandrel or horn 4 comprises a cylindrical block, in the present instance of truncated conical form to make a receptacle body of corresponding form. The mandrel is fixedly supported at one end by the standard 3 for the blank supporting table T by engaging a reduced end 92 of the mandrel in an opening in the standard and secured therein against longitudinal displacement by a perforated cap 93 (Figure 73) secured to the end of the mandrel and in abutting relation to the standard 3 by a headed screw extended through the perforation in the cap and threaded into the mandrel, as shown in Figures 73 and 76. The mandrel is held against rotation by a key interposed between the reduced end of the mandrel and the wall of the mandrel engaging opening in the standard 3 relative to a flat portion 94 on the mandrel and a corresponding flat portion in the opening wall.

The blank wrapped around the mandrel is secured at the marginal portions to form the receptacle body by a strip applied to the receptacle blank over the marginal portions, as shown at 60' in Figures 80 and 81, this strip comprising a portion fed to and severed from a web W of suitable material, such as paper, with an adhesive applied to the surface to be engaged with the marginal portions of the blank, which adhesive may be applied to said surface as it is fed, it, however, preferably comprising a gum applied to the surface of the web and dried, which is moistened and rendered adhesive as the web is fed. The gummed strip or web is fed from a roll of such web (not shown) rotatably supported on a crosshead 95 (Figure 60) supported by a pair of parallel standards 96 fixed to and extending upward from the table 29. The web is fed by a pair of contacting rollers 97, 97' rotatably carried by and between standards 96, the periphery of the roller 97 being of transverse convex form and the periphery of the other roller being of concave form corresponding to the curvature of the periphery of roller 97'. The web feeding rollers are positively driven by a train of gearing comprising a gear 98 rotatable with the roller 97 meshing with and driving a gear 98' rotatable with the roller 97', the gear 98 being rotated by a pinion 99 rotatable therewith meshing with a gear 99' fixed to and rotatable with a shaft 100 journaled in the standards 96, said shaft having a ratchet wheel 101 fixed thereon with which a pawl 102 pivotally carried by a lever 103 co-operates to advance the ratchet wheel when the lever is moved in one direction, the lever being loosely mounted on the shaft 100 and connected by a link 104 with an arm 105 fixed to one end of a rock shaft 106 extending transversely of and rotatably mounted in brackets 107 fixed on the table 29 and oscillated to actuate the pawl carrying lever 103 by a cam follower carried by an arm 108 fixed to the opposite end of said shaft engaging a cam groove 109 in the periphery of a drum fixed to a shaft S' (Figures 60, 64 and 66) driven from the shaft S by a gear 110 meshing with an idle pinion 111 meshing with a gear 112 on shaft S'. (Figure 71.) The link has an adjustable connection 113 with the arm 105 whereby to vary the throw of the pawl carrying lever 103 and thereby vary the length of the web fed by the rollers 97, 97'. The web is delivered from the feed rollers to a guide with the gummed surface lowermost, said guide comprising a section 114 (Figure 61) fixed at one end to and extending forward from the standard 96 and supported at the forward end by a bracket 115 also fixed upon and extending forward of the standards 96, and a section 114' having a hinged connection 116 at one end with the forward end of the guide section 114 to have movement on a horizontal axis transversely of the guide, the forward end of the section 114' being carried in a downwardly extended bifurcated portion 117 of a bracket 118 fixed to the end of the ram 86 to participate in the movement of the ram. The guide section 114' carries rollers 119 at the bottom with a peripheral portion of the rollers extended through openings in the guide section, as shown in Figures 61 and 62, the periphery of the rollers being of inverted V shape in cross section whereby the rollers will have only a line contact with the web. From the guide the web is delivered relative to the marginal portions of the blank wrapped around the mandrel in interposed relation thereto and an anvil 120 fixed in and projecting from the face of the ram (Figure 75) and guided to said position by a pair of parallel guide plates 121 arranged at opposite sides of the ram anvil and fixed to the reduced ends of pins 122 with the enlarged portions of the pins slidably engaging in bores 123 in the ram and normally urged outward by springs 124 interposed between the ends of the pins and bottom of the bores, with the shoulders formed by the reduced ends engaging plates 125 fixed to the face of the ram through which the reduced ends of the pins are extended with the guide plates extended beyond the face of the ram anvil. The web is guided and supported between said plates by a plate 126 (Figure 74) fixed to one end of and extending laterally from an angle arm 127 pivotally mounted at the opposite end on the ram, as at 128, and normally assuming a position by gravity to engage at the ends of the guide plates 121 when the ram is positioned away from the mandrel. As the ram is moved toward the mandrel an abutment in the form of an upwardly extending rod 129 engages a second arm 130 pivotally carried at one end by the ram in opposed relation to the pivot support of the arm 127 with a pin carried by said latter arm engaging a bifurcation in the end of the arm 130, as at 131, the engagement of the abutment 129 with said arm moving the same upward and thereby moving the arm 127 to position the plate 126 away from the ram anvil, as shown in Figure 74.

As stated, the securing web for the marginal portions of the blank on the mandrel has a gum applied to one surface and to moisten said surface to render the gum adhesive a liquid carrying trough 132 is releasably mounted on the bottom of the guide section 114 by engaging a flange at one end of the trough with a bracket fixed to the guide, as at 133, which bracket may also serve to connect the guide section 114′ with the guide section 114. The trough is secured to the guide by a screw engaged in a recess in a flange 134 extended from the opposite end of the trough and threaded into the guide. (Figures 62, 65 and 67 to 70.) The liquid is applied to the gummed surface of the web by a roller 135 rotatably carried between a pair of arms of a bracket 136 by fixing the roller on a shaft 137 rotatable in and extending transversely between the bracket arms. The bracket 136 is fixed to a shaft 138 rotatably mounted in one side of the trough and the offset of a bracket 139 fixed in the trough. The moistening roller 135 is continuously rotated from the shaft S by a sprocket wheel 140 fixed on said shaft and a chain 141 (Figures 64 and 65) passing around said sprocket wheel and a sprocket wheel 142 fixed to a shaft 143 rotatable in a pair of arms 115′ extended laterally from the bracket 115, and the rotation of said shaft transmitted to a shaft 144 through bevel gears 145 and from said shaft to a shaft 146 rotatably mounted in the bracket 115 by sprocket wheels fixed on said latter shafts and a chain 147, and from shaft 146 to a shaft 148 rotatably mounted in the trough by gearing 149, and from shaft 148 to the shaft 138 on which the moistening roller carrying bracket is fixed by gearing 150, and from shaft 138 to shaft 137 by sprocket wheels fixed to said shafts and a sprocket chain 151. In order that the moistening roller will not be in contact with the gummed surface of the web during the periods of rest of the latter with the possibility of removing the gum therefrom by the rotation of the roller, means are provided to move the roller out of contact with the web during the periods of rest thereof and move the same into contact with the web during the travel of the web. For this purpose means are provided for oscillating the roller carrying bracket 136 toward the guide 114 to project the peripheral portion of the moistening roller through an opening in the guide and into contact with the web, as shown in Figure 61, and away from the guide into the trough, and comprising an arm 152 loose on the end of the shaft 138 extended from the side of the trough connected by a rod 153 (Figure 60) with one end of an arm 154 pivotally supported at the other end 155 on a bracket fixed to the table 29 to extend transversely above the shaft 106 and normally urged downward by a spring 156 to engage a lateral projection on said arm with a cam on the shaft 106, and fixed to the arm 105 (Figure 39) as shown at 157, said cam being operative to move the rod upward against the tension of spring 156 to rock the arm 152. The moistening roller carrying bracket 136 is arranged to normally assume a position in the trough by gravity, and is moved upward to project the roller through the opening in the web guide against the action of the spring 156 rocking the arm 152, which movement of the arm is transmitted to the moistening roller carrying bracket by an adjustable abutment in the form of a set screw 158, threaded into an ear extending laterally from the arm 152, engaging an arm 159 fixed to the shaft 138 to which the moistening roller carrying bracket is fixed. It will be obvious that as the arm 154 is rocked by the cam 157 and the rod 152 moved upward that the abutment 158 will be moved away from the arm 159 and thereby permit the moistening roller carrying bracket to move into the trough. To maintain the web in contact with the moistening roller 135 an idler roller 160 is rotatably carried at one end of an arm 161 loosely mounted at the other end on the shaft 146 rotatably carried by the bracket 115, (Figures 60 and 65,) said roller engaging the web by gravity.

To prevent too great a quantity of moistening liquid to be applied to the gummed surface of the web means are provided to scrape surplus liquid from the moistening roller, and comprising a plate 162 of yielding material (Figures 67 and 68) secured at one end, as at 163, to the moistening roller carrying bracket 136 and intermediate the ends, as at 164, by screws to a laterally extended part of a sheet metal bracket 165 engaging around the inner arm of the carrier 136 and adjustably mounted on a lateral extension at the end of an arm 166 extending laterally from the carrier 136 and upward out of the trough by a set screw 167 engaged in an opening in the lateral offset end of said bracket 165 and threaded into the lateral extension of the arm 166, the bracket 165 being secured to the set screw to participate in the adjustment thereof by a clamping nut 168. The end of the scraper plate is offset and engages with the periphery of the moistening roller, as shown at 169. The scraper carrying bracket 165 has a forwardly extending arm 170 which is adapted to engage with the guide 114 to limit the movement of the moistening roller carrier into the trough. To indicate the adjustment of the scraper an indicator pointer 171 is pivotally mounted intermediate the ends on the arm 170 to lie contiguous thereto with one end extending toward the end of said arm, which is arranged of circular or arcuate form, and the other bifurcated end engaging a pin extended through an elongated opening in the bracket 165 and secured in the arm 166 of the moistening roller carrying bracket. As the scraper carrier 165 is adjusted the pointer end of the indicator will be variably positioned relative to the circular end of the arm 170 and thus indicate the position of the scraper relative to the moistening roller. If desired the circular portion of the arm 170 may be arranged with calibrations or graduations. To facilitate the threading of the web between the feed rollers the shaft for the feed roller 97' is extended laterally of one of the standards 96 and arranged for the application of a crank, as shown at 172 in Figure 65.

As the ram 86 is moved toward the mandrel to apply the adhesive sealing strip to the marginal portions of the receptacle blank wrapped around the mandrel the fed portion of the adhesive web relative to the mandrel is severed by cutter mechanism, (Figures 73, 76 and 77,) comprising a cutter 173 fixed to the end of the ram and extending beyond the face of the ram anvil, said cutter being of rectangular shape in cross section to arrange the same with a pair of cutting edges. This cutter co-operates with a tubular cutter in the form of a block 174 having an opening 175 therethrough to conform to the shape of the cutter 173 and the edges of the opposite walls at the entrance to said opening forming cutting edges with which the cutter 173 co-operates to sever the web. The cutter block 174 is secured in a recess 176 in the end of the mandrel relative to a flat portion 177 of a portion reduced relative to the mandrel and enlarged relative to the reduced supporting end 92. By this arrangement the cutter instead of severing the web by a single shear cut a portion is severed from the web providing a clean edge at the severed edges of the web, the severed portion of the web being delivered to an opening 178, through the mandrel in line with the cutter block with which a chute 179 is connected to direct the severed web portion to a suitable receiving receptacle therefor. As the ram moves toward the mandrel the forward end of the web guide 114' is moved downward therewith to position the web relative to the cutter mechanism, (Figure 73,) and the end of the web projecting from the guide is engaged by a plunger 180 slidably mounted in a bore in the bracket 118 fixed to the ram and yieldingly urged outward by a spring 181, said plunger also serving to strip the web from the cutter mechanism during the receding movement of the ram.

The formed receptacle body is ejected from the mandrel by ejector mechanism, (Figures 1, 60, 64, 65, 66,) comprising a pair of parallel ejector rods 182 slidably guided at 183 in upward extensions of the mandrel supporting bracket 3 to have longitudinal movement at opposite sides of the mandrel. The mandrel has diametrically opposite longitudinal recesses 184 therein and the ejector rods are spaced apart a distance to engage said recess so that the edge of the receptacle will be engaged in a recess 185 in the ends of the rods. The opposite ends of the rods are connected with a head 186 having a stud centrally thereof and extending opposite to the rods whereby it is slidably mounted, as at 186' in Figure 65, in a lateral extension 187' of a slide 187 to participate in the movement of said slide and have a limited sliding movement relative to the slide. The slide 187 is mounted on parallel and superposed rails 188 fixed at one end to one of the standards 96 and at the opposite ends to the mandrel supporting portion of the bracket 3. The ejector rod carrying slide is reciprocated by a pair of arms 189, 190, the arm 190 being fixed to one end of a rock shaft 191 rotatably supported upon the table 29 and at the other end at the juncture of the arms of an angle link 192, and said shaft rocked to oscillate the arm by a cam follower 193 carried by an arm fixed to the shaft engaging a cam groove 194 cut into the periphery of a drum fixed to the shaft S'. The other arm 189 is pivotally supported at one end in the bearing block in which the one end of the rock shaft is mounted, said arm having movement on an axis parallel with the axis of the pivot support of the shaft, as shown at 194', and connected at the opposite end with a horizontally extended angle portion of the link 192, as at 195, the other angle portion of the link extending vertically and having a pin and slot connection 196 with the ejector rod carrying slide. Through the action of the arms 189, 190 ejector movement of the same extent is at all times imparted to the ejector rod carrying slide substantially equal to the length of the mandrel. To impart an increment of movement to the ejector rods in addition to the movement imparted thereto by the slide 187 to clear the receptacle body from the mandrel and engage the body in a holder positioned in alinement with the mandrel, hereinafter described, an adjustable abutment 197 is mounted in the mandrel support 3 to extend in the line of movement of a stop member in the form of a lever 198 pivotally carried by and engaged in a slot of a portion of the slide extension 187' extending downwardly at a right angle thereto, the upwardly extending arm of the lever being pivotally connected with the head stud 186' and the downwardly extending arm being in line with the abutment 197 and an abutment 199 adjustably carried by an arm fixed to one of the standards 96. As the rod carrying slide approaches the end of its ejecting movement the downward extending arm of the lever 198 will engage the abutment 197 rocking the lever and thereby imparting an increment of ejecting movement to the ejector rods in addition to the movement imparted thereto by the rod carrying slide. As retrograde movement is imparted to the slide the ejector rod carrying head and rods will participate in such movement, and as the slide approaches the termination of such movement the downward extended arm of the lever 198 will engage the abutment 199 and thereby impart an increment of retrograde movement to the ejector rods in addition to the movement imparted thereto by the slide.

The ram 86 is in the form of a lever of hollow structure fixed intermediate the ends upon a shaft 200 (Figures 1, 66 and 72) rotatably mounted in the standards 13 above the plates having the cam slots in which the carriage for the suction cup tubes are mounted, the ram being rocked to engage the end carrying the anvil 120 toward and away from the mandrel by a roller 201 carried by a bracket 202 adjustably connected to the opposite end of the ram lever, engaging a cam groove 203 in the face of a disk fixed to the shaft S. The ram is a hollow structure and is guided in its movement toward and away from the mandrel and the anvil carrying end held against lateral distortion by a block fixed to and extending laterally from opposite sides of an arm 13'' extended from one of the standards 13 in a direction upward into and toward the anvil carrying end of the ram, the opposite ends of the block engaging arcuate recesses in the inner surfaces of the opposite walls of the ram, as shown at 204 in Figure 72. The movement of the anvil carrying end of the ram toward the mandrel is varied by adjusting the carrying bracket 202 for the cam following roller.

To provide an additional support for the mandrel to prevent springing thereof as the ram is brought into engagement therewith, and also permit of the ejecting of the receptacle body from the mandrel, an adjustable auxiliary support is provided for the free end of the mandrel. (Figures 60, 66, 72, 73, 87 and 100.) This support is in the form of an arm 205 rotatably supported in a recessed portion of the standard 2, the support normally assuming the position shown in full lines in Figure 72, and moved to the mandrel supporting position shown in dotted lines in Figure 60 and in full lines in Figures 87 and 100 just prior to the ram engaging with the mandrel by a rod 206 pivotally connected at one end to an arm 207 fixed to the auxiliary mandrel support and the other end pivotally connected with the lever 208 carried by a standard $s$ and normally urged to position the auxiliary support out of mandrel supporting position, as shown in Figure 72, by a spring 209 attached at one end to an arm 210 on the rod and at the other end to a fixed part. The auxiliary mandrel support is moved to mandrel supporting position by a roller 211 following a cam 212 fixed on the shaft S'. In order that the ram anvil may conform to the variations in the thickness of the overlapped marginal portions of the blank on the mandrel and effect a close and intimate contact between the securing strip or web W, and to facilitate the machining of the same, the anvil is made of two parts with one part of the anvil undercut relative to the other part, as shown at 120' in Figure 75. The shaft $S^a$ is driven from the shaft S' by a shaft 213 rotatable on a vertical axis and bevel gearing 214 and 215.

The receptacle bodies R as they are ejected from the mandrel 4 by the ejector rods 182 are delivered to one of a series of tubular holders mounted on and equi-distantly spaced about a carrier embodying a disk 216 having radially extending projections or arms 217 (Figure 11) upon which the holders for the receptacle bodies are mounted, the disk being fixed upon a head 218 rotatable on a pillar 219 and supported upon a base member 220 in which the pillar is fixed, as by a set screw or other suitable means. In the present instance there are eight of said receptacle body holders designated by $a$, $b$, $c$, $d$, $e$, $f$, $g$, and $h$, respectively, as shown in a diagrammatic manner in Figure 12. The holder carrier is intermittently rotated to successively station the holders relative to the mandrel 4 of the receptacle body forming means to receive a receptacle body therefrom, as shown at $a$. Upon the successive intermittent movement of the carrier the holder with a receptacle body therein is stationed at $b$, from which it is advanced to the station $c$ adjacent to means to stamp a disk 221 from a web W', (Figures 53 and 54,) arrange the disk with a peripheral flange 222 (Figure 55) and insert the flanged disk in the end of a receptacle body in a holder to form a head or closure for the receptacle body and simultaneously arrange the receptacle body with an annular shoulder 223 and seating the flanged disk thereagainst, as diagrammatically shown in Figures 56 and 57. From said station $c$ the holder is advanced to station $d$ to subject the receptacle body in the holder to the action of spinning means to primarily turn in or fold the marginal end portion of the receptacle body over the edge of the disk flange, as shown at 224 in Figure 58, when the holder is advanced upon the next movement of the carrier to the station $e$ to subject the receptacle body with the disk closure therein to the action of second spinning means to finally interfold the receptacle body with the disk flange to secure the disk flange in the end of the receptacle, as shown at 225 in Figure 59. From the station e the holders are advanced to station f where no operation is effected, and from said station to station g where the receptacle is ejected or delivered from the holders, when the empty holders are advanced to station h and from said latter station to the station a adjacent to the mandrel of the receptacle forming apparatus. It is to be understood that as the successive holders are advanced from the station a to the stations c, d, e and g a receptacle body is arranged in each of the successive holders to be acted upon by the means at said stations.

Each of the receptacle body holders comprises a pair of complemental flaps or sections 226 pivotally supported at one longitudinal marginal portion on parallel axes extending longitudinally of the holder and adapted to be moved toward each other into mating relation and laterally of each other or spread, the sections being substantially of semi-circular shape in cross section and of tapered or truncated conical form. To pivotally support the holder sections they are fixed upon shafts 227 engaged and fixed in ears 228 extending laterally from the holder sections adjacent the ends thereof. The shafts 227 are rotatably mounted on the disk 216, as clearly shown in Figures 7 to 11, inclusive. Each of the sections has a laterally extended lug 229 at the forward end and when the sections are in mating or closed position extending in parallel relation, as shown in Figure 7, said lugs being for a purpose to be hereafter described. The holder sections are normally moved to and held in closed position as they are moved to and from the station g by means of a pair of rollers 230 engaging with a cam plate or disk C fixed upon the pillar 21 in superposed relation to the carrier disk 216. These rollers are rotatably mounted on a stud 231 carried by a pair of arms 232 and serve as a pivotal connection means for one end of said arms, said arms having an interengaging connection 233, and the opposite ends being pivotally connected with arms 234 fixed to and extending laterally from the holder section carrying shafts 227. The arms 232 are of arcuate or curved form and extend upwardly and inwardly toward each other from the arms 234. In the normal position of the rollers they are centered between a pair of adjustable abutments 235 carried by a pair of lugs 236 extended upwardly from the arms 217 of the carrier disk. The plate C is arranged with a cam portion 237 by offsetting laterally the marginal portion of the plate, this portion being arranged at the receptacle ejecting station g, and the rollers 230 are guided relative to said offset portion by a part 238 which is fixed to the bottom of the plate C relative to said offset portion 237 and having a forward extending ledge 239 conforming to the offset portion upon which the rear roller 230 rides as it approaches the ejecting station. As the rollers follow the offset portion the arms 232 are moved upward along a pair of lugs 240 extended upward from the arms 217, as clearly shown in Figures 9 and 11, and moving the arms 234 connected therewith in an upward direction rocking the holder section carrying shafts 227 and thereby spreading or expanding the holder sections, as shown in Figure 8, to release a receptacle in the holder, which is ejected by a pair of fingers 241 each comprising a strip of metal fixed at one end to webs 242 connecting and reinforcing the arms of the carrier disk. The receptacle ejecting fingers are arranged at the outer sides of the holder sections and extend downwardly from the webs 242 with the ends curved inwardly toward the holder sections and the extremeties engaging perforations 243 in the holder sections normally flush with the inner wall thereof, as shown in Figure 7, and as the holder sections are spread the free ends of the fingers pass through the openings and strip a receptacle from the holder sections, as shown in Figure 8. The plate C is mounted upon the reduced end of the pillar 219 and held against rotation as by keying the disk thereto and retained upon the pillar by a flanged nut 244 threaded onto the pillar in abutting relation to the disk C.

To intermittently rotate the holder carrier to advance the holders to the successive stations an annulus or ring is secured upon the carrier disk, as by screws, with the peripheral portion extended beyond the periphery of said carrier disk and having hardened insets 246 equidistantly spaced about the periphery to correspond with the spacing of the holders on the carrier, and said insets being arranged with notches to serve as ratchet teeth. A lever arm 247 is rotatably mounted upon the hub of the cam disk C by the flange of the disk securing nut 244, said arm extending radially to and beyond the periphery of the annulus with the extremity bent downward to lie contiguous to the periphery of the annulus, and pivotally carries a pawl 248 by a lug extending laterally from the end, said pawl being adapted to engage the notches in the blocks 246 as the arm is moved in one direction, to the right as viewed in Figure 4, the pawl being normally urged toward the annulus by a spring 249 interposed between a heel 250 on the pawl and an abutment extending laterally from the lever arm, as shown in Figure 4. The lever arm 247 is oscillated by a rod 251, comprising a pair of sections connected to have longitudinal adjustment, as at 252, in Figure 3, said rod being connected at one end to the pawl carrying lever arm intermediate the ends thereof and at the other end to a lever 253, said connections being arranged to permit of universal movement of the rod. These connections are as shown in Figure 35 and as they are substantially the same, description of one will suffice for both. A sleeve 254 is secured upon each end of the rod by engaging a reduced bore portion of said sleeves upon the rod and secured thereto, as by a pin. A spherical end 255 of a threaded stem 256 is engaged in the sleeve through an opening in the lateral wall to engage a socket portion in a block 257 in the sleeve at the end of the rod, and with a socket portion in a block 258 threaded into the outer end of the sleeve and locked therein by a threaded block 259. To connect the rod with the pawl carrying lever the stem 256 is threaded into a boss intermediate the ends of the levers, as at 260, and locked in position by a nut 261 on the stem. To connect the rod 251 with the lever 253 the stem 256 is somewhat lengthened and threaded into a bore in the end of said lever and secured therein by a lock nut 261. The lever 253 is oscillated to impart positive advancing movement and retrograde movement to the pawl carrying lever, and for this purpose the lever 253 is actuated to impart carrier disk advancing movement to the pawl carrying arm by a cam 262 fixed on the shaft S engaging a cam following roller 263 rotatably carried by a pin 264 (Figure 34) fixed in a bifurcation 253' of the lever, and retrograde movement is imparted to the lever by a roller 265 on the extended end of the pin 264 engaging a cam groove in the face of a disk 265' fixed on the shaft S, as shown in Figure 37.

To retard the movement of the holder carrier at the terminus of its movement brake mechanism is provided, comprising a band 266 (Figures 2, 3 and 5) extended around a recess in an annular enlargement 218' of the head 218 of the holder carrier with the ends of the band offset laterally in parallel relation to each other, one offset end engaging a fixed abutment, as at 267, on the base 220, and the other offset end engaging the end of a rod 268, as at 269, and a spring 270 interposed between the offset ends of the band. The rod is slidably mounted in a plate 270' fixed to the base 220, and the opposite end of the rod has a yoke 271 (Figure 34) fixed thereto and slidably mounted and guided in a recess 272 in an enlargement at the outer side of a leg of the bifurcation of the lever 253, and retained therein by a plate 273 secured to said enlargement at the outer side of the enlargement, and connected with the lever 253 by a pin 274 (Figure 36) extended through the plate 273, the yoke 271 and the enlargement 272. The lever is pivotally supported by engaging a bifurcation 275 at the end over a perforated lug 276 of a bracket fixed upon the table 29 and a pin extended through perforations in the bifurcation legs 275 and a lug 276, as shown in Figure 5. As the lever 253 is moved to impart carrier disk advancing movement to the pawl carrying arm 47 there will be a lost motion between the lever 253 and the brake rod due to the yoke connection with the lever until the lever approaches the terminus of such movement when longitudinal movement will be imparted to the brake rod forcing the one offset end 269 of the brake band toward the other offset end 267 thereof and thereby drawing the band taut about the head enlargement 266, and which force of the brake band on the carrier is released as return movement is imparted to the lever 253 due to such connection with the brake rod.

In Figures 50 and 51 there is shown a modified means for retarding the movement and preventing overthrow of the holder carrier, which may be the preferred means for accomplishing this result. In this arrangement the head of the holder carrier also has the annular enlargement 218'. However, instead of providing a brake band to engage in the peripheral recess thereof abutments in the form of blocks 277 are fixed in said recess and equidistantly spaced around the same to correspond with the spacing of the holders about the carrier. A lever 278 is pivotally supported for movement on a vertical axis upon a bracket fixed upon the table 29 with one end extending slightly beyond the axis of the pillar 219 for the holder carrier and slidably supported upon a laterally projecting portion of the supporting base 220 of the carrier head 218, as shown at 279. The lever is normally urged to position said end engaging a stop 280, as shown in dot and dash lines, by a spring 281, and carrying at said end a shoe 282 to frictionally engage with the spaces of the enlargement 218' of the carrier head between the abutments to retard the movement of said head as it approaches the terminus of its movement, and engaging one of the abutments 277 to prevent overthrow of the carrier head. The lever is actuated to position the shoe relative to the head enlargement in timed sequence with the movement of the carrier head by a cam in the form of a segment 283 fixed to and extending beyond the periphery of the cam 265' and engaged by a cam following roller 284 carried by the lever. The lever is actuated during the interim of the movement of the cam from the dot and dash line to the full line position (Figure 51) and as the cam follower rides off from the cam.

The holder carrier is releasably locked against movement during the periods of rest by a detent pin 285 having a reduced portion at one end and arranged with a beveled shoulder at the juncture of the reduced portion with the body of the pin. (Figures 1, 4 and 20 to 25.) This pin is mounted to have vertical sliding movement in a tubular housing 286 arranged above and in the line of travel of a series of openings 287 in the ratchet annulus 245 equidistantly spaced about said annulus to correspond with the spacing of the holders for the receptacle bodies. The wall at the entrance to the openings is beveled to conform to the beveled shoulder on the pins. The housing is a part of a bracket 288 fixed upon a lateral extension of standard 289. (Figures 2 and 4.) The detent is urged in a direction toward the ratchet annulus 245 for engagement in the openings therein by a spring 290 seated in a bore in the detent and engaging an abutment fixed in the end of the housing, as shown in Figures 21 and 22. The detent is moved in a direction away from and out of an opening just previous to the commencement of movement of the holder carrier by an arm 291 fixed to a rock shaft 292 rotatably mounted in bearings fixed upon the supporting standard 13 for the ram and a bearing support *s* for the shaft S. The free end of the arm 291 is of circular or rounded form and extended through a slot 293 and into a transverse recess in the detent, as shown in Figure 21, and the rock shaft is actuated by a cam 294 fixed to the face of a disk fixed upon the shaft S and the cam engaged by a cam following roller 295 carried by an arm fixed to the rock shaft.

The means for forming the closure 221 from the web W' is arranged at the station *c*, (Figures 1, 2, 4 and 26 to 29, inclusive,) and comprises punch and die mechanism carried by the standard 289. A support 296 for a roll of the web is fixed upon and extends upward from said standard. The punch and die mechanism embodies a plate 297 having an opening therethrough and fixed in axial relation to the end of a tubular portion 289' of said standard and has a recess 297' in the face opposite said tubular portion to provide a space for the feeding of the web across said plate relative to the opening therein. The exterior of the tubular punch head 298 is arranged at one end with a rectangular formed portion and at which end it is connected, as at 299, with a similarly formed end of a tubular plunger 300, said portion 299 of the plunger being arranged in a bifurcated portion at the end of the tubular portion of the standard 289', and whereby the plunger and punch are held against rotative movement. A die block 301 having an opening therethrough with two diameters is fixed to the plate 297 with the opening portion of greatest diameter adjacent to said plate. To reciprocate the punch 300 to stamp a disk from the web a pair of arms 302 are connected at one end to the opposite sides of the punch by engaging screws in elongated openings in the offset ends of the arms and threaded into the punch, as at 303, to permit of adjustment of the punch and arms relative to each other, and adjustably connected with the punch by a collar threaded onto the end of the punch engaging in recesses in the arms, as at 304, with the opposite ends of the arms bifurcated and straddling hubs of disk cams 305 and carrying rollers 306 engaging cam grooves in the faces of disks 307. As the disk is stamped from the web it is successively peripherally flanged (Figure 55) by a head of a plunger 308 forcing the disk through the reduced portion of the opening through the die block 301, this plunger being slidably mounted within the tubular punch and reciprocated by rollers 302 on the projecting ends of a pin extended through a yoke member 310 engaging cam grooves in the disks 305, and the yoke having an adjustable connection 311 with the plunger. The receptacle is of a length so that a portion of the larger end will project from the holder. Simultaneously with the flanging of the disk it is inserted into the projecting end of a receptacle body in a holder stationed relative to said punch and die mechanism, the movement of the plunger being of an extent and the disk flange of a length so that the end of the receptacle body will project beyond the disk flange, as shown in Figure 57. Similarly with the engaging of the flange disk in the receptacle body of the latter is formed with the shoulder 223 against which the flange disk or closure is seated and prevent the closure from being forced into the receptacle body beyond said seat. To arrange said shoulder or seat in the receptacle body the holder sections are arranged with a segmental insert 312, (Figure 5) at the entering or larger end of the holder and forming, when the holder sections are closed, an annular inwardly extending rib of slightly less diameter than the diameter of the closed holder sections at the outer end and immediately within said rib. When the body is ejected from the mandrel into the holder the body is not engaged into the holder to its full extent as the movement into the holder is resisted by frictional contact with the rib 312. The plunger with the flanged disk thereon has a diameter which is the mean diameter of the portion of the receptacle body projecting from the holder, and as the plunger with the disk thereon frictionally engages therewith the body is moved to its full extent into the holder firmly impinging and holding the body against the wall of the holder below the rib 312, the movement of the receptacle body into the holder effecting a circumferential contraction of the body. Upon the continued movement of the plunger into the projecting end of the receptacle body the material of said projecting end is displaced longitudinally and laterally folding the same over the rib 312, thus forming the shoulder 223 and seating the closure disk against said shoulder. This longitudinal and lateral displacement of the projecting portion of the receptacle body is effected without expanding and consequent increase of the receptacle body due to the progressively increased diameter of the receptacle body, which is of tapered form, and the circumferential or annular contracting of the receptacle body.

To permit of yielding expansion of the holder sections during the insertion of the flanged closure disk in the receptacle body to compensate for variations in the thickness of the material of the receptacle bodies and closure disks a block 313 is slidably mounted in a recess in the under face of the cam disk C relative to said station c and in the line of travel of the rollers 230 of the operating arms 232 for the holder sections, said block being carried by studs 314 fixed to a plate 315 of yielding material and extended through openings in the cam disk C and threaded into the block, the plate 315 being mounted on the cam disk by headed screws 316 extended through openings in the offset extremities of said plate and threaded into the cam disk. (Figure 14.)

To permit of expansion of the holder sections at the station a to compensate for variations in the thickness of the material from which the receptacle bodies are made a pair of headed pins 319 (Figure 13) are slidably mounted in and extended through openings in the cam disk C and in line with a recess extending transversely of the face of the cam disk and yieldingly projected beyond the face of the disk by the ends of a leaf spring 318 adjustably held against the heads of the pins by a screw 319 extended through an opening intermediate the ends of said spring and threaded into the cam disk C, said pins 317 being in the line of travel and adapted for engagement by the cam following rollers 230 carried by the actuating arms 232 for the holder sections.

The web W' is fed intermittently to and in timed sequence with the operation of the punch and die mechanism by a pair of rollers 320, one of said rollers being rotatably mounted in fixed position in the bifurcation of a frame 321 fixed to and extending forward from the standard 289. A crossbar is secured to the ends of the legs of the bracket bifurcation and the other roller is rotatably mounted in blocks slidably mounted in portions projecting from the crossbar between the frame bifurcation, as shown at 322, (Figure 30) to have adjustment toward and away from the other roller, and held in adjusted position by a set screw 323 threaded into the cross-bar. The rollers are positively driven by a pair of meshing gears 324 (Figures 1 and 2) fixed to one end of the supporting shafts or trunnions of the rollers and driven from a gear 325 (Figure 3) rotatably mounted on a stud fixed in and extending laterally from the frame 321 meshing with a pinion 326 rotatable with one of the rollers. The gear 325 is rotated by a ratchet wheel 327 loose on the supporting shaft of and rotatable with the gear 325 and a pawl 328 cooperating with the ratchet wheel pivotally carried by one arm 329 of a lever loosely mounted on the shaft of gear 325, the pawl carrying lever being oscillated by a rod 330 having a pin and slot connection 331 with the other arm of the pawl carrying lever to permit of adjustment of said connection and thereby varying the throw of the lever. The other end of the rod 330 is connected with a yoke 332 straddling the hub of a cam disk 333 on the shaft S and actuated by a roller 334 carried by the yoke engaging a cam groove in said disk. The cam 294 for actuating the locking detent for the holder carrier is fixed to the side of said cam disk 333.

The pawl 328 is maintained in operative connection with the ratchet wheel by a spring influenced detent 335 mounted in a lug of the pawl carrying lever engaging a pin extended laterally from an arm extended oppositely from the pawl, as at 336. To render the ratchet mechanism operative and inoperative a roller 337 (Figure 32a) is rotatably carried by the pawl carrying lever, said roller being arranged with a flat 338 across a peripheral portion thereof. This roller is arranged in opposed relation to the detent 335, and when adjusted so that the flat 338 is opposite the pin the detent will operate to maintain the pawl in operative relation to the teeth of the ratchet wheel, and when the roller is adjusted so that a circular wall portion thereof is opposite the arm it will move the pawl out of operative connection with the ratchet wheel against the action of the detent. The roller is manipulated by a pin 339 fixed in and extending laterally from the roller. The ratchet mechanism for feeding the web W' is arranged on the table 29 at one side of the holder carrier, and means are provided to control the actuation of the web feeding means from the opposite side of the carrier. For this purpose a pair of adjustable stops are provided which are adapted to be adjusted for the engagement of the manipulating pin 339 for the roller 337 to adjust said roller. These stops comprise pins 340 adjustably carried by arms 341 pivotally mounted in spaced relation on the standard 289 (Figures 31 and 32) and connected by a link 341'. The link has adjustable connection through a rod 342 with one arm of a bell crank lever 343 pivotally mounted on the table 29, the other arm of which lever has an adjustable connection through a rod 344 with a manually operative lever 345 pivotally mounted on a bracket on the table 29. When the stop carrying arms are adjusted to the position shown in Figure 30 the manipulating pin or lever 339 will engage the lower stop pin 340 and be moved to position the roller 338 so that the flat 337 thereon is opposite the pin 336 and permit the detent 335 to move the pawl into operative connection with the ratchet wheel. When the parts are adjusted to the Figure 31 position the upper stop pin 340 is positioned to be engaged by the roller manipulating handle 339 and adjust the roller 337 so that a circular wall portion thereof will come opposite the pin 336 and thereby move the pawl out of engagement with the ratchet wheel against the action of the detent 335.

In order to render the web W' pliable so that the closure disk may be more readily flanged the web is moistened by applying a fluid thereto, and means are provided to apply the liquid to the web as it is fed to the punch and die mechanism, said moistening liquid comprising a refined mineral oil, the oil commercially known as "Nujol" having been found desirable for the purpose. This moistening liquid is applied to either one or both of the web feeding rollers 320. To apply the liquid to the feeding roller a hollow or chambered rectangular open frame 347 is mounted upon the roller supporting bracket 321 above the rollers, said frame having an inlet 348 (Figures 30 and 33) and a receptacle 349 containing the moistening liquid is mounted upon the frame in communication with said inlet. The frame has outlet orifices or openings 350 to permit of the liquid dripping from the frame onto the roller. The frame may also be provided with a wiper 351 of suitable material engaged in a recess in the underside of the frame with perforations leading from the chamber in the frame to said wiper and the wiper engaging with the roller. The web is guided between the feed rollers by a bar 352 fixed upon and extending transversely of the frame.

To prevent withdrawing of the flanged disk from a receptacle body in a holder and the receptacle body from the holder during the receding movement of the head of the plunger 308 means are provided to engage the end of the receptacle and disk flange and strip the same from the plunger head. To retain the receptacle in the holder a pair of levers 353 (Figures 1, 2, 4, 26 and 40 to 45, inclusive,) are pivotally mounted on a bracket 354 fixed to the side of the rectangular forward end 299 of a tubular portion 289' of the standard 289, the one end of the levers extending transversely of and contiguous to the front of the die block 301 and having laterally extended portions arranged diametrically opposite relative to the opening in said die plate with the ends of arcuate form, as at 355, to engage at opposite sides of the head on plunger 308 as it passes through said opening to insert a flanged disk in a receptacle body in a holder, said portions of the levers being normally positioned at opposite sides of the wall of the opening through the die block 301. The opposite ends are guided relative to a plate 356 secured to a lateral extension of the bracket 354 with the opposite ends extending transversely of the levers, and said ends of the levers having a circular reduced portion 357 engaging in openings at one end of links 358 and the links secured thereon by headed screws threaded into said circular reduced portions. The opposite ends of the links are pivotally mounted in the bifurcation of a block 359 having a tubular portion whereby it is slidably mounted in the lateral extension of bracket 354, as at 360 in Figures 40 and 42, with a rod 361 connected with said tubular portion and a yoke 362 straddling the shaft S and held against displacement from the shaft by a cross-bar secured to the ends of the legs of the yoke member, and normally urged to position the links 358 as shown in dotted lines in Figure 40, and the arcuate portions 355 of the levers away from the opening through the die block 301 by a spring 363 (Figure 4) attached to an arm 364 fixed to the rod 361 and a standard s. The levers 353 are actuated to move the ends with the arcuate portions 355 toward each other by a cam 365 on the shaft S engaging a cam following roller 366 rotatably carried on a stud fixed in and extending laterally from the yoke 362, this movement being effected at the commencement of the receding movement of the disk flanging plunger 308. To retain the flanged disk in the receptacle body auxiliary levers 367 are pivotally mounted at one end on the side of the levers 353 with the opposite ends of said levers extending to the ends of the levers having the arcuate projections and normally urged in a direction toward the arcuate end wall of the projections by a spring 368 (Figures 41 and 45) seated at one end in a recess in the auxiliary levers and at the other end in recesses in lugs 369 extended laterally from the ends of the levers 353 and over the ends of levers 367, the auxiliary levers having a limited movement by a headed screw engaging an arcuate slot in the auxiliary levers and threaded into the levers 353, as at 370, to project a lug 371 on the auxiliary levers through cut out portions 371' in the portion of the body of the receptacle extended beyond the edge of the flange of the disk engaged in the receptacle body, (Figures 56 and 57), and thus retain the flanged disk in the receptacle body. It will be obvious that the auxiliary levers will participate in the movement of the levers 353.

After the flanged disk has been formed and inserted into the receptacle body in a holder at the station c the holder carrier is actuated to advance said holder from the station c to station d where the portion of the end of the receptacle body extending beyond the disk flange inserted therein is folded over the edge of the disk flange, as shown at 224 in Figure 58, by the action of the spinning mechanism, when the holder carrier is again actuated to advance the holder to the station e to interfold the contiguous portions of the receptacle body and disk flange to secure the disk in and close the end of the receptacle body and produce a receptacle. Both of these spinning mechanisms are substantially the same (Figures 46 to 49, inclusive,) and illustration and description of one will suffice for both. Each of the spinning mechanisms comprises a head 372 mounted on the reduced end of a shaft 373 mounted to rotate and have axial movement in a standard 373' mounted upon the table 29, by a perforated disk engaged in an enlarged axial recess of the head and a headed screw passing through said disk threaded into the end of the shaft, as at 374. A disk 375 is secured upon a reduced portion at the front of the heads by screws, as at 376, and has a recess 377 of arcuate form in cross section adjacent the periphery thereof. A series of rollers 378, in the present instance four in number, are rotatably carried upon the enlarged portion of shouldered and headed studs 379 mounted in the head 372 and spaced equi-distantly about the head, the roller carrying studs being retained in position on the head by an annulus or ring 380 encircling the head and secured thereto by screws 382 threaded in openings in said ring engaging the end of the roller carrying studs, and said screws locked in position by set screws 383. The rollers have an annular enlargement and the disk 375 is arranged with cut outs to permit a peripheral portion of said roller enlargements to extend therethrough, as at 384, and the rollers are arranged to cooperate with the disk recess 377 to complete the arcuate form of said recess at said portions where the peripheral portions of the rollers extend through the disk cut outs. The shafts 373 are operatively connected with the shafts of electric motors M mounted on the table 29 by pins 385 fixed in and extending laterally from a head 386 fixed to the shafts of the spinning heads slidably engaging in openings in heads 387 fixed to the motor shafts. The shafts 373 are normally urged in a direction to move the spinning heads toward a receptacle holder stationed relative thereto by springs 388 attached at one end to a fixed part of the standards 375' and the other end to levers 389, the lever 389 for the spinning head at station d being fixed to and extending upward from a shaft 390 rotatable in the standard 375' with the upper end of the lever bifurcated and pins carried thereby engaging an annular recess in the head 386, as shown at 391 in Figure 48, and the lever 389 for the spinning head at station e being fixed at one end of a shaft 392 extending transversely of and journaled in brackets fixed upon the table 29, with pins carried in the legs of the bifurcation at the end of said lever engaging in an annular recess in the head 386 fixed to the shaft of said spinning head. The levers 389 are actuated to move the spinning heads away from the receptacle holders stationed relative thereto by rocking the shaft 392 by a cam roller carried by an arm fixed to said shaft engaging in a cam groove in the pheriphery of a drum fixed upon the shaft S, as shown at 393 in Figure 1. The movement of said shaft is transmitted directly to the lever 389 for the spinning head at the station e, and to the lever 389 for the spinning head at the station d by an arm 394 on shaft 392 having a universal joint connection 395 with an arm 396 fixed on the shaft 390.

To prevent expanding of the sections of the holders for the receptacle bodies at stations d and e during the action of the spinning heads to primarily and finally secure a closure disk in a receptacle body in a holder the holder sections are locked in closed position by the bifurcated end of a plate 397 embracing the pins 229 extending laterally from the holder sections, said plate being carried by a block 398 slidably mounted in an extension of the standards 373', as at 399, and moved to position to embrace the pins 229 and to pin releasing position by a lever 400 pivotally supported at one end by a lateral extension of the standards 373' the opposite bifurcated end extending between ears extending laterally from the plate supporting block, and with a pin fixed in and extending transversely between said ears, as at 401, said levers being actuated from the levers 389 by a rod 402 pivotally connected at opposite ends with said levers. The inner walls of the legs of the plate bifurcation converge from the ends of the legs, and to compensate for variations in sizes of receptacle bodies in holders stationed relative to the spinning heads due to variations in the thickness of the material from which the receptacle bodies are made, the connecting rod 402 embodies a pair of sections engaged in a sleeve 403, (Figures 17 and 18,) the one section being secured in the sleeve by a pin 404, while the other rod section and sleeve are connected to have longitudinal movement one relative to the other by a pin 405 engaging in a slot in the sleeve, and the rod section and sleeve urged in a direction away from each other by a spring 406 in the sleeve interposed between the ends of the rod sections. The movement of the levers 389 in a direction to move the spinning heads away from the receptacle holders is limited by a screw 407 (Figure 48) threaded into a lateral extension 408 of an arm extended upward from the supporting standard for the levers, said pin being arranged in the path of movement of the levers 389 for engagement thereby.

After the closure disk has been finally secured in a receptacle body in a holder at station e it is advanced successively to stations f and g by the movement of the holder carrier, and at said latter station g the holder sections are spread or expanded in a manner hereinbefore described to eject the receptacle from the holder sections, the receptacle being stripped from the holder sections by the fingers 241. After the receptacle has been ejected from the holders at the station g they are successively advanced to the stations h and a and at station a receive a further receptacle body from the receptacle forming mechanism.

In the operation of the apparatus a blank B is fed from the pile P to the shelf T below the mandrel 4, when the mechanism to wrap the blank around the mandrel is set in operation. After the blank is wrapped around the mandrel the feeding mechanism for the side sealing strip or web W blank wrapped around the mandrel, the adhesive surface of said web being moistened as it is fed to the mandrel. The ram 86 is then actuated to apply pressure to the sealing strip to effect an adhesion between said strip and the blank on the mandrel, the ram carrying a cutter co-operating with a cutter carried by the mandrel as the ram approaches the mandrel to sever the feed portion of said web. As the ram recedes from the mandrel the ejector rods 182 are actuated to deliver the receptacle body from the mandrel to one of the holders 226 positioned adjacent to and in line with the mandrel by the actuation of the holder carrier. The receptacle body forming apparatus is then actuated and during this period the carrier for the holders 226 is actuated to advance the holder with the receptacle body therein from the position a to position b. During the periods of rest of the holder carrier, and during the period of forming a receptacle body, the mechanism for forming the bottom closure disk as well as the spinning means for securing the closure disk in the receptacle body are actuated, the holder carrier being intermittently actuated to successively position the holders adjacent the said mechanisms. However, when the apparatus is started and until such time as a holder with a receptacle body therein is positioned adjacent the bottom forming mechanism the feeding mechanism for the bottom forming web is rendered inoperative, and rendered operative when a holder with a receptacle body therein is positioned adjacent to said bottom forming mechanism. From the bottom forming mechanism the holders are successively advanced to the spinners, and from the latter to the ejecting position.

It will be obvious that various modifications may be made in construction and arrangement of parts, and that portions of the invention may be used without others, and come within the scope of the invention.

Having thus described my invention I claim:

1. In receptacle forming apparatus, a mandrel, a plunger reciprocatory in a direction toward and away from the mandrel to clamp a receptacle blank intermediate the sides thereof to the mandrel, a pair of flaps shaped to conform to the contour of the mandrel arranged at opposite sides of the plunger and longitudinal axis of the mandrel and having reciprocatory movement in a direction toward and away from the mandrel in parallel relation to the clamping plunger and having movement in a direction toward each other, and means to yieldingly urge said flaps in a direction toward each other to wrap the opposite marginal portions of the blank about the mandrel under tension as said flaps are moved toward the mandrel, and means to secure the blank at the longitudinal marginal portions while on the mandrel.

2. In receptacle body forming apparatus, a mandrel, a support below the mandrel for a receptacle blank, means reciprocatory toward and away from the mandrel to lift the blank from the support and position it relative to the mandrel including a plunger to clamp the blank intermediate the sides to the mandrel, and a pair of plungers juxtaposed to the clamping plunger and movable in parallel relation thereto, a pair of flaps pivotally carried by said pair of plungers adapted to conform with the outer contour of the mandrel and normally urged in a direction toward each other, said flaps being operative through the movement of the plungers to wrap the opposite marginal portions of the blank about the mandrel, means to maintain the flaps in predetermined spaced relation during the initial movement thereof and permit the flaps to have movement toward each other during the final blank wrapping movement thereof to apply a tension to the blank during the wrapping thereof about the mandrel, and means to actuate the plungers.

3. Receptacle body forming apparatus as claimed in claim 2, wherein the plungers are arranged in juxtaposed relation and in line with the axis of the mandrel and the flaps are carried by the pair of plungers at the opposite sides of the plungers to have movement on axes parallel with and at opposite sides of the axis of the mandrel.

4. Receptacle body forming apparatus as claimed in claim 2, wherein the flaps are pivotally carried at one end of arms pivotally mounted at the other ends between bifurcations extending oppositely from a head carried by the pair of plungers.

5. In receptacle body forming apparatus as claimed in claim 2, a head carried by the flap carrying plungers having a bifurcation extending from the opposite ends and through which head the blank clamping plunger is extended and said latter plunger having the opposite edges inclined and converging toward the end of the plunger, an arm pivotally mounted in each of the head bifurcations and extending upwardly therefrom and at the upper ends of which arms the flaps are carried, and the means to maintain the flaps in predetermined spaced relation during the initial movement thereof and permit of movement of the flaps toward each other during the final blank wrapping movement thereof comprises a spring attached at opposite ends to the flap carrying arms, and rollers carried by said arms caused to engage with the blank clamping plunger during the initial movement of the flaps and positioned opposite and out of engagement with the inclined edges of said plunger during the final blank wrapping movement of the flaps.

6. In receptacle body forming apparatus as claimed in claim 2, a head pivotally carried intermediate the ends by the pair of plungers and having a bifurcation extended from the opposite ends, arms pivotally carried in said head bifurcations by which the flaps are carried, a flanged slideway in which the plungers are slidably mounted in the framework of the apparatus, guide rods connected with the head at the connection of the flap carrying arms therewith and extended through openings in the flange of the slideway, and a spring coiled about one of said rods and within an abutment thereon arranged for engagement with a fixed abutment to effect a rocking of the head and yieldingly retarding the movement of one flap during the final blank wrapping movement thereof to effect an overlapping of the marginal portions of the blank on the mandrel.

7. In receptacle body forming apparatus as claimed in claim 2, a head pivotally carried intermediate the ends by the pair of plungers and by which the flaps are carried at opposite sides of the plungers, and yielding means to effect a rocking of the head and a retarding of the movement of one flap during the final blank wrapping movement thereof to effect an overlapping of the marginal portions of the blank on the mandrel.

8. In receptacle body forming apparatus as claimed in claim 2, a head pivotally mounted intermediate the ends upon the pair of plungers and extending beyond opposite sides of the plungers and at which extended ends of the head the flaps are carried, means operative to urge the head to a position at a right angle to the plungers, yielding means associated with one end of the flap carrying head operative to effect a rocking movement of the head and retard the movement of one flap toward the mandrel during the final blank wrapping movement thereof to effect an overlapping of the marginal portions of the blank on the mandrel.

9. In receptacle body forming apparatus as claimed in claim 2, a head pivotally mounted intermediate the ends upon the pair of plungers and by which the flaps are carried at the opposite sides of the plungers, blocks slidably carried by the head plungers to have movement in a direction in line with the axis of and urged toward the pivotal support of the head, said blocks having a V recess in the upper end, pins fixed in the head and engaging the V recesses of the blocks and the blocks operating to normally urge the head to right angle position relative to the plungers, and yielding means associated with one end of the head operative through the movement of the head with the plungers to effect a rocking movement of the head and retard the movement of one flap during the final movement thereof toward the mandrel in wrapping the blank around the mandrel and effect an overlapping of the marginal portions of the blank on the mandrel.

10. In receptacle body forming apparatus, a mandrel, means to wrap a receptacle blank around and hold the same to the mandrel, a ram movable into and out of engagement with the mandrel, means to feed an adhesive strip between the ram and mandrel to be applied to the marginal portions of the blank on the mandrel, means carried by the ram and normally assuming a position in interposed relation to the ram and mandrel to support the fed portion of the adhesive strip, and means to move said strip supporting means out of the path of movement of the ram as the latter is moved into engagement with the mandrel.

11. Receptacle body forming apparatus as claimed in claim 10, wherein the means to support the fed portion of the adhesive strip comprises a plate fixed to an arm pivotally carried by the ram, a second arm pivotally carried at one end by the ram and having a pin and slot connection at the opposite end with the first arm, said plate carrying arm being adapted to assume a position by gravity when the ram is moved away from the mandrel in interposed relation to the ram and mandrel, and an abutment for the engagement of the second arm when the ram is moved toward the mandrel to move said arm and thereby the plate carrying arm through its connection therewith to move the plate out of the path of movement of the ram.

12. In receptacle body forming apparatus, a mandrel, a ram movable into and out of engagement with the mandrel, a shelf to support a receptacle blank below the mandrel, a carrier for a pair of flaps mounted below the shelf to have movement toward and away from the mandrel, and the flaps operative to engage the blank on the shelf and wrap it around and hold it to the mandrel, means carried by the flap carrier to tuck one longitudinal marginal portion of the blank as it is wrapped around the mandrel by the flaps below the other marginal portion of the blank, and means actuated by the movement of the ram to control the movement of said tucking means.

13. Receptacle body forming apparatus as claimed in claim 12, wherein the means for tucking the one marginal portion of the blank below the other marginal portion comprises a pair of arms pivotally mounted at one end upon the flap carrier and carrying a plate at the opposite ends to extend in a plane parallel with the mandrel and positioned with the plate carrying ends laterally of the mandrel, means positioned in the path of movement of the arms by the ram for engagement by the arms as the flap carrier approaches the terminus of the blank wrapping movement to swing the arms in a direction toward the mandrel and the plate carried by the arms from and into engagement with a marginal portion of the blank being wrapped around the mandrel.

14. Receptacle body forming apparatus as claimed in claim 12, wherein the means for tucking the one marginal portion of the blank below the other marginal portion comprises a pair of arms pivotally mounted at one end upon the flap carrier and carrying a plate at the opposite ends to extend in a plane paralel with the mandrel and positioned with the plate carrying ends laterally of the mandrel, a pair of pivoted abutments having a lost motion connection with the ram and positioned in the path of movement of abutments carried by the arms eccentric to the pivot support thereof for engagement by the pivoted abutments as the flap carrier approaches the terminus of its blank wrapping movement to swing the arms in a direction and position the plate carried by the arms over and into engagement with a marginal portion of the blank being wrapped around the mandrel and retain it in such position during the final blank wrapping movement of the flaps, said pivoted abutments being released from the arm abutments by the movement of the ram toward the mandrel through the connection of the abutments therewith, and said pivoted abutment arranged with means to move the arms to position the plate connected thereto out of the path of movement of the ram.

15. In receptacle body forming apparatus, a mandrel, a receptacle blank supporting shelf below the mandrel, a gauge member on said shelf, a pair of suction cups carried at one end of and in communication with a pair of tubes arranged for connection with suction means, a carrier in which said tubes are mounted operative to longitudinally reciprocate the tubes transversely of the mandrel and above the shelf to deliver a blank onto the shelf and register the same with the gauge member, means to support and guide said tubes in the longitudinal movement thereof to effect movement of the suction cup carrying end of the tubes upward as they approach the terminus of the forward movement and downward at the terminus of such movement, and upward at the commencement of its return movement and then downward for a portion of said movement, means movable through the shelf to lift the blank from the shelf and wrap it around the mandrel, and means to actuate the suction blank delivery means and blank wrapping means in timed sequence.

16. Receptacle body forming apparatus as claimed in claim 15, wherein the carrier for the suction cup carrying tubes is supported and guided by rollers in cam slots of a pair of horizontal and parallelly spaced plates.

17. Receptacle body forming apparatus as claimed in claim 15, wherein the means to reciprocate the carrier for the suction cup carrying tubes comprises a pivoted lever having a link connection with the carrier, a drive shaft, a disk on the shaft arranged with a cam groove in a face thereof, a second pivoted lever carrying a roller for engagement in the cam groove of the disk, and a link connection between the levers.

18. In receptacle body forming apparatus, a mandrel around which a blank is wrapped to form the receptacle body, a ram comprising a pivotally supported lever one end of which is adapted to be moved into and out of engagement with the mandrel, a shaft, a disk fixed to the shaft having a cam groove in a face thereof, and a carrier for a roller to engage the cam groove adjustably mounted on the opposite end of the lever.

19. In a receptacle body forming apparatus, a mandrel fixedly supported at one end and around which mandrel a blank is adapted to be wrapped to form a receptacle body, a ram movable into and out of engagement with the mandrel, and an adjustable support for the opposite end of the mandrel.

20. In receptacle body forming apparatus, a mandrel fixedly supported at one end and around which a blank is adapted to be wrapped to form a receptacle body, an adjustable support for the opposite end of the mandrel, a ram movable into and out of engagement with the mandrel, and means to actuate said ram and adjustable mandrel support to move the support to mandrel supporting position prior to the engagement of the ram with the mandrel, and move the support out of mandrel supporting position as the ram is moved out of engagement with the mandrel.

21. In receptacle body forming apparatus, a mandrel, a receptacle blank supporting shelf below the mandrel, a bracket arranged with right angle faces fixed upon the shelf with one angle face arranged in a plane with the top of the shelf and the other angle face extending upward at a right angle to the shelf and for gauging a longitudinal edge of and registering the blank on the shelf relative to the mandrel, means to offset the marginal portion of the blank in register with the gauge member laterally of the body of the blank, means to lift the blank from the shelf and wrap it around the mandrel with the offset marginal portion of the blank in overlapped relation to the other marginal portion of the blank, means to feed a blank securing member relative to the overlapped marginal portions of the blank on the mandrel, and a ram movable into and out of engagement with the mandrel to apply the securing member to the blank.

22. In receptacle body forming apparatus as claimed in claim 21, wherein the means to offset the gauged marginal portion of the blank comprises a plate, a head arranged below and reciprocatory toward and away from the shelf, and guide members extended upward from the head and through the gauge bracket to which the plate is fixed above the shelf, a pivoted lever carrying said head by one arm, and means to actuate said lever in timed sequence with the actuating means to wrap the blank around the mandrel and the ram.

23. In receptacle body forming apparatus, a mandrel, means to wrap a receptacle blank around the mandrel, means for feeding a predetermined length of an adhesive web over the marginal portions of the blank wrapped around the mandrel, a tubular cutter member mounted in the mandrel, and a ram movable into and out of engagement with the mandrel and carrying a cutter member to co-operate with the tubular cutter member to sever the fed portion of the web and the ram applying the severed portion of the web to the marginal portions of the blank to secure the marginal portions and form the receptacle body.

24. Receptacle body forming apparatus as claimed in claim 23, wherein the edges of the opposite walls of the tubular cutter constitute cutting edges and the cutter carried by the ram is arranged to operate in said tubular cutter and having opposite cutting edges, and said tubular cutter being arranged in relation to an opening transversely through the mandrel, and means to clamp the adhesive web relative to the cutters during the severing of the web and strip the web from which a portion has been severed from the cutters during the receding movement of the ram.

25. In receptacle body forming apparatus, a mandrel, means to wrap a receptacle blank about the mandrel with the marginal portions in overlapped relation, means to feed an adhesive web relative to the overlapped marginal portions of the blank on the mandrel, a ram comprising a pivoted lever one end of which is movable toward and away from the mandrel, an anvil carried by said end of the ram and movable into and out of engagement with the adhesive web fed over the overlapped marginal portions of the blank, said anvil having the engaging face arranged in two levels to compensate for the overlapped portions of the blank on the mandrel, and cutter mechanism operative to sever the portion of the web fed relative to the overlapped portions of the blank as the ram is moved toward the mandrel.

26. In receptacle body forming apparatus, a mandrel, means to wrap a receptacle blank about the mandrel, means to feed an adhesive web relative to the longitudinal marginal portions of the blank on the mandrel, a ram movable into and out of engagement with the mandrel to apply the adhesive web to the marginal portions of the receptacle blank, means movably carried by the ram and normally urged to position beyond the face of the ram to guide the web relative to the ram and position the web relative to the marginal portions of the blank, and said means adapted to be positioned within the face of the ram as said face is brought into engagement with the mandrel and cutter mechanism to sever the fed portion of the web by the movement of the ram to web applying position.

27. Receptacle body forming apparatus as claimed in claim 26, wherein the means to guide the adhesive web to the marginal portions of the blank on the mandrel comprises a pair of plates arranged at opposite sides of the ram, and pins carrying said plates slidably mounted in the ram and normally urged outward from the ram to normally project the plates beyond the face of the ram.

28. In receptacle body forming apparatus, a mandrel fixedly supported at one end, means to wrap a receptacle blank around and hold the same to the mandrel, means for feeding and guiding a predetermined length of an adhesive web over the marginal portions of the blank on the mandrel, means to sever the fed web and apply the same under pressure to and secure the blank at the marginal portions to form the receptacle body, a slide supported in the rear of the fixed support of and in line with the mandrel to have movement toward and away from the mandrel, ejector rods connected with said slide to participate in the movement of the slide and have a limited movement relative thereto to engage and eject the formed receptacle body from the mandrel, actuating means to reciprocate the slide and connected ejector rods, and means for imparting an increment of movement to the ejector rods in addition to the movement imparted thereto by the slide.

29. Receptacle body forming apparatus as claimed in claim 28, wherein the actuating means to reciprocate the slide and connected ejector rods comprises a rock shaft, a pivoted lever having a crank connection with said shaft, and a link pivotally carried by said lever having a compensating movement connection with the ejector slide.

30. Receptacle body forming apparatus as claimed in claim 28, wherein the actuating means to reciprocate the slide and connected ejector rods comprises a rock shaft, a pair of levers pivotally supported at one end, one of said levers having a crank connection with said shaft, an angle link to which the opposite end of the lever connected with the rock shaft is pivotally connected at the juncture of the angle portions thereof, the other end of the other lever having a pivotal connection with one of the angle portions of the link, and the other angle portion of the link having a pin and slot connection with the ejector slide.

31. Receptacle forming apparatus as claimed in claim 28, wherein the ejector rods are connected with the slide to participate in the movement of the slide and have a limited movement relative to the slide, and the means for imparting an increment of movement to the rods in addition to the movement imparted thereto by the ejector slide, comprises abutments adjustably supported in the plane of movement of the slide, a lever pivotally carried by the slide and connected with the ejector rods for engagement with the abutments, said lever being arranged to engage the abutments as the slide approaches the terminus of its movements and impart the added increment of movement to the rods during the final movement of the ejector slide, and means to connect the slide and its actuating means to compensate for variations in the movement of the slide and its actuating means.

32. In receptacle body forming apparatus, a mandrel, means to wrap a receptacle blank around and hold the same to the mandrel, adhesive web feeding means, means to intermittently actuate said feeding means to feed a predetermined length of the adhesive web, a guide to direct the web as it is fed over the marginal portions of the blank on the mandrel embodying a fixed section and an extended section pivotally supported at one end, a ram movable into and out of engagement with the mandrel to apply the fed web to the marginal portions of the blank on the mandrel, the one end of the pivotally supported guide being connected with the ram to participate in the movement thereof, and cutter mechanism operative from the movement of the ram to sever the fed portion of the web.

33. Receptacle body forming apparatus as claimed in claim 32, wherein the web is arranged on one surface with a gum, and the provision of means to render adhesive the gummed surface of the fed portion of the web, comprising a liquid carrying trough disposed below the web guide, a pair of rollers one of which rollers is arranged in the trough in relation to an opening in the guide and the other roller arranged above the guide and adapted to move by gravity in a direction toward the guide, a carrier for the roller in the trough normally urged to position with a peripheral portion of the roller extended through the opening in the guide for engagement by the other roller, means operative to actuate the roller carrier to position the roller out of engagement with the gravity roller during the periods of rest of the web feeding means, and means to continuously rotate the roller in the trough.

34. In receptacle making apparatus, a rotatable carrier disk arranged with a series of holders for receptacle bodies, and means to intermittently rotate the carrier disk to station the holders adjacent to means equidistantly spaced about the carrier to form and engage a flanged disk closure in a receptacle body in a holder, means to interlock the disk flange and the end of the receptacle body to secure the disk in the body, and then to position to eject the receptacles from the holders, comprising an annulus fixed to and extending about the periphery of the carrier disk arranged with notches spaced about the same in equidistant relation to the spacing of the holders, a lever pivotally supported above and to swing about the axis of the carrier disk, a pawl pivotally carried by said lever operative when the lever is moved in one direction to engage a notch in the annulus and advance the same with the carrier disk and ride about said annulus when retrograde movement is imparted to the lever, and means to oscillate said lever.

35. Receptacle making apparatus as claimed in claim 34, wherein the means to oscillate the lever to intermittently rotate the carrier comprises a rod connected at one end with the lever intermediate the ends thereof, a rotatable shaft, a lever pivotally supported at one end and having a pivotal connection at the other end with the rod, and an operative connection between said lever and the shaft.

36. Receptacle making apparatus as claimed in claim 34, wherein the means to oscillate the lever to intermittently rotate the carrier comprises a rod having a universal connection with the pawl carrying lever intermediate the ends thereof, a lever pivotally supported at one end and having a universal connection with the rod, a shaft, a pair of cams on said shaft, and operative connections between the cams and second lever, to positively oscillate the second lever and thereby the pawl carrying lever to intermittently rotate the head.

37. In receptacle making apparatus, an intermittently rotatable carrier for a series of radially extending holders for receptacle bodies, means equidistantly spaced about the carrier to which the holders are successively presented to form and insert a flanged disk in a receptacle body in a holder and secure said disk therein, and to position where the receptacles are ejected from the holders, means to intermittently rotate the carrier, and brake mechanism operative from the carrier rotating means to retard the movement of the carrier at the termination of its advancing movement.

38. In apparatus for arranging receptacle bodies with end closures, a rotatable carrier arranged with a series of equi-distantly spaced holders for receptacle bodies, means disposed about the carrier for forming a closure and engaging the formed closure in the receptacle end, subjecting the receptacle body with the closure for action thereon by primary and final securing means, and then to ejecting position to eject the finished receptacle from the holder, means to intermittently rotate the carrier to successively station the holders relative to said means, and means operative from the carrier rotating means to retard the movement of the carrier as it approaches the termination of a movement to hold it against movement during the periods of rest thereof.

39. Apparatus for arranging receptacle bodies with end closures as claimed in claim 38, wherein the means to retard the movement of the carrier as it approaches the termination of a movement and hold the carrier against movement during the periods of rest, comprises brake mechanism associated with the carrier, and actuating means therefor operative from the carrier rotating means.

40. In receptacle making apparatus, a rotatable carrier arranged with a series of equi-distantly spaced holders for receptacle bodies, means disposed about the carrier for forming a closure and engaging the formed closure in the receptacle end, subjecting the receptacle body with the closure for action thereon by primary and final securing means, and then to ejecting position to eject the finished receptacle from the holder, means to intermittently rotate the carrier to successively station the holders relative to said means, and means to retard the movement of the carrier as it approaches the termination of a movement and hold the carrier against movement during the periods of rest, comprising abutments circumferentially disposed about the carrier in equi-distant-spaced relation to the spacing of the holders, and means movable into and out of the path of movement of and for engagement by the abutments.

41. In receptacle making apparatus, a rotatable carrier arranged with a series of equidistantly spaced holders for receptacle bodies, means disposed about the carrier for forming a closure and engaging the formed closure in the receptacle end, subjecting the receptacle body with the closure for action thereon by primarily and finally securing means, and then to ejecting position to eject the finished receptacle from the holder, means to intermittently rotate the carrier to successively station the holders relative to said means, a friction surface circumferentially disposed about the carrier, abutments disposed about said friction surface in equi-distant spaced relation to the spacing of the holders, a pivoted lever carrying a shoe at one end thereof, yielding means to urge the shoe carrying end of the lever in a direction away from said surface and position the shoe out of the path of movement of the abutments, and a rotatable cam to co-operate with the lever and move the same against the action of said yielding means and the shoe into engagement with said surface and into the path of movement of the abutments.

42. In receptacle making apparatus, a rotatable disk carrying a series of holders for receptacle bodies equi-distantly spaced about and extending radially of the disk, said disk having openings therein relative to said holders, a drive shaft, means operative from the drive shaft to intermittently rotate the disk, a detent disposed relative to the disk in the line of travel of the openings therein and adapted for engagement in an opening to lock the disk against movement during the periods of rest, and means operative from the drive shaft to release said detent from the disk opening at the commencement of operation of the disk rotating means.

43. Apparatus as claimed in claim 42, wherein the detent is carried in a fixed housing arranged contiguous and opening to the disk and the detent is normally yieldingly urged outward from the housing for engagement in a disk opening.

44. Apparatus as claimed in claim 42, wherein the openings in the disk are arranged with a beveled enlargement at the entrance thereto, and the detent comprises a pin having a reduced end with the juncture thereof with the larger portion beveled to correspond with the bevel at the entrance to the openings, and a housing arranged contiguous to and opening to the disk in which the pin is slidably mounted and yieldingly urged outward therefrom for engagement in a disk opening.

45. Apparatus as claimed in claim 42, wherein the detent is yieldingly urged in a direction toward the disk for engagement in the disk openings, and the means to release said detent from a disk opening comprises a rock shaft having an operative connection with the detent and operative from the drive shaft to move the detent out of engagement with a disk opening at the commencement of operation of the disk rotating means.

46. Apparatus as claimed in claim 42, wherein the detent is in the form of a pin slidably mounted in a housing contiguous and opening to the disk with means to yieldingly urge the pin outward from the housing into engagement with a disk opening, and the means to release said detent from a disk opening comprises a rock shaft, an arm on the rock shaft extended through an opening in the housing and into a recess in the pin, a cam on the drive shaft, and a second arm on said rock shaft arranged with a follower for the cam.

47. In receptacle making apparatus, a holder for a receptacle body comprising a pair of sections of semicircular shape in cross section pivotally supported at a longitudinal marginal portion to have movement laterally of each other on parallel axes to open position for the engaging of a receptacle body therein and toward each other to closed position to retain therein a receptacle body and having a flanged disk engaged in the end, a spinning head, a support in which the spinning head is mounted to rotate and have axial movement, a carrier for the holder adapted to position the holder adjacent to and in axial alinement with the spinning head and move the holder away from the spinning head, means to impart axial movement to the spinning head toward and away from a holder positioned relative thereto, and said spinning head being adapted to interfold the disk flange with the end of the receptacle body to secure the disk in the receptacle body in the holder positioned adjacent thereto, and means operative from the means to axially actuate the spinning head during the movement of the head toward the holder, to lock the holder sections in closed position during the operation of the spinning head to interfold the disk flange and receptacle end and to release the sections when the spinning head is moved away from the holder.

48. In apparatus as claimed in claim 47, wherein the means to lock the holder sections in closed position during the operation of the spinning head to interfold the disk flange and receptacle, comprises a plate slidably mounted on the support for the spinning head to have movement toward and away from a holder positioned adjacent the spinning head, said plate having a bifurcation at one end to embrace a pin extended laterally in parallel relation to each other from each holder section, and means to actuate said plate from the means to impart axial movement to the spinning head.

49. In apparatus as claimed in claim 47, a drive shaft, a rock shaft operatively connected with the drive shaft to be oscillated thereby, a lever pivotally supported to have movement on an axis transverse to the axis of and having a connection with the spinning head and having an operative connection with the rock shaft to impart movement to the spinning head toward and away from the holder, and the means to lock the holder sections in closed position during the operation of the spinning head to interfold the disk flange and receptacle comprises a slidably mounted plate having a bifurcation at one end with the inner walls of the bifurcation arranged to converge toward each other from the end of the plate and embrace a pin extended laterally in parallel relation to each other from each holder section to lock the holder sections in closed position during the operation of the spinning head to interfold the disk flange and end of the receptacle body, a second pivoted lever having an operative connection with the plate, and an operative connection between said second lever and the spinning head actuating lever.

50. In receptacle making apparatus, an intermittently rotatable carrier having a series of holders for receptacle bodies equi-distantly spaced about and extending radially from the same, means relative to which the holders are successively stationed for engaging a flanged disk in the end of a receptacle body in a holder, and means to primarily and then finally interfold the end portion of the receptacle body with the disk flange, comprising a pair of rotatable spinning heads mounted to have axial movement toward and away from receptacle bodies in holders stationed adjacent to said heads, means to rotate said heads, means to impart axial movement to the heads independent of the rotating means therefor toward and away from the holders, means operative as the spinning heads are moved toward the holders to releasably lock the holders in closed position stationed adjacent the spinning heads during the operation of the spinning heads, and means relative to which the holders with the receptacle bodies having heads secured therein are stationed for ejecting the receptacles from the holders.

51. Apparatus as claimed in claim 50, wherein the means to impart axial movement to the spinning heads comprises a drive shaft, a rock shaft having an operative connection with the drive shaft to oscillate the same, a pivoted lever to connect with each spinning head, and means to operatively connect said rock shaft with the levers.

52. Apparatus as claimed in claim 50, wherein the means to impart axial movement to the spinning heads comprises a drive shaft, a rock shaft having an operative connection with the drive shaft to oscillate the same, a lever fixed to said rock shaft having an operative connection with one spinning head, a second lever having an operative connection with the other spinning head, an arm fixed to the rock shaft, and an arm fixed to the second lever having an operative connection with the arm on the rock shaft.

53. In apparatus as claimed in claim 47, wherein the means to impart axial movement to the spinning head to lock the holder sections in closed position during the operation of the spinning head to interfold the disk flange and end of the receptacle body, comprises a rock shaft, means to oscillate the same, a pivoted lever having an operative connection with the rock shaft and spinning head, a plate slidably mounted to have movement toward and away from the holder having a bifurcation at one end to embrace pins extended laterally from the holder sections as the plate is moved toward the holder, a second lever having an operative connection with the plate, and means for connecting and operating the second lever from the first lever embodying a pair of rods one rod connected at one end to one lever and the other rod at the other end to the other lever, a sleeve in which the end of one rod is secured and the other end of the other rod engaged in said sleeve and having a limited sliding movement relative thereto, and a spring in the sleeve to urge said rod sections outward from each other.

54. In apparatus for arranging heads in the end of receptacle bodies, a rotatable carrier having a series of holders for receptacle bodies equi-distantly spaced about and radially extended from the same, a drive shaft, means operative from the shaft to intermittently rotate the carrier to successively advance the holder to reciprocatory compound punch and die mechanism operative from the drive shaft to stamp a disk from a web, flange the disk and engage it in a receptacle in the holder stationed relative to said mechanism, and means operative from the drive shaft to hold the flanged disk in the receptacle body and the receptacle body in the holder against withdrawal with the punches by the receding movement thereof, and then advance the receptacle holders with flanged disks engaged in receptacles therein to means to interfold inward the disk flange and contiguous receptacle portion to secure the disk in the receptacle body, and then advance the holders to position to eject the receptacle therefrom.

55. In apparatus for arranging a head in the end of a receptacle body, a holder for a receptacle body, compound punch and die mechanism to stamp a disk from a web, peripherally flange the disk and engage it in a receptacle body in the holder, means operative to intermittently feed a web relative to the punch and die mechanism including a pair of contacting rollers, means to apply a liquid to the rollers to render the material of the web pliable, and means to hold the flanged disk in the receptacle body and the receptacle body in the holder against withdrawal with the punch by the receding movement thereof.

56. In apparatus as claimed in claim 54, a pair of rollers to feed a web to the punch and die mechanism, a train of gearing to positively rotate said rollers, a ratchet wheel rotatable with said gearing, a lever supported to have oscillatory movement on the axis of the ratchet wheel, means to actuate the lever from the drive shaft in timed sequence with the punch and die mechanism, a pawl carried by said lever to co-operate with the ratchet wheel when the lever is moved in one direction to rotate the ratchet wheel, and manually operative means to render said pawl inoperative and operative to actuate the ratchet wheel by the oscillation of the lever.

57. In apparatus as claimed in claim 54, a pair of intermittently rotatable rollers to feed a web to the punch and die mechanism, a tubular frame, a liquid carrier mounted on and in communication with the frame, said frame having perforations in a wall thereof in line with one of said rollers to permit of the dripping of the liquid from the frame perforations onto the roller and thereby applied to the web to render the web pliable.

58. In apparatus as claimed in claim 54, wherein the means to hold the flanged disk in the receptacle body and the receptacle body in the holder against withdrawal by the flanging punch during the receding movement thereof, comprises a pair of levers operative from the drive shaft to engage at diametrically opposite sides of the punch and end of the receptacle body and have movement in a direction transverse to the movement of the punch.

59. In apparatus as claimed in claim 54, wherein the means to hold the flange disk in the receptacle body and the receptacle body in the holder against withdrawal by the flanging punch during the receding movement thereof, comprises a pair of levers operative from the drive shaft to engage at diametrically opposite sides of the punch at the end of the receptacle body and have movement in a direction transversely to the movement of the punch, the depth of the disk flange and the movement of the disk flanging punch being such as to engage the flanged disk in the end of the receptacle body with the edge of the disk flange terminating at a point within the receptacle end, and auxiliary levers carried by the first levers arranged with an abutment adapted to engage the punch at the edge of the disk flange in the receptacle body.

60. In apparatus as claimed in claim 54, wherein the means to hold the flanged disk in the receptacle body and the receptacle body in the holder against withdrawal by the flanging punch during the receding movement thereof, comprises a pair of levers operative from the drive shaft to engage at diametrically opposite sides of the punch at the end of the receptacle body and have movement in a direction transversely to the movement of the punch, the depth of the disk flange and the movement of the disk flanging punch being such as to engage the flanged disk in the end of the receptacle body with the edge of the disk flange terminating at a point within the receptacle end, a rod having a toggle link connection with the levers at one end and arranged to be longitudinally reciprocated from the drive shaft, and an auxiliary lever carried by each of said first levers and normally urged outward therefrom, said auxiliary levers being arranged with an abutment projecting laterally therefrom to engage at the edge of the disk flange in the receptacle.

61. In receptacle body forming apparatus, a mandrel, a shelf below the mandrel arranged with a gauge to support and gauge one longitudinal edge of the blank relative to the mandrel, means to offset the lateral marginal portion of the blank while on the shelf, means to lift the blank from the shelf and wrap it around the mandrel with the offset marginal portion of the blank in overlapped relation to the other longitudinal marginal portion of the blank, and means to actuate the blank offsetting means and wrapping means in timed sequence.

62. In apparatus for arranging a head in the end of a receptacle body, a holder for a receptacle body, compound punch and die mechanism, a drive shaft, means operative from the drive shaft to actuate the punch and die mechanism to stamp a disk from a web, peripherally flange and engage the disk in a receptacle in the holder, pivoted levers arranged in front of the die to have movement relative to and away from each other and transversely of the punch, and means operative from the drive shaft to actuate the levers to engage arcuate portions thereof with the punch at the end of the receptacle body with the punch and flanged disk engaged therein to strip the receptacle body from the punch during the receding movement thereof.

63. In apparatus as claimed in claim 62, auxiliary levers pivotally carried by the first levers and normally urged outward therefrom and toward each other to engage opposite sides of the punch at the end of the disk flange in the receptacle body to strip the disk from the punch during the receding movement thereof.

64. In a machine for forming a paper carton, the combination with a mandrel having a free end and a supported end, means for wrapping a blank around said mandrel and for overlapping the free edges of the blank, means for compressing the overlapping edges, and means for supporting the free end of the mandrel during compression of said edges.

65. In a machine for forming a paper carton, the combination with a mandrel supported at one end, means for wrapping a blank around said mandrel and overlapping the free marginal edges thereof, means for compressing the overlapped edges, means for supporting the unsupported end of the mandrel during compression, and means for withdrawing said support to permit the removal of the blank from the mandrel.

66. In a machine for forming paper cartons, the combination with a mandrel supported at one end, means for wrapping a blank around said mandrel and lapping one edge over the other marginal edge of the blank, means for compressing said overlapping edges, means for feeding a blank beneath said mandrel, and means for ejecting the formed blank from the mandrel, together with means for supporting the unsupported end of said mandrel during compression and for withdrawing said support during feeding and ejection of the blank.

67. In apparatus for arranging a head in the end of a receptacle body, a holder for a receptacle body, a compound punch and die mechanism to stamp a disk from a web, peripherally flange the disk and engage it in a receptacle body in the holder, a pair of levers pivotally carried by the die at diametrically opposite sides of the punch to have movement in a direction transversely of the movement of the direction of the punch and adapted to engage the punch at the ends of the receptacle body and the flange of the disk engaged therein to hold the flanged disk in the receptacle body and the receptacle body in the holder against withdrawal with the punch by the receding movement thereof.

Signed at the city of New York in the county of New York and State of New York, this 8th day of August, 1928.

ELLIS L. JONES.